(12) United States Patent
Park

(10) Patent No.: US 12,298,589 B2
(45) Date of Patent: May 13, 2025

(54) LENS DRIVING DEVICE

(71) Applicant: LG INNOTEK CO., LTD., Seoul (KR)

(72) Inventor: Sang Ok Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 18/344,156

(22) Filed: Jun. 29, 2023

(65) Prior Publication Data

US 2023/0341655 A1    Oct. 26, 2023

Related U.S. Application Data

(63) Continuation of application No. 17/445,052, filed on Aug. 13, 2021, now Pat. No. 11,726,296, which is a
(Continued)

(30) Foreign Application Priority Data

Jul. 3, 2014   (KR) .................. 10-2014-0082957
Aug. 22, 2014  (KR) .................. 10-2014-0109728

(51) Int. Cl.
*G02B 7/09*     (2021.01)
*G02B 27/64*    (2006.01)
(Continued)

(52) U.S. Cl.
CPC ............. *G02B 7/09* (2013.01); *G02B 27/646* (2013.01); *H02K 33/18* (2013.01);
(Continued)

(58) Field of Classification Search
CPC ........ G02B 7/09; G02B 27/646; H02K 33/18; H02K 41/0356; H02K 2213/03; H04M 1/0264
(Continued)

(56) References Cited

U.S. PATENT DOCUMENTS 4,998,802 A   3/1991 Kasuga et al.
7,986,478 B2 * 7/2011 Yamashita ............. G02B 7/023
                                             359/814
(Continued)

FOREIGN PATENT DOCUMENTS

CN     1713014 A    12/2005
CN   101246247 A     8/2008
(Continued)

OTHER PUBLICATIONS

Office Action dated Oct. 9, 2018 in Chinese Application No. 201580041240.9, along with its English translation.
(Continued)

*Primary Examiner* — William Choi
(74) *Attorney, Agent, or Firm* — Saliwanchik, Lloyd & Eisenschenk

(57) ABSTRACT

An embodiment comprises: a housing supporting a first coil; a bobbin supporting a magnet, the bobbin being moved inside the housing in a first direction, which is parallel with an optical axis, by an electromagnetic interaction between the magnet and the first coil; an elastic member coupled to the bobbin and to the housing; a first circuit board electrically connected to the elastic member; a second circuit board arranged below the housing; a second coil arranged on the second circuit board; and a support member electrically connecting the first circuit board and the second circuit board or electrically connecting the elastic member and the second circuit board.

20 Claims, 39 Drawing Sheets

Related U.S. Application Data continuation of application No. 16/025,327, filed on Jul. 2, 2018, now Pat. No. 11,131,830, which is a continuation of application No. 15/321,940, filed as application No. PCT/KR2015/006343 on Jun. 23, 2015, now Pat. No. 10,042,140.

(51) Int. Cl.
| | |
|---|---|
| *H02K 33/18* | (2006.01) |
| *H02K 41/035* | (2006.01) |
| *H04M 1/02* | (2006.01) |

(52) U.S. Cl.
CPC ...... *H02K 41/0356* (2013.01); *H04M 1/0264* (2013.01); *H02K 2213/03* (2013.01)

(58) Field of Classification Search
USPC .......................... 359/811, 819, 822, 823, 824
See application file for complete search history.

(56) References Cited

U.S. PATENT DOCUMENTS

| | | | |
|---|---|---|---|
| 10,042,140 B2 * | 8/2018 | Park | ............ G02B 27/646 |
| 11,726,296 B2 * | 8/2023 | Park | ............ H04M 1/0264 |
| | | | 359/824 |
| 2007/0053082 A1 | 3/2007 | Sue et al. | |
| 2012/0154614 A1 | 6/2012 | Moriya et al. | |
| 2013/0033572 A1 | 2/2013 | Wernersson | |
| 2013/0050828 A1 | 2/2013 | Sato et al. | |
| 2013/0194683 A1 | 8/2013 | Machida et al. | |
| 2014/0327965 A1 | 11/2014 | Chen et al. | |
| 2015/0323758 A1 | 11/2015 | Lee et al. | |
| 2015/0331251 A1 | 11/2015 | Hu et al. | |

FOREIGN PATENT DOCUMENTS

| | | |
|---|---|---|
| CN | 101334571 A | 12/2008 |
| CN | 101483376 A | 7/2009 |
| CN | 102315748 A | 1/2012 |
| CN | 102334058 A | 1/2012 |
| CN | 102645815 A | 8/2012 |
| CN | 102811307 A | 12/2012 |
| CN | 102914246 A | 2/2013 |
| CN | 102955324 A | 3/2013 |
| CN | 103226233 A | 7/2013 |
| CN | 103269144 A | 8/2013 |
| CN | 203275847 U | 11/2013 |
| CN | 103548334 A | 1/2014 |
| CN | 103792640 A | 5/2014 |
| CN | 203673131 U | 6/2014 |
| CN | 103901701 A | 7/2014 |
| CN | 104142553 A | 11/2014 |
| JP | H08-160484 A | 6/1996 |
| JP | 2011-008886 A | 1/2011 |
| JP | 2011-065140 A | 3/2011 |
| JP | 2011-118032 A | 6/2011 |
| JP | 2011-154121 A | 8/2011 |
| JP | 2012-177753 A | 9/2012 |
| JP | 2012-177754 A | 9/2012 |
| JP | 2012-255904 A | 12/2012 |
| JP | 2013-97374 A | 5/2013 |
| JP | 2013-167893 A | 8/2013 |
| JP | 2013-190654 A | 9/2013 |
| JP | 2013-210550 A | 10/2013 |
| JP | 3187257 U | 11/2013 |
| JP | 2014-219675 A | 11/2014 |
| KR | 10-1989-0008573 A | 7/1989 |
| KR | 10-2007-0065474 A | 6/2007 |
| KR | 10-0770680 B1 | 10/2007 |
| KR | 10-1208599 B1 | 12/2012 |
| KR | 10-2013-0055288 A | 5/2013 |
| KR | 10-1343197 B1 | 12/2013 |
| KR | 10-2014-0003716 A | 1/2014 |
| KR | 10-2014-0025636 A | 3/2014 |
| KR | 10-1389375 B1 | 4/2014 |
| TW | 201326951 A | 7/2013 |
| WO | 2013/003466 A1 | 1/2013 |
| WO | 2013/183270 A1 | 12/2013 |

OTHER PUBLICATIONS

Office Action dated Jul. 19, 2021 in Chinese Application No. 201911392732.9.
Office Action dated Mar. 19, 2021 in Japanese Application No. 2020-031778.
International Search Report in International Application No. PCT/KR2015/006343, filed Jun. 23, 2015.
Office Action dated Aug. 12, 2020 in Korean Application No. 10-2014-0082957.
Office Action dated Mar. 11, 2019 in Japanese Application No. 2016-575732.
Office Action dated Nov. 21, 2019 in U.S. Appl. No. 16/025,327.
Office Action dated Apr. 28, 2020 in U.S. Appl. No. 16/025,327.
Office Action dated Aug. 24, 2020 in U.S. Appl. No. 16/025,327.
Notice of Allowance dated May 13, 2021 in U.S. Appl. No. 16/025,327.
Notice of Allowance dated Mar. 30, 2018 in U.S. Appl. No. 15/321,940.
Office Action dated Sep. 3, 2021 in Chinese Application No. 201911392720.6.
Notice of Allowance dated Oct. 5, 2021 in Japanese Application No. 2020-031778.
Notice of Allowance dated Apr. 6, 2022 in Chinese Application No. 201911392732.9.
Chao, P. et al., "A new two-DOF rotational optical image stabilizer," Microsyst Technol, 2011, 17:1037-1049.
Office Action dated Oct. 24, 2022 in Japanese Application No. 2021-179777.
Notice of Allowance dated Mar. 31, 2023 in U.S. Appl. No. 17/445,052.

* cited by examiner

FIG.29

| Coil 4 | Coil 3 | Coil 2 | Coil 1 | Output |
|---|---|---|---|---|
| 0 | 0 | 0 | 0 | 0 degree |
| 0 | 0 | 0 | 1 | X+ |
| 0 | 0 | 1 | 0 | Y+ |
| 0 | 0 | 1 | 1 | X+Y+ |
| 0 | 1 | 0 | 0 | X- |
| 0 | 1 | 0 | 1 | 0degree[X+X-] |
| 0 | 1 | 1 | 0 | X-Y+ |
| 0 | 1 | 1 | 1 | X+X-Y+ |
| 1 | 0 | 0 | 0 | Y- |
| 1 | 0 | 0 | 1 | X+Y- |
| 1 | 0 | 1 | 0 | 0degree[Y+Y-] |
| 1 | 0 | 1 | 1 | X+Y+Y- |
| 1 | 1 | 0 | 0 | X-Y- |
| 1 | 1 | 0 | 1 | X+X-Y- |
| 1 | 1 | 1 | 0 | X-Y+Y- |
| 1 | 1 | 1 | 1 | 0degree[X+X-Y+Y-] |

FIG.30

| Coil 1+3 (X) | Coil 2+4 (Y) | Output |
|---|---|---|
| 0 | 0 | 0 degree |
| 0 | + | Y+ |
| 0 | - | Y- |
| + | 0 | X+ |
| - | 0 | X- |
| + | + | X+Y+ |
| - | + | X-Y+ |
| - | - | X-Y- |
| + | - | X+Y- |

LENS DRIVING DEVICE

CROSS-REFERENCE TO RELATED APPLICATIONS

This application is a continuation of U.S. application Ser. No. 17/445,052, filed Aug. 13, 2021; which is a continuation of U.S. application Ser. No. 16/025,327, filed Jul. 2, 2018, now U.S. Pat. No. 11,131,830, issued Sep. 28, 2021; which is a continuation of U.S. application Ser. No. 15/321,940, filed Dec. 23, 2016, now U.S. Pat. No. 10,042,140, issued Aug. 7, 2018; which is a U.S. national stage application of International Patent Application No. PCT/KR2015/006343, filed Jun. 23, 2015, which claims priority to Korean Application Nos. 10-2014-0082957, filed Jul. 3, 2014; and 10-2014-0109728, filed Aug. 22, 2014, the disclosures of each of which are incorporated herein by reference in their entirety.

TECHNICAL FIELD

Embodiments relate to a lens moving apparatus.

BACKGROUND ART

Cellular phones or smartphones equipped with camera modules for capturing subjects and storing the captured subjects as images or video have been developed. In general, a camera module may include a lens, an image sensor module, and a voice coil motor (VCM) for adjusting the distance between the lens and the image sensor module.

When capturing a subject, the camera module may be minutely vibrated by the shaking of a user's hand, with the result that it is not possible to capture desired images or video.

A voice coil motor having an optical image stabilizer (OIS) function has been developed in order to correct the distortion of images or video due to such the shaking of a user's hand.

DISCLOSURE

Technical Problem

Embodiments provide a lens moving apparatus that is capable of being miniaturized, performing image correction regardless of direction, and accurately recognizing and controlling the position of a lens.

Technical Solution

In one embodiment, a lens moving apparatus includes a housing for supporting a first coil, a bobbin for supporting a magnet, the bobbin being configured to move in the housing in a first direction parallel to an optical axis as the result of an electromagnetic interaction between the magnet and the first coil, an elastic member coupled to the bobbin and the housing, a first circuit board connected to the elastic member, a second circuit board disposed under the housing, a second coil disposed on the second circuit board, and a supporting member for electrically connecting the first circuit board and the second circuit board or electrically connecting the elastic member and the second circuit board.

The elastic member may include an upper elastic member, coupled to the upper portion of the bobbin and the upper portion of the housing, and a lower elastic member, coupled to the lower portion of the bobbin and the lower portion of the housing.

The first circuit board may include a first upper surface disposed on the upper elastic member, a first terminal surface bent from the first upper surface, the first terminal surface having a plurality of first terminals, and a first pad disposed on the first upper surface, one end of the supporting member being connected to the first pad.

The second circuit board may include a second upper surface, on which the second coil is disposed, and a second pad disposed on the second upper surface, the other end of the supporting member being electrically connected to the second pad.

The housing may include an upper end, on which the first circuit board is disposed, a plurality of supporting portions connected to the lower surface of the upper end for supporting the first coil, and a through recess formed in a corner of the upper end, the supporting member passing through the through recess.

The housing may include an upper end, on which the first circuit board is disposed, a plurality of supporting portions connected to the lower surface of the upper end for supporting the first coil, and a through recess formed in a corner of the upper end, the supporting member passing through the through recess.

The first upper surface of the first circuit board may include at least one first corner region, the second upper surface of the second circuit board may include at least one second corner region corresponding to the first corner region, at least one of the supporting members may be disposed between the first corner region and the second corner region, the first corner region may be a region within a predetermined distance from a corner of the first upper surface of the first circuit board, and the second corner region may be a region within a predetermined distance from the second upper surface of the second circuit board.

The bobbin may move upward or downward from an initial position in the first direction, parallel to the optical axis, as the result of the electromagnetic interaction between the magnet and the first coil.

The lower portion of the bobbin may be spaced apart from the second circuit board at the initial position.

In another embodiment, a lens moving apparatus includes a housing for supporting a first magnet, a bobbin having a first coil mounted on the outer circumferential surface thereof, the bobbin being configured to move in the housing in a first direction as the result of an electromagnetic interaction between the first magnet and the first coil, upper and lower elastic members coupled to the bobbin and the housing, a first circuit board connected to the upper elastic member, a second circuit board disposed under the housing, a second coil disposed on the second circuit board, an elastic supporting member for electrically connecting the first circuit board and the second circuit board or electrically connecting the elastic member and the second circuit board, and a first damper disposed on a portion of the elastic supporting member.

The lens moving apparatus may further include a second damper provided on a portion at which the elastic supporting member and the second circuit board are electrically connected to each other.

The housing may include an upper end, on which the first circuit board is disposed, a plurality of supporting portions connected to the lower surface of the upper end and supporting the first coil, and a through recess formed in a corner of the upper end, the supporting member passing through the through recess, and wherein the lens moving apparatus may further include a third damper provided between the through recess of the housing and the elastic supporting member.

Each of the upper and lower elastic members may include an inner frame connected to the bobbin, an outer frame connected to the housing, and a connection portion for connecting the inner frame and the outer frame, and the lens moving apparatus may further include a fourth damper provided between the inner frame and the housing.

In a further embodiment, a lens moving apparatus includes a housing for supporting a first magnet, a bobbin having at least one lens mounted therein, the bobbin being provided on the outer circumferential surface thereof with a first coil, the bobbin being configured to move in the housing in a first direction as the result of an electromagnetic interaction between the first magnet and the first coil, a second magnet disposed on the outer circumferential surface of the bobbin, a first position sensor for sensing the position of the bobbin, upper and lower elastic members coupled to the bobbin and the housing, a first circuit board connected to the upper elastic member, a second circuit board disposed under the housing, a second coil disposed on the second circuit board, and an elastic supporting member for electrically connecting the first circuit board and the second circuit board or electrically connecting the elastic member and the second circuit board, wherein the second magnet is a bipolar magnetized magnet disposed so as to be opposite the first position sensor.

The second magnet may include a first lateral surface facing the first position sensor, the first lateral surface having a first polarity, and a second lateral surface facing the first position sensor, the second lateral surface being disposed so as to be spaced apart from or to abut on the first lateral surface in a direction parallel to an optical-axis direction, the second lateral surface having a second polarity opposite the polarity of the first lateral surface. The length of the first lateral surface in the optical-axis direction may be equal to or greater than the length of the second lateral surface in the optical-axis direction.

The second magnet may include first and second sensing magnets disposed so as to be spaced apart from each other and a non-magnetic partition wall disposed between the first and second sensing magnets.

The non-magnetic partition wall may include pores or a non-magnetic material.

The first and second sensing magnets may be disposed so as to be spaced apart from each other in a direction parallel to the optical-axis direction, or may be disposed so as to be spaced apart from each other in a direction perpendicular to the optical-axis direction.

The non-magnetic partition wall may have a length equivalent to 10% or more or 50% or less the length of the second magnet in a direction parallel to the optical-axis direction.

The first lateral surface may be located above the second lateral surface, and the height of the center of the first position sensor may be equal to or higher than the height of an imaginary horizontal surface extending from the upper end of the first lateral surface in a magnetized direction in an initial state before the lens is moved in the optical-axis direction.

Advantageous Effects

A lens moving apparatus is capable of being miniaturized, performing image correction regardless of direction, and accurately recognizing and controlling the position of a lens.

DESCRIPTION OF DRAWINGS

FIG. 29 is a view showing the direction in which a moving part moves under the control of second coils according to a first embodiment;

FIG. 30 is a view showing the direction in which the moving part moves under the control of second coils according to a second embodiment;

BEST MODE

Figure 1:
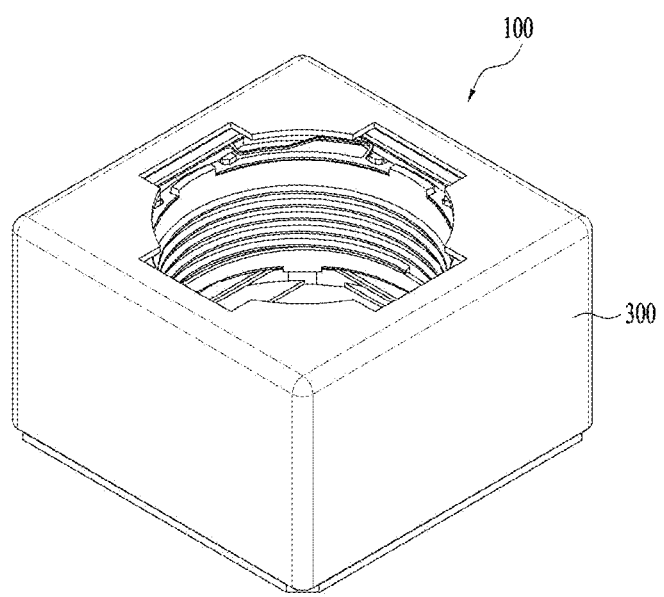
FIG. 1 is a schematic perspective view of a lens moving apparatus according to an embodiment.

Reference will now be made in detail to embodiments, examples of which are illustrated in the accompanying drawings. In the following description of the embodiments, it will be understood that, when a layer (film), region, pattern, or structure is referred to as being "on" or "under" another layer (film), region, pattern, or structure, it can be "directly" on or under the other layer (film), region, pattern, or structure or can be "indirectly" formed such that an intervening element is also present. In addition, terms such as "on" or "under" should be understood on the basis of the drawings.

In the drawings, the sizes of respective elements are exaggerated, omitted, or schematically illustrated for convenience and clarity of description. Further, the sizes of the respective elements do not denote the actual sizes thereof. In addition, wherever possible, the same reference numbers will be used throughout the drawings to refer to the same or like parts.

An optical image stabilization device used in a small-sized camera module mounted in a mobile device, such as a smartphone or a tablet PC, is a device for inhibiting the outline of a captured still image from being blurred due to vibration caused by the shaking of a user's hand when the image is captured.

In addition, an auto focusing device is a device for automatically focusing an image of a subject on the surface of an image sensor. The optical image stabilization device and the auto focusing device may be configured in various manners. In embodiments, an optical module including a plurality of lenses may be moved in a direction parallel to an optical axis or in a direction perpendicular to the optical axis in order to perform auto focusing and optical image stabilization.

Figure 2:
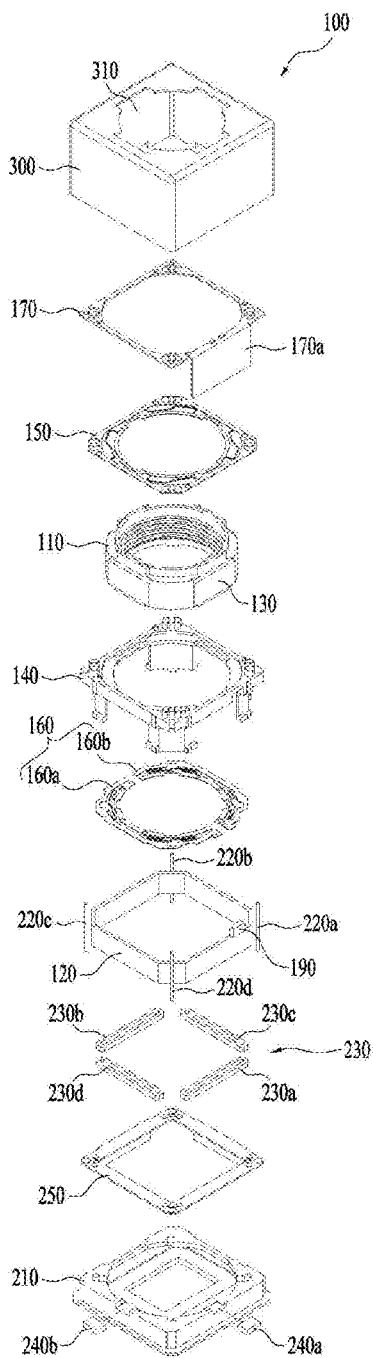
FIG. 2 is an exploded perspective view of the lens moving apparatus shown in FIG. 1.
Figure 3:
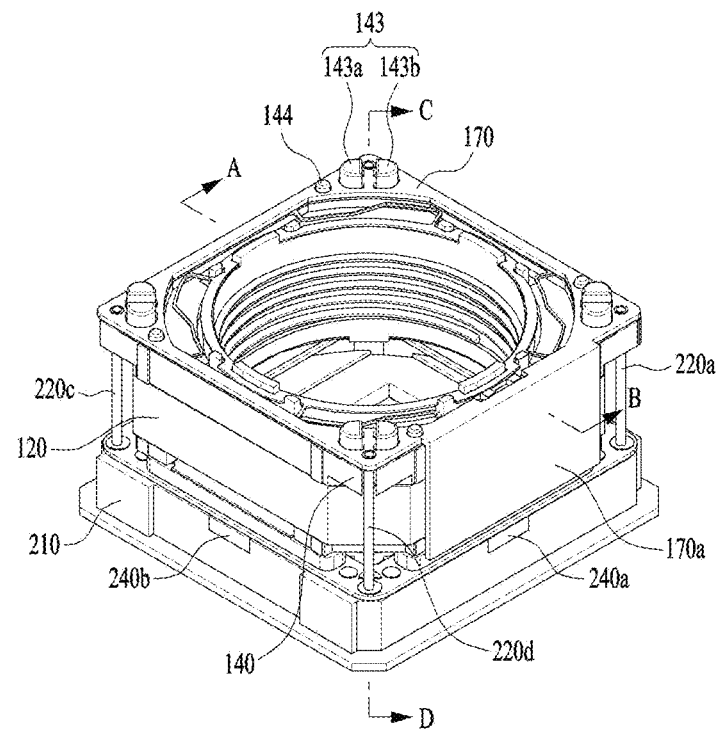
FIG. 3 is a perspective view of the lens moving apparatus shown in FIG. 1, from which a cover member is removed.
Figure 4:
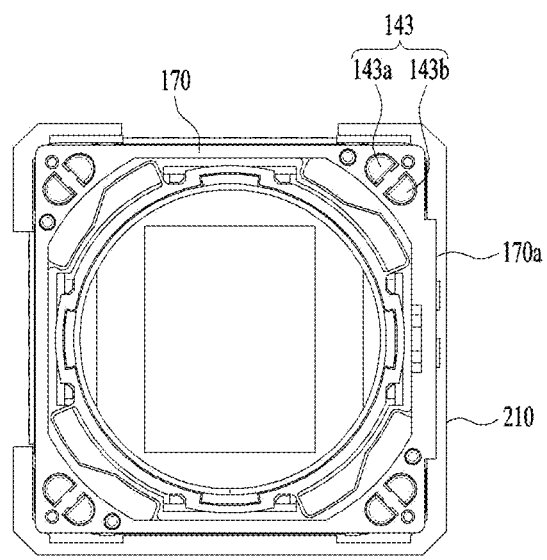
FIG. 4 is a plan view of FIG. 3.
Figure 16:
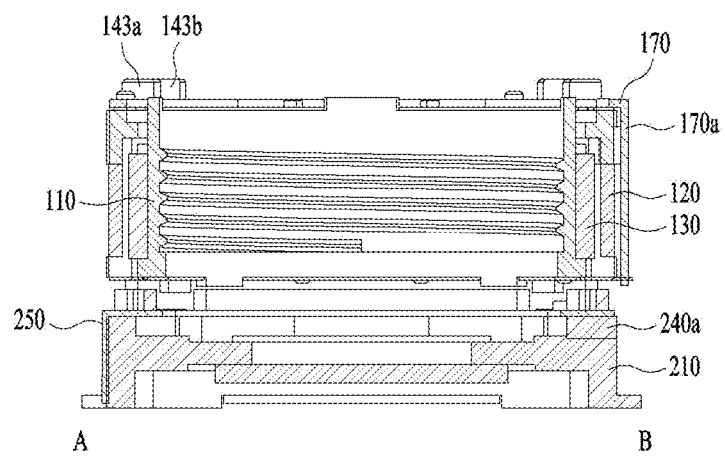
FIG. 16 is a sectional view of the lens moving apparatus taken along line AB of FIG. 3.
Figure 17:
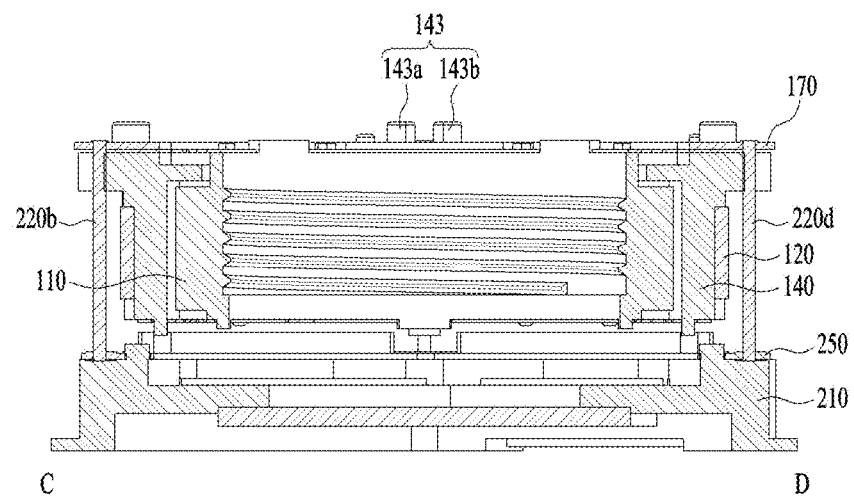
FIG. 17 is a sectional view of the lens moving apparatus taken along line CD of FIG. 3.

FIG. 1 is a schematic perspective view of a lens moving apparatus 100 according to an embodiment, FIG. 2 is an exploded perspective view of the lens moving apparatus 100 shown in FIG. 1, FIG. 3 is a perspective view of the lens moving apparatus 100 shown in FIG. 1, from which a cover member 300 is removed, FIG. 4 is a plan view of FIG. 3, FIG. 16 is a sectional view of the lens moving apparatus taken along line AB of FIG. 3, and FIG. 17 is a sectional view of the lens moving apparatus taken along line CD of FIG. 3.

A rectangular coordinate system (x, y, z) may be used in FIGS. 1 to 17. In the figures, an xy plane, defined by an x axis and a y axis, is a plane perpendicular to an optical axis. For the sake of convenience, the optical-axis direction (i.e. the z-axis direction) may be referred to as a first direction, the x-axis direction may be referred to as a second direction, and the y-axis direction may be referred to as a third direction.

Referring to FIGS. 1 to 4, 16, and 17, the lens moving apparatus 100 includes a cover member 300, an upper elastic member 150, a bobbin 110, a first coil 120, a housing 140, a magnet 130, a lower elastic member 160, elastic supporting members 220a to 220d, a first position sensor 190, a second coil 230, a second circuit board 250, a base 210, and second and third position sensors 240a and 240b.

The bobbin 110, the first coil 120, the magnet 130, the housing 140, the upper elastic member 150, the lower elastic member 160, and the elastic supporting members 220a to 220d may constitute a first lens moving unit 100, which may further include the first position sensor 190. The first lens moving unit 100 may be used for auto focusing.

In addition, the first lens moving unit 100, the second coil 230, the second circuit board 250, and the base 210 may constitute a second lens moving unit 200, which may further include the second and third position sensors 240*a* and 240*b*. The second lens moving unit 200 may be used for optical image stabilization.

First, the cover member 300 will be described.

The cover member 300 receives the upper elastic member 150, the bobbin 110, the first coil 120, the housing 140, the magnet 130, the lower elastic member 160, the elastic supporting members 220*a* to 220*d*, the second coil 230, and the second circuit board 250 in a receiving space defined by the cover member 300 and the base 210.

The cover member 300 may be formed generally in a box shape. The lower portion of the cover member 300 may be coupled to the upper portion of the base 210.

The cover member 300 may be provided in the upper surface thereof with an opening 310, through which a lens (not shown) coupled to the bobbin 110 is exposed to external light. In addition, a window, made of a light-transmissive material, may be provided in the opening 310 of the cover member 300 in order to inhibit foreign matter, such as dust or moisture, from permeating into a camera module.

Next, the bobbin 110 will be described.

The bobbin 110 is disposed inside the housing 140, a description of which will follow. The bobbin 110 may move in the direction parallel to an optical axis, i.e. in the first direction.

Although not shown, the bobbin 110 may include a lens barrel, in which at least one lens is installed. However, the lens barrel may be an element of the camera module, a description of which will follow, or may not be an indispensable element of the lens moving apparatus 100.

The lens barrel may be coupled to the inside of the bobbin 110 in various manners.

Figure 5:
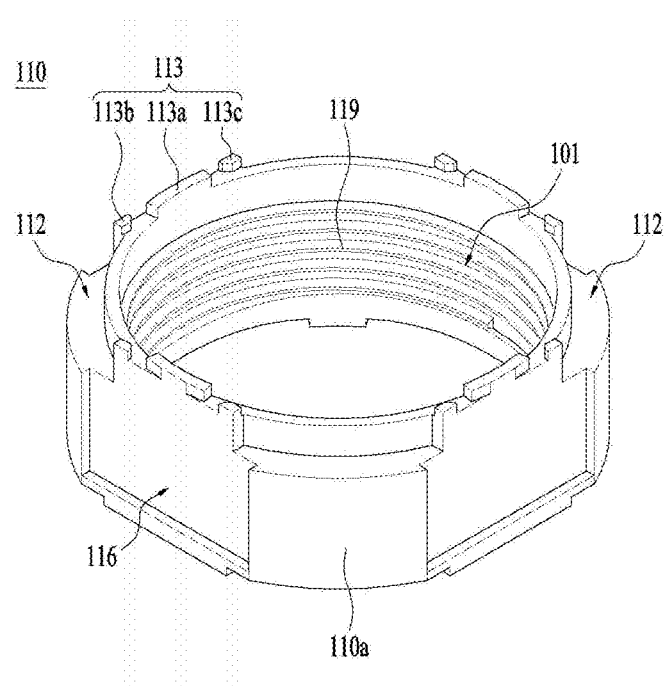
FIG. 5 is a first perspective view of a bobbin shown in FIG. 2.
Figure 6:
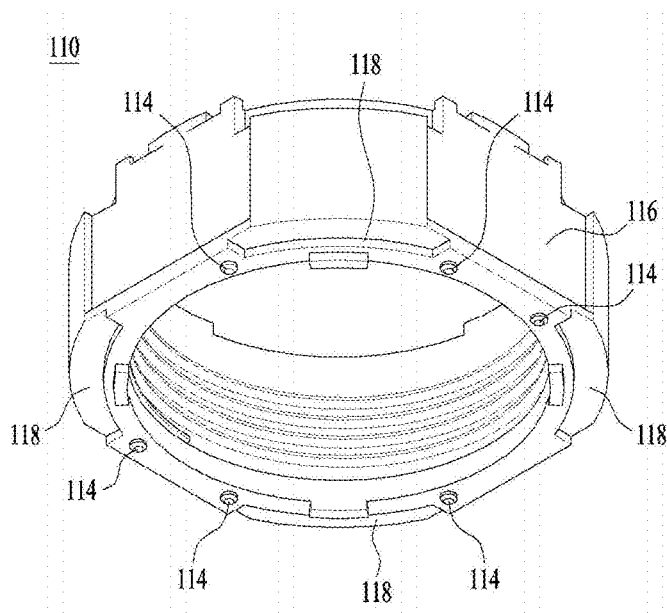
FIG. 6 is a second perspective view of the bobbin shown in FIG. 2.

FIG. 5 is a first perspective view of the bobbin 110 shown in FIG. 2, and FIG. 6 is a second perspective view of the bobbin 110 shown in FIG. 2.

Referring to FIGS. 5 and 6, the bobbin 110 may have a structure provided with a hollow 101, in which the lens or the lens barrel (not shown) is mounted. The shape of the hollow 101 may be determined depending on the shape of the lens or the lens barrel. For example, the hollow 101 may be formed in a circular, oval, or polygonal shape.

For example, the lens barrel may be coupled to the bobbin 110 by coupling between a female screw 119 formed in the inner circumferential surface of the bobbin 110 and a male screw formed on the outer circumferential surface of the lens barrel. However, the disclosure is not limited thereto. The lens barrel may be directly fixed to the inside of the bobbin 110 using a method other than screw coupling. Alternatively, one or more lenses may be integrally formed with the bobbin 110, without the lens barrel.

The bobbin 110 may have at least one upper supporting protrusion 113 formed at the upper surface thereof and at least one lower supporting protrusion 114 (see FIG. 7) formed at the lower surface thereof.

The upper supporting protrusion 113 of the bobbin 110 may be coupled to an inner frame 151 of the upper elastic member 150, whereby the bobbin 110 may be coupled and fixed to the upper elastic member 150.

The upper supporting protrusion 113 of the bobbin 110 may include a middle protrusion 113*a*, a first upper protrusion 113*b*, and a second upper protrusion 113*c*.

The first upper protrusion 113*b* may be disposed at one side of the middle protrusion 113*a* so as to be spaced apart from the middle protrusion 113*a* by a first distance. The second upper protrusion 113*c* may be disposed at the other side of the middle protrusion 113*a* so as to be spaced apart from the middle protrusion 113*a* by a second distance.

For example, the first distance and the second distance may be equal, and the first upper protrusion 113*b* and the second upper protrusion 113*c* may be disposed so as to be symmetric with respect to the middle protrusion 113*a*. However, the disclosure is not limited thereto. The upper elastic member 150 may be asymmetric depending on the shape of the inner frame 151.

The middle protrusion 113*a*, the first upper protrusion 113*b*, and the second upper protrusion 113*c* may each be formed in a prism shape. However, the disclosure is not limited thereto. In another embodiment, the middle protrusion 113*a*, the first upper protrusion 113*b*, and the second upper protrusion 113*c* may each be formed in a cylindrical shape.

The inner frame 151 of the upper elastic member 150, a description of which will follow, may be inserted between the middle protrusion 113*a* and the first upper protrusion 113*b* and between the middle protrusion 113*a* and the second upper protrusion 113*c*, whereby the inner frame 151 may be coupled to the upper portion of the bobbin. The upper supporting protrusion 113 of the bobbin 110 and the inner frame 151 may be fixed to each other by thermal fusion or using an adhesive member such as epoxy.

The first upper protrusion 113*b* and the second upper protrusion 113*c* may serve as stoppers for inhibiting rotation of the bobbin 110 when force is applied to the bobbin 110 in the direction in which the bobbin 110 is rotated about the optical axis.

The bobbin 110 may have a plurality of upper supporting protrusions 113, which may be arranged on the upper surface of the bobbin 110 at intervals.

In the case in which the bobbin 110 has a plurality of upper supporting protrusions 113, the upper supporting protrusions 113 of the bobbin 110 may be arranged at intervals so as to avoid interference with parts therearound. For example, the upper supporting protrusions 113 may be arranged at uniform intervals so as to be symmetric with respect to an imaginary line passing through the center of the bobbin 110. Alternatively, the upper supporting protrusions 113 may be arranged at nonuniform intervals so as to be symmetric with respect to the imaginary line passing through the center of the bobbin 110.

The lower supporting protrusion 114 of the bobbin 110 may be formed in a cylindrical shape or a prism shape. The bobbin 110 may have one or more lower supporting protrusions 114. The lower supporting protrusion 114 of the bobbin 110 may be coupled to an inner frame 161 of the lower elastic member 160, whereby the bobbin 110 may be coupled and fixed to the lower elastic member 160.

In the case in which the bobbin 110 has a plurality of lower supporting protrusions 114, the upper supporting protrusions 113 of the bobbin 110 may be arranged at uniform intervals or nonuniform intervals so as to be symmetric with respect to the imaginary line passing through the center of the bobbin 110.

A magnet location recess 116 having a size corresponding to that of the magnet 130 may be provided between the upper side and the lower side of the outer circumferential surface of the bobbin 110.

The magnet location recess 116 may be provided in the outer circumferential surface of the bobbin 110 depending on the position of the magnet 130. A plurality of magnet location recesses 116 may be provided in the outer circumferential surface of the bobbin 110 so as to correspond to a plurality of magnets.

For example, four magnet location recesses 116 may be provided in the outer circumferential surface of the bobbin 110 at intervals. That is, two pairs of magnet location recesses facing each other may be provided. In addition, one pair of magnet location recesses facing each other and the other pair of magnet location recesses facing each other may be perpendicular to each other.

The magnet location recess 116 may be formed in a recessed shape defined by the bottom and the sidewall. A portion of the sidewall may be open. For example, the magnet location recess 116 may be formed in a recessed shape having an open upper sidewall, through which the magnet 130 is inserted. However, the disclosure is not limited thereto. In another embodiment, a magnet location portion of the housing 140 may have a recessed structure in which a portion of the sidewall is not open.

The bobbin 110 may be provided in the upper portion of the outer circumferential surface 110a thereof with an upper escape recess 112 corresponding to a connection portion 153 of the upper elastic member 150 in order to eliminate spatial interference between the connection portion 153 of the upper elastic member 150 and the bobbin 110 and make it easier for the connection portion 153 to be elastically deformed when the bobbin 110 moves in the first direction.

The upper escape recess 112 may be formed in the upper portion of the outer circumferential surface 110a of the bobbin 110 located between two neighboring magnet location recesses. For example, the bobbin 110 may include four upper escape recesses 112 formed in the upper portion of the outer circumferential surface 110a so as to be arranged at intervals.

In addition, the bobbin 110 may be provided in the lower portion of the outer circumferential surface thereof with a lower escape recess 118 corresponding to a connection portion 163 of the lower elastic member 160 in order to eliminate spatial interference between the connection portion 163 of the lower elastic member 160 and the bobbin 110 and make it easier for the connection portion 163 to be elastically deformed when the bobbin 110 moves in the first direction.

The lower escape recess 118 may be formed in the lower portion of the outer circumferential surface 110a of the bobbin 110 located between two neighboring magnet location recesses. For example, the bobbin 110 may include four lower escape recesses 118 formed in the lower portion of the outer circumferential surface 110a so as to be arranged at intervals.

The outer circumferential surface 110a of the bobbin 110 located between two neighboring magnet location recesses may be a curved surface that is convex from the center of the hollow 101 of the bobbin 110 toward the outer circumferential surface of the bobbin 110.

Next, the magnet 130 will be described.

The magnet 130 is disposed on the outer circumferential surface 110a of the bobbin 110 so as to correspond to the first coil 120, a description of which will follow. For example, the magnet 130 may be disposed in the magnet location recess 116 of the bobbin 110.

The magnet 130 may be fixed to the magnet location recess 116 of the bobbin 110 using an adhesive or an adhesive member such as a double-sided tape.

One or more magnets 130 may be provided. For example, as shown in FIG. 2, four magnets may be arranged on the outer circumferential surface of the bobbin 110 at intervals.

The magnet 130 may be formed in a rectangular parallelepiped shape. However, the disclosure is not limited thereto. In another embodiment, the magnet 130 may be formed in a trapezoidal shape.

The magnet 130 may be disposed in the magnet location recess 116 such that the wide surface of the magnet faces the outer circumferential surface of the bobbin 110. Magnets 130 that face each other may be disposed parallel to each other.

In addition, the magnet 130 may be disposed so as to face the first coil 120, a description of which will follow.

Surfaces of the magnet 130 and the first coil 120 that face each other may be disposed so as to be parallel to each other. However, the disclosure is not limited thereto. One of the surfaces of the magnet 130 and the first coil 120 that face each other may be a flat surface, and the other surface may be a curved surface. Alternatively, the surfaces of the first coil 120 and the magnet 130 that face each other may be curved surfaces. In this case, the surfaces of the first coil 120 and the magnet 130 that face each other may have the same curvature.

The magnet 130 and the first coil 120 may be configured so as to correspond to each other.

In the case in which the magnet 130 is configured as a single body and is disposed such that the entirety of the surface of the magnet 130 that faces the first coil 120 has the same polarity, the first coil 120 may also be configured such that the surface of the first coil 120 corresponding to the magnet 130 has the same polarity.

For example, the magnet 130 may be disposed such that the surface of the magnet 130 that faces the first coil 120 has an N pole and the surface of the magnet 130 opposite the surface having the N pole has an S pole. However, the disclosure is not limited thereto. The polarity of the magnet 130 may be reversed.

In another embodiment, in the case in which the surface of the magnet 130 perpendicular to the optical axis is divided into two, with the result that two or more divided surfaces of the magnet 130 face the first coil 120, the first coil 120 may be divided so as to correspond to the number of divided surfaces of the magnet 130.

Next, the housing 140 will be described.

The housing 140 supports the first coil 120, and receives the bobbin 110 therein such that the bobbin 110 moves in the first direction, which is parallel to the optical axis.

Figure 7:
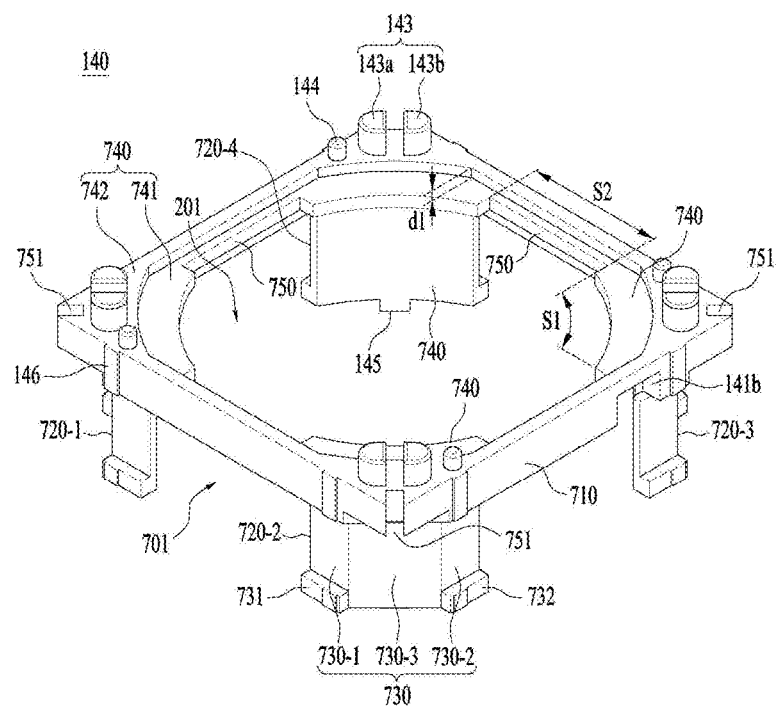
FIG. 7 is a first perspective view of a housing shown in FIG. 2.
Figure 8:
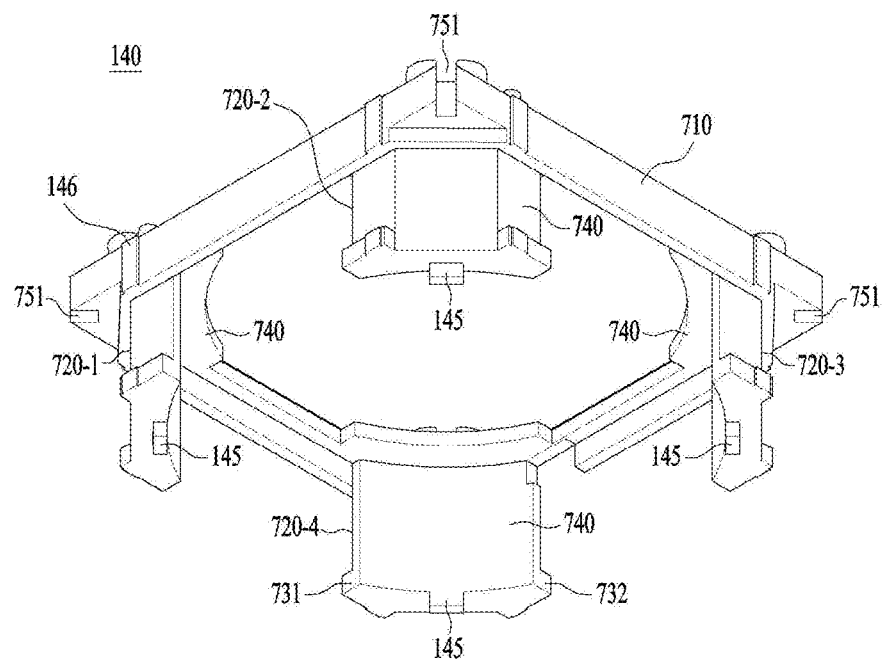
FIG. 8 is a second perspective view of the housing shown in FIG. 2.

FIG. 7 is a first perspective view of the housing 140 shown in FIG. 2, and FIG. 8 is a second perspective view of the housing 140 shown in FIG. 2.

Referring to FIGS. 7 and 8, the housing 140 may be formed generally in a hollow column shape. For example, the housing 140 may have a polygonal (e.g. a quadrangular or octagonal) hollow 201.

The housing 140 may include an upper end 710, which has the hollow 201, and a plurality of supporting portions 720-1 to 720-4 connected to the lower surface of the upper end 710.

The supporting portions 720-1 to 720-4 may be arranged at intervals. An opening 701, through which the magnet 130 mounted on the outer circumferential surface of the bobbin 110 is exposed, may be formed between two neighboring supporting portions.

The upper end 710 of the housing 140 may be quadrangular. The supporting portions 720-1 to 720-4 may be disposed so as to be arranged at intervals.

The supporting portions 720-1 to 720-4 of the housing 140 may each be formed in a prism shape. However, the disclosure is not limited thereto.

The housing may include four supporting portions 720-1 to 720-4. At least one pair of supporting portions may be disposed so as to face each other.

For example, the supporting portions 720-1 to 720-4 of the housing 140 may be disposed so as to correspond to the escape recesses 112 and 118 of the bobbin 110.

In addition, for example, the supporting portions 720-1 to 720-4 of the housing 140 may be disposed so as to correspond to the outer circumferential surface 110a of the bobbin 110 between two neighboring magnet location recesses.

In addition, for example, the supporting portions 720-1 to 720-4 of the housing 140 may be disposed so as to correspond to or be aligned with the four corners of the upper end 710 thereof.

The outer circumferential surface 730 of each of the supporting portions 720-1 to 720-4 of the housing 140 may include a first lateral surface 730-1 parallel to the second direction, a second lateral surface 730-2 parallel to the third direction, and a third lateral surface 730-3 disposed between the first lateral surface and the second lateral surface. Each of the first to third lateral surfaces 730-1 to 720-3 may be a flat surface.

A first angle formed by the third lateral surface 730-3 and the first lateral surface 730-1 of each of the supporting portions 720-1 to 720-4 of the housing 140 and a second angle formed by the third lateral surface 730-3 and the second lateral surface 730-2 may be an obtuse angle. The first angle and the second angle may be the same.

The area of the third lateral surface 730-3 of each of the supporting portions 720-1 to 720-4 of the housing 140 may be greater than the areas of the first and second lateral surface 730-1 and 730-2. However, the disclosure is not limited thereto.

The inner circumferential surface 740 of each of the supporting portions 720-1 to 720-4 of the housing 140 may be a curved surface that is convex from the center of the hollow 201 of the housing 140 toward the outer circumferential surface 730 of a corresponding one of the supporting portions 720-1 to 720-4 of the housing 140.

The inner circumferential surface 740 of each of the supporting portions 720-1 to 720-4 of the housing 140 may have a curved surface corresponding to or coinciding with the curved surface of the outer circumferential surface of the bobbin such that the bobbin 110 easily moves in the housing 140 in the first direction without interference with the housing 140.

Each of the supporting portions 720-1 to 720-4 of the housing 140 may have stairs 731 and 732 protruding from the lower portions of the first and second lateral surface 730-1 and 730-2 in order to support the first coil 120, a description of which will follow.

The housing 140 may have at least one first stopper 143 protruding from the upper surface thereof in order to inhibit collision with the cover member 300. That is, the first stopper 143 of the housing 140 may inhibit the upper end 710 of the housing 140 from directly colliding with the inner surface of the cover member 300 when external impact is applied thereto.

For example, the first stopper 143 may protrude from the upper surface of the upper end 710 of the housing 140, and may be disposed so as to correspond to or be aligned with each of the supporting portions 720-1 to 720-4 of the housing 140.

A plurality of first stoppers 143 may be provided. The first stoppers may be arranged at intervals. For example, at least one pair of first stoppers may be disposed so as to face each other.

The first stopper 143 may be formed in a cylindrical shape or a polygonal column shape. The first stopper 143 may be divided into two or more. For example, the first stopper 143 may be divided into two. The two divided first stoppers 143a and 143b may be spaced apart from each other by a predetermined distance. In addition, the first stopper 143 of the housing 140 may serve to guide the installation position of the upper elastic member 150.

The housing 140 may have at least one second stopper 146 protruding from the lateral surface of the upper end 710 thereof in order to inhibit collision with the cover member 300. That is, the second stopper 146 of the housing 140 may inhibit the lateral surface of the upper end 710 of the housing 140 from directly colliding with the inner surface of the cover member 300 when external impact is applied thereto.

The housing 140 may further have at least one upper frame supporting protrusion 144 protruding from the upper surface of the upper end 710 so as to be coupled to an outer frame 152 of the upper elastic member 150.

The housing 140 may have a plurality of upper frame supporting protrusions 144. The upper frame supporting protrusions 144 of the housing 140 may be disposed on the upper surface of the upper end 710 of the housing 140 so as to be arranged at intervals.

For example, the upper frame supporting protrusions 144 may be spaced apart from the first stoppers 143, and may be adjacent to the corners of the housing 140.

In addition, the housing 140 may have at least one lower frame supporting protrusion 145 protruding from the lower surface of each of the supporting portions 720-1 to 720-4 so as to be coupled to an outer frame 162 of the lower elastic member 160.

The lower frame supporting protrusion 145 may be formed in a cylindrical shape or a polygonal column shape. The lower frame supporting protrusion 145 may be aligned with the center of the lower surface of each of the supporting portions 720-1 to 720-4. However, the disclosure is not limited thereto. In another embodiment, the housing 140 may have a plurality of lower frame supporting protrusions 145.

The upper end 710 of the housing 140 may have a damper supporting portion 741 that abuts on the hollow 201 and forms a stair d1 together with the upper surface. A damper, a description of which will follow, may be disposed or applied in the damper supporting portion 741.

For example, the upper surface 740 of the upper end 710 of the housing 140 may include a damper supporting portion 741 and an outer supporting portion 742. The stair d1 may be provided in the first direction between the damper supporting portion 741 and the outer supporting portion 742.

The outer supporting portion 742 may be formed in a shape that abuts on the lateral surface of the housing 140 and corresponds to or coincides with the shape of the outer frame 152 of the upper elastic member 150. The outer supporting portion 742 may support the outer frame 152 of the upper elastic member 150.

The damper supporting portion 741 may be formed in a recessed shape that is recessed downward from the outer supporting portion 742. The damper supporting portion 741 may form the stair d1 together with the outer supporting portion 742.

The damper supporting portion 741 may include a first part S1 located so as to correspond to each of the supporting portions 720-1 to 720-4 of the housing 140 and a second part S2 located between the first parts S1 so as to correspond to a bent portion 151a of the upper elastic member.

The first part S1 of the damper supporting portion 741 may be aligned with the connection portion 153 of the upper elastic member 150 and the upper escape recess 112 of the bobbin 110 in the vertical direction.

A damper may be applied between the damper supporting portion 741 and the connection portion 153 of the upper elastic member 150 in order to inhibit the occurrence of an oscillation phenomenon when the bobbin 110 moves.

The second part S2 of the damper supporting portion 741 may have an escape recess 750 for avoiding spatial interference with the bent portion 151a of the inner frame 151 of the upper elastic member 150. The length of the escape recess 750 may be equal to or greater than the length of the bent portion 151a in order to eliminate spatial interference.

The housing 140 may be provided in corners of the lateral surface of the upper end 710 thereof with through recesses 751, into which the elastic supporting members 220a to 220d are inserted.

The through recesses 751 may be formed through the upper end of the housing 140, may be depressed from the lateral surface of the upper end 710 of the housing 140, and may be open in the lateral direction. However, the disclosure is not limited thereto. In another embodiment, through holes may be formed only through the upper surface and the lower surface of the upper end 710 of the housing 140.

The through recesses 751 may have a depth such that the portions of the elastic supporting members 220a to 220d inserted into the through recesses 751 are not exposed outside of the lateral surface of the housing 140. The through recesses 751 may serve to guide or support the elastic supporting members 220a to 220d.

The housing 140 may be provided in the lateral surface of the upper end 710 thereof with a first position sensor recess 141b. The first position sensor recess 141b may have a size and shape corresponding to the size and shape of the first position sensor 190.

For example, the first position sensor recess 141b may be formed in the lateral surface of the upper end 710 of the housing 140 located between the supporting portions 720-1 to 720-4 thereof.

Next, the first position sensor 190 will be described.

The first position sensor 190 is disposed in the housing 140. For example, the first position sensor 190 may be disposed in the first position sensor recess 141b of the housing 140. The first position sensor 190 is connected to the first circuit board 170 by soldering.

For example, the first position sensor 190 may be connected to a first terminal surface 170a of the first circuit board 170.

The first position sensor 190 may be a sensor for sensing the change of a magnetic field emitted by the magnet 130. The first position sensor 190 may sense the change of the magnetic field emitted by the magnet 130 when the bobbin 110 moves in the first direction. The first position sensor 190 may be disposed so as to correspond to the magnet 130.

For example, the first position sensor 190 may include a Hall sensor and a driver for performing data communication, e.g. I2C communication, with an external controller using a protocol upon receiving data from the Hall sensor. In another embodiment, the first position sensor 190 may include a Hall sensor alone.

Next, the first coil 120 will be described.

The first coil 120 is disposed on the outer circumferential surface of the housing 140.

The first coil 120 may be disposed on the outer circumferential surfaces 730 of the supporting portions 720-1 to 720-4 of the housing 140.

For example, the first coil 120 may be a ring-shaped coil block disposed on the first to third lateral surfaces 730-1 to 730-3 of the supporting portions 720-1 to 720-4 of the housing 140. However, the disclosure is not limited thereto.

The ring shape of the first coil 120 may be a polygon, e.g. an octagon, corresponding to the shape of the outer circumferential surfaces 730 of the supporting portions 720-1 to 720-4 of the housing 140. For example, the ring shape of the first coil 120 may be configured such that at least four surfaces are flat and corner parts connecting the four surfaces are round or flat.

The first coil 120 may directly face the magnet 130 through the opening 701 of the housing 140. That is, at least a portion of the housing 140 may not be disposed between the magnet 130 and the first coil 120, and the first coil 120 and the magnet 130 may face each other through the opening 701.

Next, the upper elastic member 150 and the lower elastic member 160 will be described.

Figure 9:
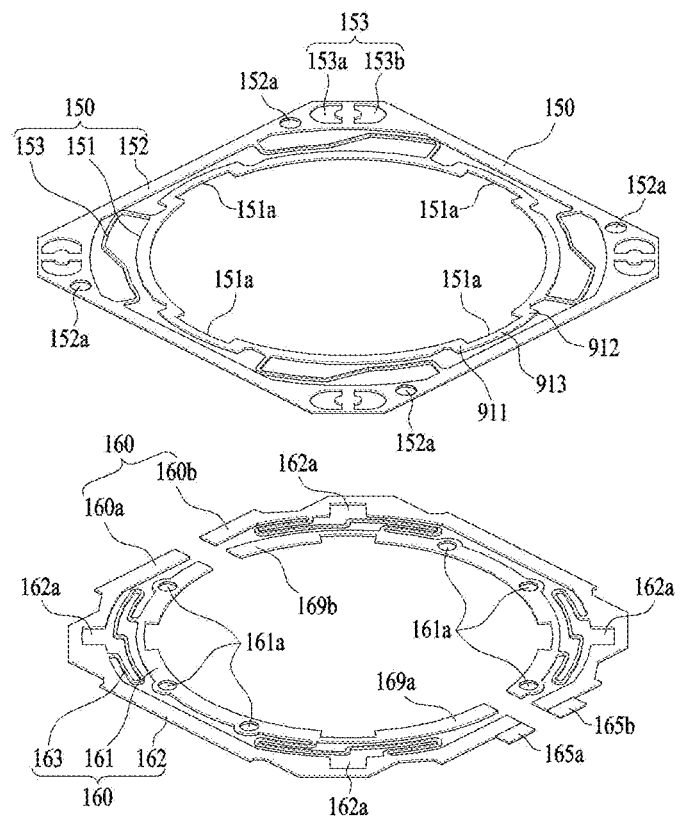
FIG. 9 is a perspective view of an upper elastic member and a lower elastic member shown in FIG. 2.
Figure 10:
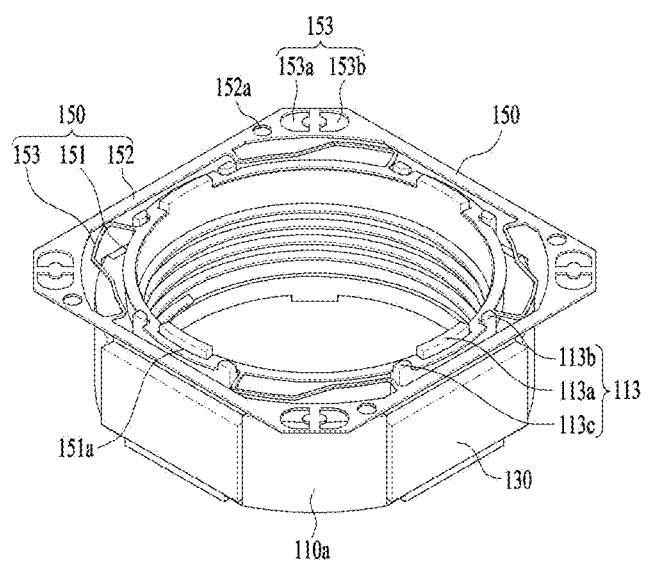
FIG. 10 is an assembled perspective view of the bobbin and the upper elastic member shown in FIG. 2.
Figure 11:
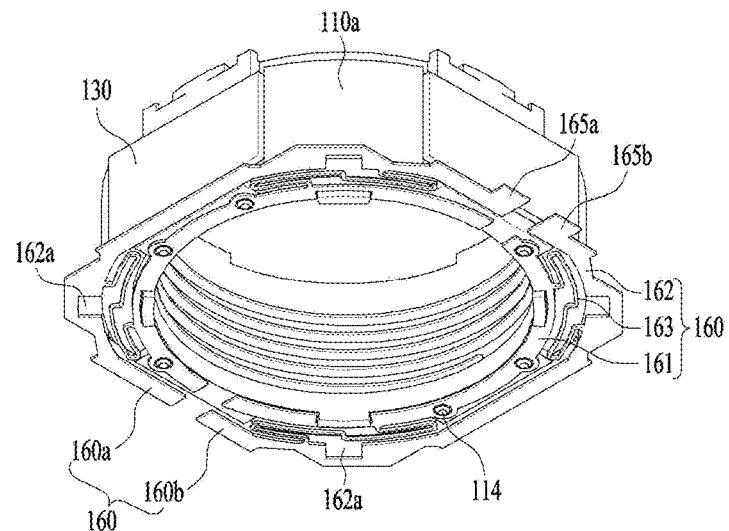
FIG. 11 is an assembled perspective view of the bobbin and the lower elastic member shown in FIG. 2.
Figure 12:
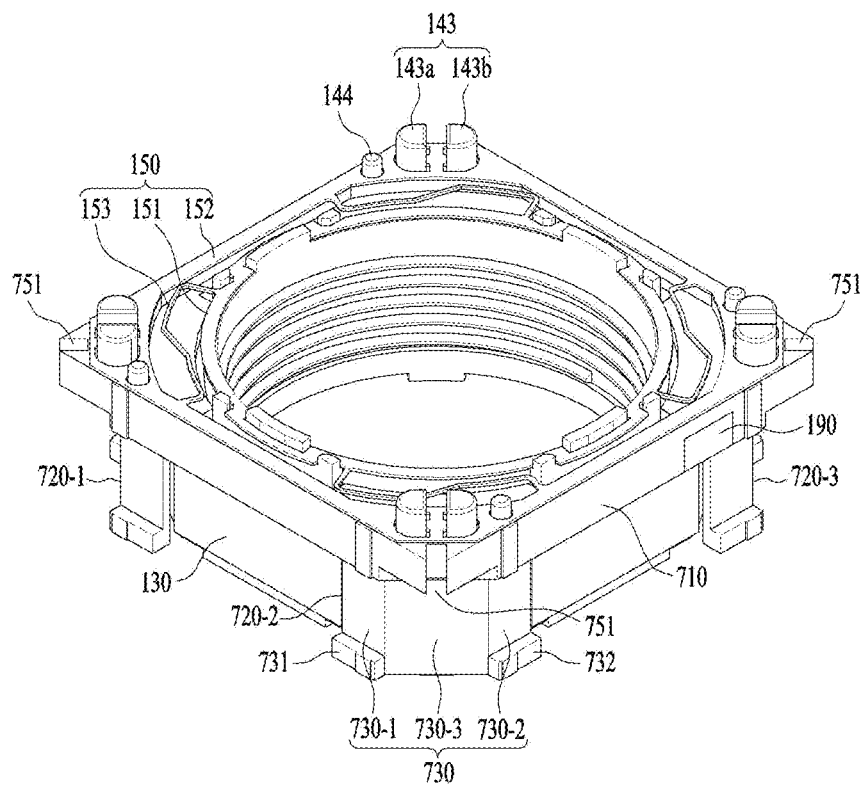
FIG. 12 is a perspective view of the bobbin, the housing, and the upper elastic member shown in FIG. 2.
Figure 13:
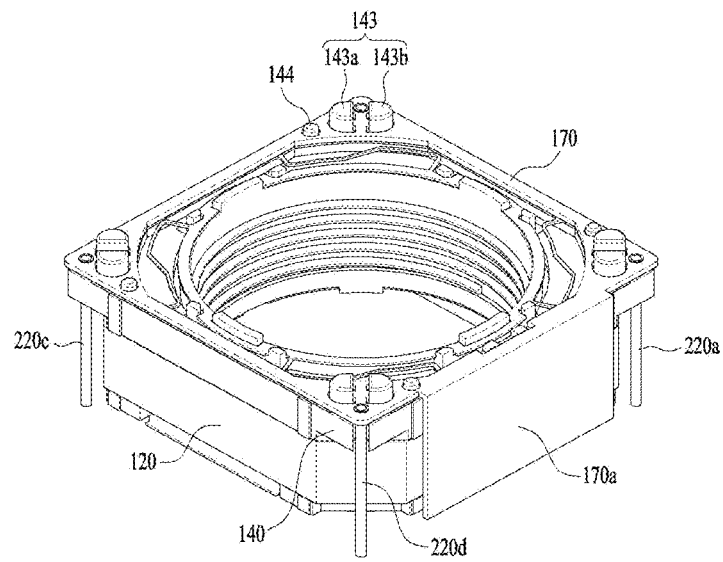
FIG. 13 is an assembled perspective view of the bobbin, the housing, the upper elastic member, and a first circuit board shown in FIG. 2.

FIG. 9 is a perspective view of the upper elastic member 150 and the lower elastic member shown in FIG. 2, FIG. 10 is an assembled perspective view of the bobbin 110 and the upper elastic member 150 shown in FIG. 2, FIG. 11 is an assembled perspective view of the bobbin 110 and the lower elastic member 160 shown in FIG. 2, FIG. 12 is a perspective view of the bobbin 110, the housing 140, and the upper elastic member 150 shown in FIG. 2, and FIG. 13 is an assembled perspective view of the bobbin 110, the housing, the upper elastic member 150, and the first circuit board 170 shown in FIG. 2.

Referring to FIGS. 9 to 13, the upper elastic member 150 and the lower elastic member 160 may be coupled to the bobbin 110 and the housing 140, respectively. For example, the upper elastic member 150 may be coupled to one end (e.g. the upper portion) of the bobbin 110 and to one end (e.g. the upper portion) of the housing 140. The lower elastic member 160 may be coupled to the other end (e.g. the lower portion) of the bobbin 110 and to the other end (e.g. the lower portion) of the housing 140.

The upper elastic member 150 and the lower elastic member 160 may elastically support the bobbin 110 such that the bobbin 110 moves upward and downward in the first direction, which is parallel to the optical axis.

The upper elastic member 150 may include an inner frame 151 coupled to the bobbin 110, an outer frame 152 coupled to the housing 140, and a connection portion 153 for connecting the inner frame 151 and the outer frame 152.

The lower elastic member 160 may include an inner frame 161 coupled to the bobbin 110, an outer frame 162 coupled to the housing 140, and a connection portion 163 for connecting the inner frame 161 and the outer frame 162. The upper elastic member 150 and the lower elastic member 160 may each be a leaf spring.

The connection portions 153 and 163 of the upper and lower elastic members 150 and 160 may be bent at least once to form a predetermined pattern.

The upward and/or downward movement of the bobbin 110 in the first direction may be elastically supported through the positional change and fine deformation of the connection portions 153 and 163. The connection portions 153 and 163 may connect the inner frames 151 and 161 and the outer frames 152 and 162 such that the inner frames 151 and 161 are elastically deformed with respect to the outer frames 152 and 162.

The inner frame 151 of the upper elastic member 150 may have a hollow corresponding to the hollow 101 of the bobbin 110 and/or the hollow 201 of the housing 140. The outer frame 152 of the upper elastic member 150 may be formed in the shape of a polygonal ring, which is disposed around the inner frame 151.

The inner frame 151 of the upper elastic member 150 may have a bent portion 151a coupled to the upper supporting protrusion 113 of the bobbin 110.

The bent portion 151a may be formed in the shape of a recess that is convex from the center of the inner frame 151 toward the outer circumferential surface of the inner frame 151.

As shown in FIG. 9, the bent portion 151a may include a first part 911, a second part 912, and a third part 913 located between the first part 911 and the second part 912.

The first and second parts 911 and 912 of the bent portion 151a of the upper elastic member 150 may be inserted between the middle protrusion 113a and the first upper protrusion 113b of the bobbin 110 and between the middle protrusion 113a and the second upper protrusion 113c of the bobbin 110, respectively. The inner circumferential surface of the third part 913 of the bent portion 151a of the upper elastic member 150 may abut on the outer circumferential surface of the middle protrusion 113a of the bobbin 110.

The upper supporting protrusion 113 of the bobbin 110 and the bent portion 151a of the upper elastic member 150 may be fixed to each other by thermal fusion or using an adhesive member such as epoxy.

The outer frame 152 of the upper elastic member 150 may be provided with a through hole 152a, into which the upper frame supporting protrusion 144 of the housing 140 is coupled. The upper frame supporting protrusion 144 of the housing 140 and the through hole 152a of the upper elastic member 150 may be fixed to each other by thermal fusion or using an adhesive member such as epoxy.

The outer frame 152 of the upper elastic member 150 may be provided with a first guide recess 153, into which the first stopper 143 of the housing 140 is coupled.

The guide recess 153 of the upper elastic member 150 may be formed at a position corresponding to the first stopper 143 of the housing 140, e.g. adjacent to a corner of the outer frame 152.

For example, the outer frame 152 of the upper elastic member 150 may be provided with first guide recesses 153a and 153b corresponding to the divided first stoppers 143a and 143b, respectively. The first guide recesses 153a and 153b may be spaced apart from each other.

The inner frame 161 of the lower elastic member 160 may have a hollow corresponding to the hollow 101 of the bobbin 110 and/or the hollow 201 of the housing 140.

The outer frame 162 of the lower elastic member 160 may be formed in the shape of a polygonal ring, which is disposed around the inner frame 161.

The lower elastic member 160 may be divided into two in order to receive power having different polarities. The lower elastic member 160 may include a first lower elastic member 160a and a second lower elastic member 160b.

The inner frame 161 and the outer frame 162 of the lower elastic member 160 may each be divided into two, which may be electrically separated from each other.

For example, each of the first and second lower elastic members 160a and 160b may include one of the two divided inner frames, one of the two divided outer frames, and a connection portion for connecting the one of the two divided inner frames and the one of the two divided outer frames.

The inner frame 161 of the lower elastic member 160 may be provided with a through hole 161a, into which the lower supporting protrusion 114 of the bobbin 110 is coupled. The lower supporting protrusion 114 of the bobbin 110 and the through hole 161a of the lower elastic member 160 may be fixed to each other by thermal fusion or using an adhesive member such as epoxy.

The outer frame 162 of the lower elastic member 160 may be provided with an insertion recess 162a, into which the lower frame supporting protrusion 145 of each of the supporting portions 720-1 to 720-4 of the housing 140 is coupled.

The lower frame supporting protrusion 145 of the housing 140 and the insertion recess 162a of the lower elastic member 160 may be fixed to each other by thermal fusion or using an adhesive member such as epoxy.

The lower elastic member 160 may be connected to the first coil 120.

The start line of the first coil 120 may be connected to the first lower elastic member 160a, and the end line of the first coil 120 may be connected to the second lower elastic member 160b.

For example, the first lower elastic member 160a may be provided at one end of the inner frame thereof with a first bonding portion 169a, to which the start line of the first coil 120 is connected by soldering. In addition, the second lower elastic member 160b may be provided at one end of the inner frame thereof with a second bonding portion 169b, to which the end line of the first coil 120 is connected.

The lower elastic member 160 is connected to the first circuit board 170. For example, the outer frames 162 of the first and second lower elastic members 160a and 160b may be provided with respective pads 165a and 165b connected to the first circuit board 170 by soldering.

The pads 165a and 165b of the lower elastic member 160 may be connected to corresponding ones selected from among first terminals 175-1 to 175-n (n being a natural number greater than 1) formed on the first terminal surface 170a of the first circuit board 170. The first coil 120 may be connected to the first circuit board 170 via the first and second lower elastic members 160a and 160b.

The bobbin 110 may be fixed to the inner frames 151 and 161 of the upper and lower elastic members 150 and 160 through coupling between the through hole 151a of the inner frame 151 of the upper elastic member 150 and the upper supporting protrusion 113 of the bobbin 110 and coupling between the through hole 161a of the inner frame 161 of the lower elastic member 160 and the lower supporting protrusion 114 of the bobbin 110.

In addition, the housing 140 may be fixed to the outer frames 152 and 162 of the upper and lower elastic members 150 and 160 through coupling between the through hole 152a of the outer frame 152 of the upper elastic member 150 and the upper frame supporting protrusion 144 of the housing 140 and coupling between the insertion recess 162a of the outer frame 162 of the lower elastic member 160 and the lower frame supporting protrusion 145 of the housing 140.

In another embodiment, the lower elastic member 160 may not be divided into two, and the upper elastic member 150 and the lower elastic member 160 may be connected to the first circuit board 170.

In this embodiment, the lower elastic member 160 is divided into two, and the upper elastic member 150 is not divided. However, the disclosure is not limited thereto. In another embodiment, the lower elastic member 160 may not be divided, the upper elastic member 150 may be divided into two, and the divided two upper elastic members may be connected to the first circuit board 170, whereby power having different polarities may be supplied to the first coil 120.

In another embodiment, the upper and lower elastic members 150 and 160 may not be divided, the start line of the first coil 120 may be connected to the upper elastic member 150, the end line of the first coil 120 may be connected to the lower elastic member 160, and the upper and lower elastic members 160 may be connected to the first circuit board 170, whereby power having different polarities may be supplied to the first coil 120.

In a further embodiment, the upper and lower elastic members 150 and 160 may not be divided, the upper and lower elastic members 150 and 160 may not be connected to the first circuit board 170, the first coil 120 may be directly connected to the second circuit board 250, and the first circuit board 170 may be connected to the second circuit board 250 via the elastic supporting members 220a to 220d, whereby power having different polarities may be supplied to the first coil 120.

Next, the first circuit board 170 will be described.

The first circuit board 170 is disposed on the upper elastic member 150.

Figure 15:
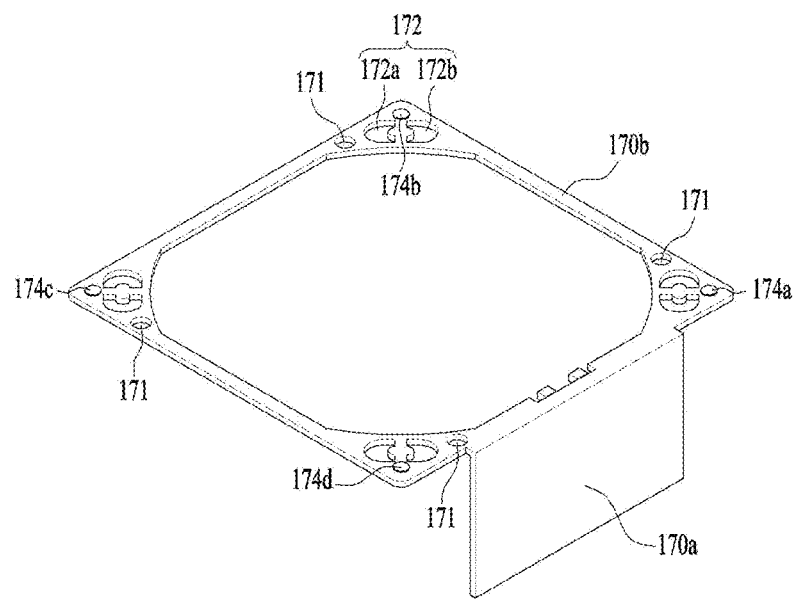
FIG. 15 is a perspective view of the first circuit board shown in FIG. 2.

FIG. 15 is a perspective view of the first circuit board 170 shown in FIG. 2.

Referring to FIG. 15, the first circuit board 170 may include a first upper surface 170b disposed on the outer frame 152 of the upper elastic member 150 and a first terminal surface 170a bent downward from the first upper surface 170b.

The first upper surface 170b of the first circuit board 170 may be formed in a shape corresponding to or coinciding with the shape of the outer frame 152 of the upper elastic member 150. The first upper surface 170b of the first circuit board 170 may contact the upper surface of the outer frame 152 of the upper elastic member 150. For example, the first upper surface 170b of the first circuit board 170 may be formed in the shape of a ring having a hollow 710-1, and the shape of the outer edge of the first upper surface 170b of the first circuit board 170 may be quadrangular.

The first circuit board 170 may be provided in the first upper surface 170b thereof with a through hole 171, into which the upper frame supporting protrusion 144 of the housing 140 is coupled. The upper frame supporting protrusion 144 of the housing 140 and the through hole 171 of the first circuit board 170 may be fixed to each other by thermal fusion or using an adhesive member such as epoxy.

The first circuit board 170 may have a second guide recess 172, into which the first stopper 143 of the housing 140 is coupled. The second guide recess 172 may be formed through the first circuit board 170.

The first stopper 143 of the housing 140 may be coupled into the first guide recess 153 of the outer frame 152 of the upper elastic member 150 and into the second guide recess 172 of the first circuit board 170.

The second guide recess 172 of the first circuit board 170 may be formed at a position corresponding to the first stopper 143 of the housing 140, e.g. adjacent to a corner of the first upper surface 170b of the first circuit board 170.

For example, the first circuit board 170 may be provided in the first upper surface 170b thereof with second guide recesses 172a and 172b corresponding to the divided first stoppers 143a and 143b, respectively. The second guide recesses 172a and 172b may be spaced apart from each other.

The first circuit board 170 may be provided in the first upper surface 170b thereof with first pads 174a to 174d, to each of which one end of a corresponding one of the elastic supporting members 220a to 220d is connected.

For example, the first pads 174a to 174d of the first circuit board 170 may be provided with recesses or through holes, into which the elastic supporting members 220a to 220d are inserted.

Each of the first pads 174a to 174d of the first circuit board 170 may be connected to one end of a corresponding one of the elastic supporting members 220a to 220d by soldering.

For example, the first pads 174a to 174d of the first circuit board 170 may be disposed between the corners of the first upper surface 170b of the first circuit board 170 and the second guide recesses 172a and 172b.

The first terminal surface 170a of the first circuit board 170 may be bent perpendicularly downward from the first upper surface 170b, and may include a plurality of first terminals or first pins 175-1 to 175-n (n being a natural number greater than 1), through which electrical signals are input from the outside.

For example, for easy connection with the first position sensor 190, the first terminal surface 170a of the first circuit board 170 may be bent toward the lateral surface of the upper end 710 of the housing 140 in which the first position sensor recess 141b is provided. Consequently, the first position sensor 190, disposed in the first position sensor recess 141b, may be in tight contact with the first terminal surface 170a of the first circuit board 170.

The terminals 175-1 to 175-n (n being a natural number greater than 1) may include terminals for receiving power from the outside and supplying the power to the first position sensor 190, a terminal for outputting the output of the first position sensor 190, and/or a terminal for testing the first position sensor 190. The number of terminals 175-1 to 175-n (n being a natural number greater than 1) formed on the first circuit board 170 may be increased or decreased depending on the kind of elements to be controlled.

The first circuit board 170 may include wires or a wire pattern for connecting the first pads 174a to 174d and the terminals 175-1 to 175-n (n being a natural number greater than 1).

The first position sensor 190 may be connected to at least one of the terminals 175-1 to 175-n (n being a natural number greater than 1) formed on the first terminal surface 170a of the first circuit board 170 by soldering. The number of terminals that are connected to the first position sensor 190 may be set depending on the type of the first position sensor 190.

In another embodiment, the first circuit board 170 and the upper elastic member 150 may be integrally formed. For example, the first circuit board 170 may be omitted, and the upper elastic member 150 may include a structure in which a thin film exhibiting heat resistance, chemical resistance, and bending resistance and a copper foil pattern for circuit wiring are stacked.

In a further embodiment, the first circuit board 170 and the lower elastic member 160 may be integrally formed. For example, the first circuit board 170 may be omitted, and the lower elastic member 160 may include a structure in which a flexible film and a copper foil pattern are stacked.

Next, the base 210, the second circuit board 250, and the second coil 230 will be described.

Figure 14:
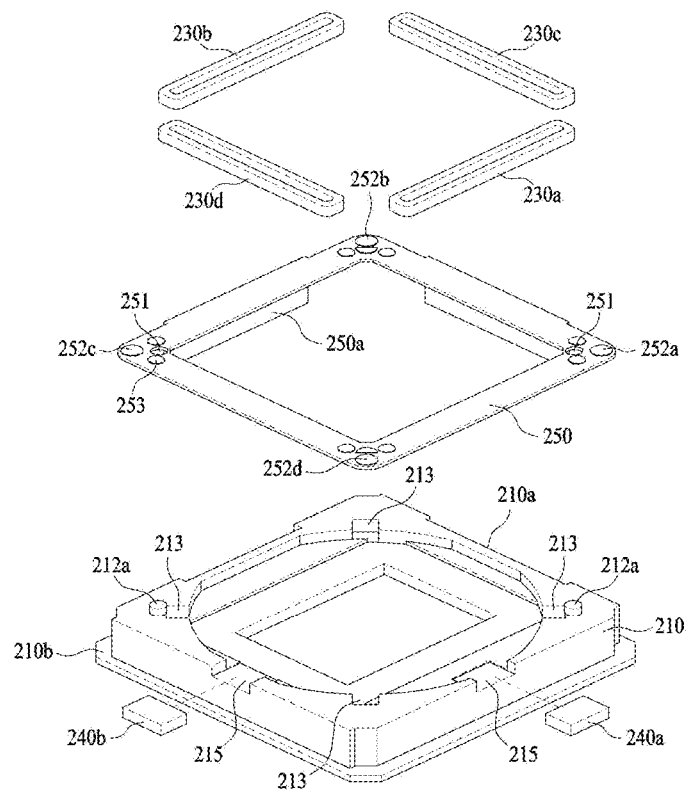
FIG. 14 is a disassembled perspective view of a base, a second circuit board, and a second coil shown in FIG. 2.

FIG. 14 is a disassembled perspective view of the base 210, the second circuit board 250, and the second coil 230 shown in FIG. 2.

Referring to FIG. 14, the base 210 may have a hollow corresponding to the hollow 101 of the bobbin 110 and/or the hollow 201 of the housing 140, and may be formed in a shape coinciding with or corresponding to the shape of the cover member 300, such as a quadrangular shape.

The base 210 may support the supporting portions 720-1 to 720-4 of the housing 140. The base 210 may have a location recess 213 formed downward (i.e. recessed) from the upper surface thereof for allowing the lower frame supporting protrusion 145 of each of the supporting portions 720-1 to 720-4 of the housing 140 to be inserted thereinto or supporting the lower frame supporting protrusion 145.

For example, the location recess 213 of the base 210 may be formed in the upper surface of the base 210 so as to correspond to a second sidewall 142 of the housing 140.

For easy insertion of the lower frame supporting protrusion 145 of the housing 140, a portion of the lateral surface of the location recess 213 may be exposed toward the hollow of the base 210. That is, the one of the lateral surfaces of the location recess 213 of the base 210 that faces the hollow of the base 210 may be open.

The lower frame supporting protrusion 145 of the housing 140 may be inserted into the location recess 213 of the base 210, and may be fixed in the location recess 213 using an adhesive member such as epoxy.

The base 210 may be provided in the lateral surface thereof with a terminal surface support recess 210a, which is recessed inward from the lateral surface by a predetermined depth in order to support a terminal surface 250a of the second circuit board 250.

The terminal surface support recess 210a may be formed in at least one of the lateral surfaces of the base 210. The terminal surface 250a of the second circuit board 250 may be located in the terminal surface support recess 210a such that the terminal surface 250a does not protrude beyond the outer edge of the base 210 or such that the extent to which the terminal surface 250a protrudes beyond the outer edge of the base 210 is adjustable.

In addition, the base 210 may have a second position sensor location recess 215a formed downward from the upper surface thereof for allowing the second position sensor 240a to be disposed therein and a third position sensor location recess 215b formed downward from the upper surface thereof for allowing the third position sensor 240b to be disposed therein.

A first imaginary line connecting the second position sensor location recess and the center of the base 210 and a second imaginary line connecting the third position sensor location recess 215b and the center of the base 210 may intersect each other, and the angle formed by the intersecting first and second imaginary lines may be 90 degrees. However, the disclosure is not limited thereto.

The second and third position sensor location recesses 215a and 215b may be exposed or open out of the lateral surface of the base 210, or may be open toward the hollow of the base 210. However, the disclosure is not limited thereto. In another embodiment, the second and third position sensor location recesses may be formed downward from the upper surface.

The second and third position sensor location recesses 215a and 215b may be located at middles of corresponding sides of the upper surface of the base 210. For example, the second and third position sensor location recesses 215a and 215b may correspond to or may be aligned with the center or the vicinity of the center of the second coil 230. The centers of the second and third position sensors 240a and 240b, disposed in the position sensor location recesses 215a and 215b, may be aligned with the center of the second coil 230. However, the disclosure is not limited thereto.

The upper surfaces of the second and third position sensors 240a and 240b, disposed in the second and third position sensor location recesses 215a and 215b, may be located in the same plane as the upper surface of the base 210. However, the disclosure is not limited thereto.

In addition, the base 210 may further include a stair 210b protruding from the lower portion of the outer edge thereof. When the base 210 and the cover member 300 are coupled to each other, the upper portion of the stair 210b of the base 210 may guide the cover member 300, and may contact the lower portion of the cover member 300. The stair 210b and the distal end of the cover may be fixed to each other and sealed using an adhesive.

The base 210 may have a coupling protrusion 212a protruding from the upper surface thereof for fixing the second circuit board 250.

The coupling protrusion 212a may be disposed in the upper surface of the base 210 adjacent to a corner of the base 210. For example, the coupling protrusion 212a may be located between the corner of the base 210 and the location recess 213. However, the disclosure is not limited thereto. Two or more coupling protrusion 212a may be provided, and may be disposed so as to face each other. However, the disclosure is not limited thereto.

A printed circuit board having an image sensor mounted thereon may be coupled to the lower surface of the base 210 to constitute a camera module.

Next, the second and third position sensors 240a and 240b will be described.

The second and third position sensors 240a and 240b are disposed under the second circuit board 250. For example, the second and third position sensors 240a and 240b may be disposed in the position sensor location recesses 215a and 215b of the base 210, respectively, and may sense the movement of the housing 140 in the second direction and/or the third direction.

The second and third position sensors 240a and 240b may sense the change of a magnetic field emitted by the magnet 130. For example, each of the second and third position sensors 240a and 240b may be a Hall sensor. However, the disclosure is not limited thereto. Any sensor capable of sensing the change of a magnetic field may be used.

The second and third position sensors 240a and 240b may be disposed so as to be aligned with the center of the second coil 230. However, the disclosure is not limited thereto.

The second and third position sensors 240a and 240b may be connected to the second circuit board 250 by soldering.

Next, the second circuit board 250 will be described.

The second coil 230 may be disposed on the upper surface of the second circuit board 250, and the position sensors 240a and 240b may be disposed on the lower surface of the second circuit board 250. The position sensors 240a and 240b, the second coil 230, and the magnet 130 may be disposed along the same axis. However, the disclosure is not limited thereto.

The second circuit board 250 may be disposed on the upper surface of the base 210, and may have a hollow corresponding to the hollow 101 of the bobbin 110, the hollow 201 of the housing 140, and/or the hollow of the base 210. The shape of the outer edge of the second circuit board 250 may be a shape coinciding with or corresponding to the shape of the upper surface of the base 210, such as a quadrangular shape.

The second circuit board 250 may have at least one second terminal surface 250a bent from the upper surface thereof. The second terminal surface 250a may be provided with a plurality of terminals or pins for receiving electrical signals from the outside.

For example, the second circuit board 250 may include second coil terminals, second and third position sensor terminals, and first circuit board terminals on the terminal surface 250a.

The second coil terminals may be terminals for receiving signals for driving second coils 230a to 230d. For example, eight second coil terminals may be provided to independently drive the four second coils 230a to 230d. Alternatively, four second coil terminals may be provided to independently drive the second-directional coils 230a and 230b and the third-directional coils 230c and 230d.

The second coil terminals may be connected to pads 253 of the second circuit board 250 via a wire pattern of the second circuit board 250.

The second position sensor terminals may include two input terminals and two output terminals, and the third position sensor terminals may include two input terminals and two output terminals. Since the second position sensor and the third position sensor may commonly use two input terminals, however, the number of second and third position sensor terminals may be six.

The first circuit board terminals may be terminals connected to the first circuit board 170. Since the first coil 120 and the first position sensor 190 are connected to the first circuit board 170, the first circuit board terminals may include terminals for the first coil 120 and the first position sensor 190.

For example, in the case in which the first position sensor 190 includes a Hall sensor and a driver for performing I2C communication, four terminals for a first power VCC, a second power GND, a synchronization clock signal SCL, and data bit information SDA may be needed.

In the case in which the first position sensor 190 is configured such that a Hall sensor and a driver are integrated, four first circuit board terminals may be provided.

For example, in the case in which the first position sensor 190 is constituted by the Hall sensor alone, four power terminals are required for the Hall sensor, and therefore four first circuit board terminals may be provided.

For example, six first circuit board terminals may be provided in the case in which the upper and lower elastic members 150 and 160 are not divided, power is supplied to the first coil 120 via the first circuit board 170, the second circuit board 250, and the elastic supporting members 220a to 220d, and the first position sensor 190 is constituted by the Hall sensor alone.

The first circuit board terminals of the second circuit board 250 may be connected to the first circuit board 170 via the elastic supporting members 220a to 220d, a description of which will follow.

The second circuit board 250 may be a flexible printed circuit board (FPCB). However, the disclosure is not limited thereto. Circuit board terminals may be formed on the surface of the base 210 using a surface electrode forming method.

The second circuit board 250 may have at least one terminal or pad, to which the start line or the end line of the second coil 230 is connected.

For example, the second circuit board 250 may include a first terminal, to which the start lines of the second-directional second coils 230a and 230b are connected, a second terminal, to which the end lines of the second-directional second coils 230a and 230b are connected, a third terminal, to which the start lines of the third-directional second coils 230c and 230d are connected, and a fourth terminal, to which the end lines of the third-directional second coils 230c and 230d are connected.

The second circuit board 250 may have a through hole 251, into which the coupling protrusion 212a of the base 210 is coupled. The circuit board 250 may have a plurality of through holes 251, which may face each other.

For example, the through hole 251 may be disposed between the first terminal and the third terminal of the second circuit board 250 and between the second terminal and the fourth terminal of the second circuit board 250.

The second circuit board 250 may have second pads 252a to 252d, to each of which one end of a corresponding one of the elastic supporting members 220a to 220d is connected. For example, the second pads 252a to 252d may be provided with recesses or through holes, into which ends of the elastic supporting members 220a to 220d are inserted.

The second pads 252a to 252d may be disposed adjacent to the corners of the second circuit board 250. However, the disclosure is not limited thereto.

The second pads 252a to 252d may be connected to a plurality of pins provided on terminal surfaces 251a and 251b via a wire pattern formed on the second circuit board 250.

Next, the second coil 230 will be described.

The second coils 230a to 230d are disposed on the upper surface of the second circuit board 250 so as to correspond to or be opposite the magnets 130.

In FIG. 14, the second coils 230a to 230d are disposed on the upper surface of the second circuit board 250. However, the disclosure is not limited thereto. In another embodiment, the coils may be included in a circuit board other than the second circuit board 250. The coils may be disposed so as to be in tight contact with the base 210, or may be disposed so as to be spaced apart from the base 210 by a predetermined distance.

The second coils 230a to 230d may be aligned with the magnets 130 on the same axis. However, the disclosure is not limited thereto. In another embodiment, the second coils 230a to 230d may be disposed so as to be spaced apart from an imaginary central axis passing through the hollow 101 of the bobbin and the hollow 201 of the housing 140 by a distance greater than or equal to the distance from the magnets 130.

Four second coils 230a to 230d may be mounted on the upper surface of the second circuit board 250 at intervals. For example, the second coils 230a to 230d may include second-directional second coils 230a and 230b aligned so as to be parallel to the second direction and third-directional second coils 230c and 230d aligned so as to be parallel to the third direction.

In another embodiment, the second coils may include one second-directional second coil and one third-directional second coil. In a further embodiment, the second coils may include three or more second-directional second coils and three or more third-directional second coils.

In addition, the second coils 230a to 230d may be wound in the shape of a ring or a donut, and may be connected to the second circuit board 250.

For example, the second coils 230a to 230d may be connected to the terminals of the second circuit board 250.

Next, the elastic supporting members 220a to 220d will be described.

The elastic supporting members 220a to 220d connect the first circuit board 170 and the second circuit board 250.

A first upper surface of the first circuit board 170 may include at least one first corner region, and a second upper surface of the second circuit board 250 may include at least one second corner region corresponding to the first corner region. At least one of the elastic supporting members 220a to 220d may be disposed between the first corner region and the second corner region.

The first corner region may be a region within a predetermined distance from the corner of the first upper surface of the first circuit board 170, and the second corner region may be a region within a predetermined distance from the second upper surface of the second circuit board 250.

For example, the first pads 174a to 174d may be provided at the first corner region of the first circuit board 170, and the second pads 252a to 252d may be provided at the second corner region of the second circuit board 250.

For example, one end of each of the elastic supporting members 220a to 220d may be connected to a corresponding one of the first pads 174a to 174d of the first circuit board 170, and the other end of each of the elastic supporting members 220a to 220d may be connected to a corresponding one of the second pads 252a to 252d of the second circuit board 250. In addition, the second pads 252a to 252d of the second circuit board 250 may be connected to the first circuit board terminals provided on the terminal surface 250a via the wire pattern of the second circuit board 250.

The lens moving apparatus of FIG. 2 may include elastic supporting members 220a to 220d that face each other. In FIG. 13, the first corner region of the first circuit board 170 and the second corner region of the second circuit board 250 may be connected to each other via a single elastic supporting member.

The elastic supporting members 220a to 220d may be disposed in point symmetry with respect to the center of the housing 140 or the center of the hollow 201 of the housing 140 in the second and third directions, which are perpendicular to the first direction.

The number of elastic supporting members 220a to 220d may be greater than or equal to the number of first circuit board terminals.

For example, in the case in which the first position sensor 190 is configured such that the Hall sensor and the driver are integrated, the number of elastic supporting members 220a to 220d may be four. In addition, in the case in which the first position sensor 190 is constituted by the Hall sensor alone, the number of elastic supporting members 220a to 220d may be six.

The second pads 252a to 252d of the second circuit board 250 may be connected to the first circuit board terminals formed on the second terminal surface 250a of the second circuit board 250.

The elastic supporting members 220a to 220d may serve as paths through which an electrical signal is transferred between the second circuit board 250 and the first circuit board 170. The elastic supporting members 220a to 220d may elastically support the housing 140 with respect to the base 210.

The elastic supporting members 220a to 220d may be formed separately from the upper elastic member 150. For example, leaf springs, coil springs, or suspension wires may be used as the elastic supporting members 220a to 220d. In another embodiment, the elastic supporting members 220a to 220d may be formed integrally with the upper elastic member 150.

Figure 18:
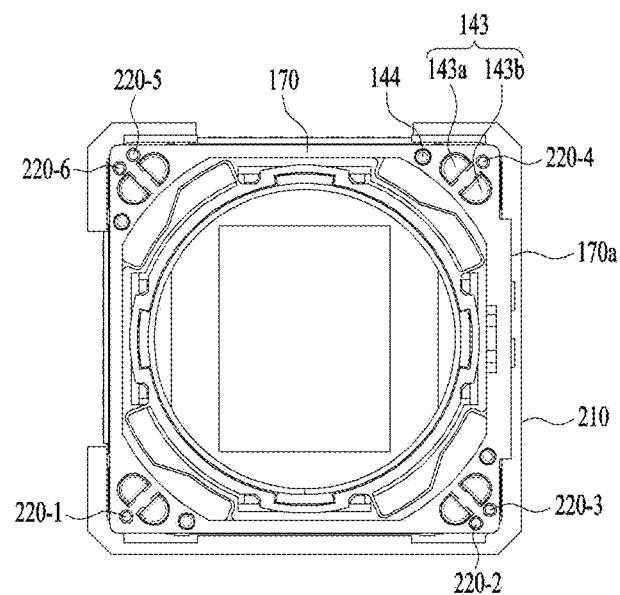
FIG. 18 is a plan view of a lens moving apparatus according to another embodiment.
Figure 19:
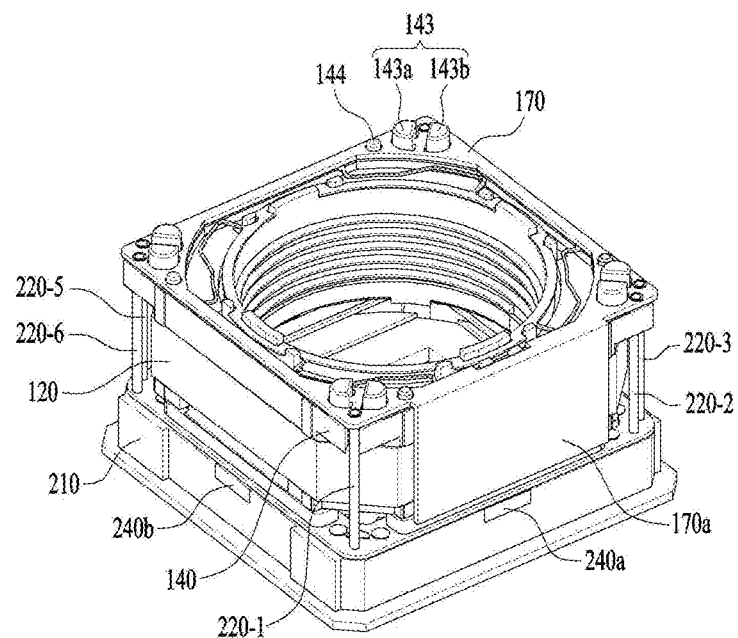
FIG. 19 is a perspective view of the lens moving apparatus shown in FIG. 18.

FIG. 18 is a plan view of a lens moving apparatus according to another embodiment, and FIG. 19 is a perspective view of the lens moving apparatus shown in FIG. 18. A cover member 300 is omitted from FIGS. 18 and 19.

Referring to FIGS. 18 and 19, the number of elastic supporting members 220-1 to 220-6 shown in FIG. 19 may be six, whereas the lens moving apparatus 100 shown in FIG. 2 includes four elastic supporting members. Except for the number of elastic supporting members, the description of the lens moving apparatus 100 shown in FIG. 2 may be equally applied to the embodiment shown in FIG. 18.

The elastic supporting members 220-1 to 220-6 may be disposed in point symmetry with respect to the center of the housing 140 or the center of the hollow 201 of the housing 140 in the second and third directions perpendicular to the first direction.

For example, the elastic supporting members 220-1 to 220-6 may include first elastic supporting members 220-1 and 220-4 disposed in point symmetry with respect to the center of the housing 140 or the center of the hollow 201 of the housing 140 in the second direction, perpendicular to the first direction, and second elastic supporting members 220-2, 220-3, 220-5, and 220-6 disposed in point symmetry with respect to the center of the housing 140 in the third direction, perpendicular to the first and second directions.

The number of first elastic supporting members 220-1 and 220-4 and the number of second elastic supporting members 220-2, 220-3, 220-5, and 220-6 may be different from each other. For example, the number of second elastic supporting members 220-2, 220-3, 220-5, and 220-6 may be greater than the number of first elastic supporting members 220-1 and 220-4.

The sum of elastic forces of the first elastic supporting members 220-1 and 220-4 with respect to the bobbin 110 and the sum of elastic forces of the second elastic supporting members 220-2, 220-3, 220-5, and 220-6 with respect to the bobbin 110 may be equal such that elastic forces of the elastic supporting members 220-1 to 220-6 with respect to the bobbin 110 in the second direction and the third direction are symmetrical or equal.

For example, since the number of second elastic supporting members 220-2, 220-3, 220-5, and 220-6 is greater than the number of first elastic supporting members 220-1 and 220-4, the modulus of elasticity of each of the second elastic supporting members 220-2, 220-3, 220-5, and 220-6 may be half the modulus of elasticity of each of the first elastic supporting members 220-1 and 220-4.

Figure 20:
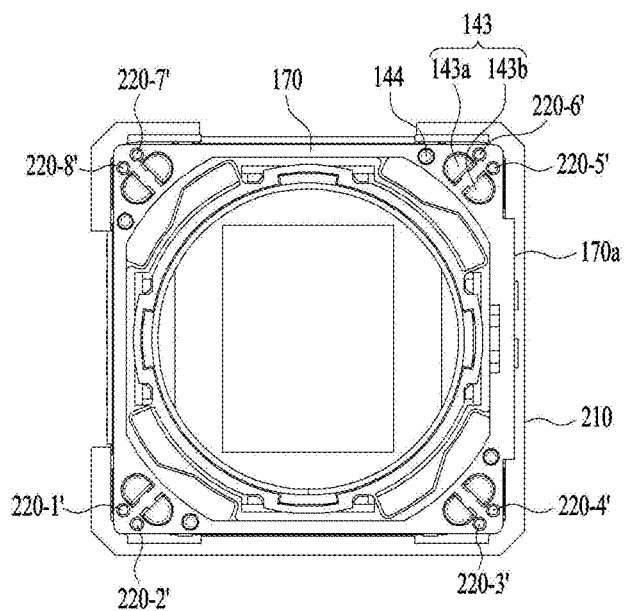
FIG. 20 is a plan view of a lens moving apparatus according to another embodiment.
Figure 21:
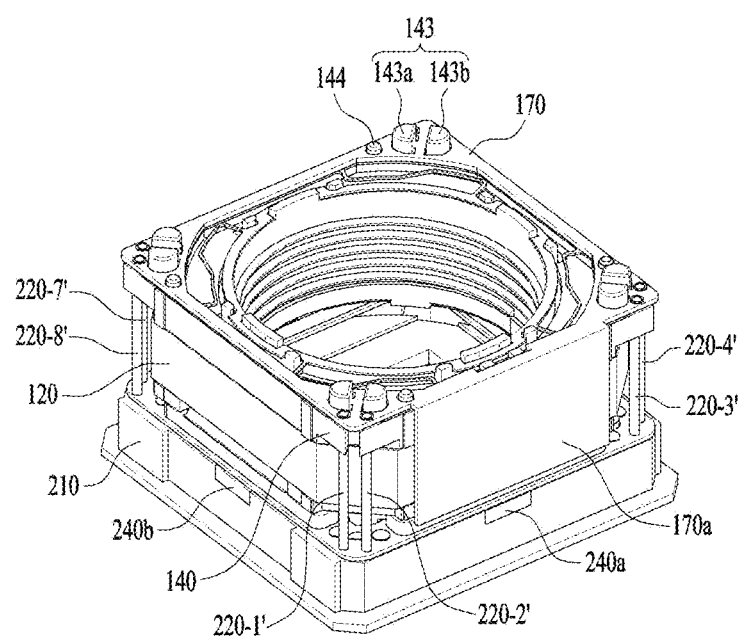
FIG. 21 is a perspective view of the lens moving apparatus shown in FIG. 20.

FIG. 20 is a plan view of a lens moving apparatus according to another embodiment, and FIG. 21 is a perspective view of the lens moving apparatus shown in FIG. 20. A cover member 300 is omitted from FIGS. 20 and 21. Except for the number of elastic supporting members, the description of the lens moving apparatus 100 shown in FIG. 2 may be equally applied to the embodiment shown in FIG. 20.

Referring to FIGS. 20 and 21, the number of elastic supporting members 220-1' to 220-8' may be eight. The elastic supporting members 220-1' to 220-8' may include first elastic supporting members 220-1', 220-2', 220-5', and 220-6' disposed in point symmetry with respect to the center of the housing 140 in the second direction, perpendicular to the first direction, and second elastic supporting members 220-3', 220-4', 220-7', and 220-8' disposed in point symmetry with respect to the center of the housing 140 in the third direction, perpendicular to the first and second directions.

The number of first elastic supporting members 220-1' 220-2', 220-5', and 220-6' and the number of second elastic supporting members 220-3', 220-4', 220-7', and 220-8' may be equal. At least one of the first and second elastic supporting members 220-1' to 220-8' may connect the first circuit board 170 and the second circuit board 250. In addition, the first and second elastic supporting members 220-1' to 220-8' may have the same modulus of elasticity.

Figure 22:
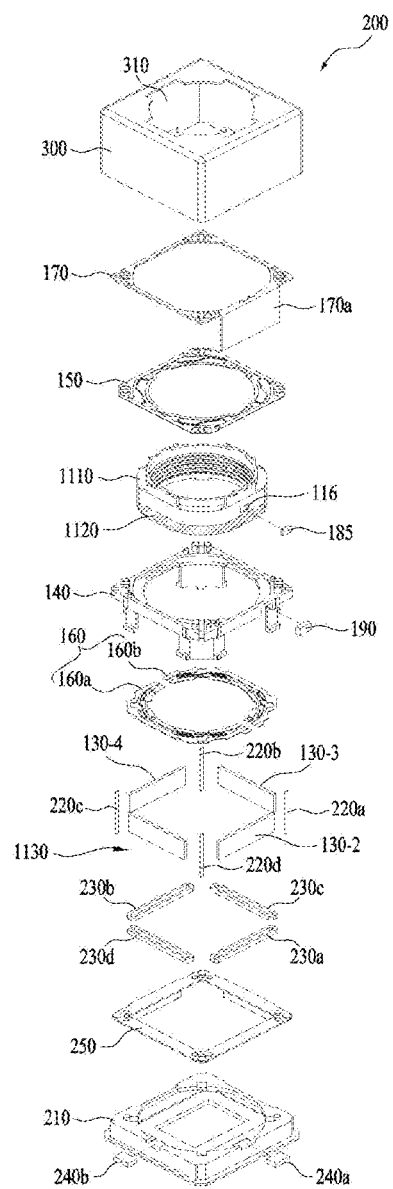
FIG. 22 is an exploded perspective view of a lens moving apparatus according to another embodiment.
Figure 23:
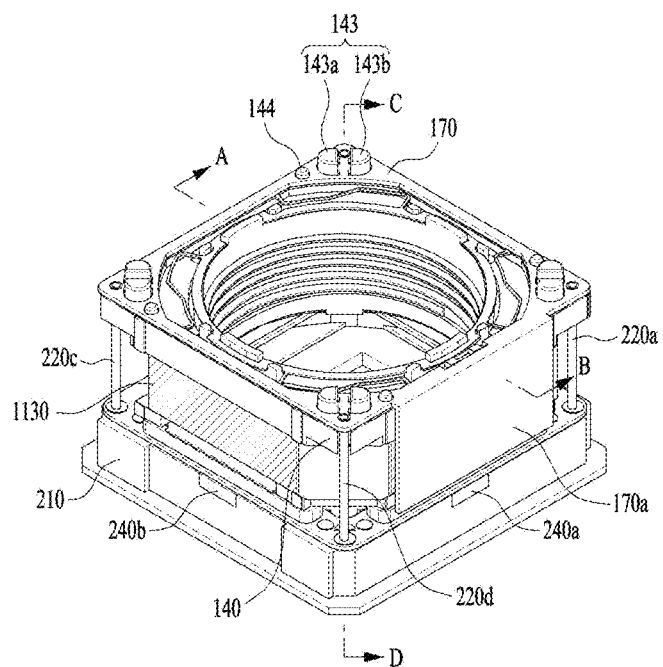
FIG. 23 is an assembled perspective view of the lens moving apparatus shown in FIG. 22, from which a cover member is removed.

FIG. 22 is an exploded perspective view of a lens moving apparatus 200 according to another embodiment, and FIG. 23 is an assembled perspective view of the lens moving apparatus 200 shown in FIG. 22, from which a cover member 300 is removed. Elements of the lens moving apparatus identical to those of the lens moving apparatus shown in FIGS. 2 and 3 are denoted by the same reference numerals, and a description thereof will be given briefly or omitted.

Referring to FIGS. 22 and 23, the lens moving apparatus 200 includes a cover member 300, an upper elastic member 150, a bobbin 1110, a first coil 1120, a housing 140, a first magnet 1130, a lower elastic member 160, elastic supporting members 220a to 220d, a first position sensor 190, a second magnet 185, a second coil 230, a second circuit board 250, a base 210, and second and third position sensors 240a and 240b.

The lens moving apparatus 200 of FIG. 22 may include the first magnet 1130 for driving and the second magnet 185 for sensing, whereas the lens moving apparatus 100 of FIG. 2 includes only the magnet 130 for driving.

In addition, the first magnet 1130 of the lens moving apparatus 200 may be disposed on the housing 140, whereas the driving magnet 130 of the lens moving apparatus 100 is disposed on the outer circumferential surface of the bobbin 1110.

In addition, the first coil 1120 of the lens moving apparatus 200 may be disposed on the outer circumferential surface of the bobbin 1110, whereas the first coil 120 of the lens moving apparatus 100 is disposed on the housing 140.

Figure 24:
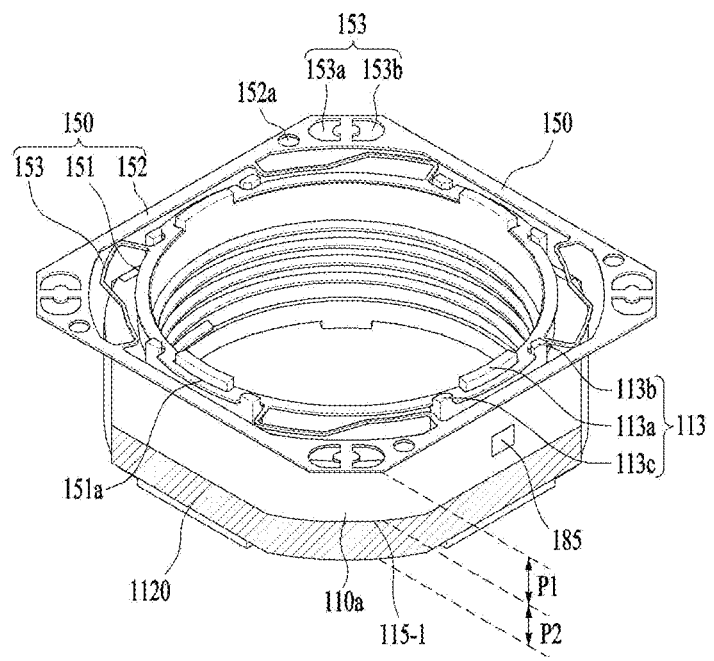
FIG. 24 is an assembled perspective view of an upper elastic member, a second magnet, and a bobbin shown in FIG. 22.

FIG. 24 is an assembled perspective view of the upper elastic member 150, the second magnet 185, and the bobbin 1110 shown in FIG. 22.

Referring to FIGS. 22 to 24, a magnet location recess 116 having a size corresponding to that of the second magnet 185 may be provided in the outer circumferential surface of the bobbin 1110.

The position of the magnet location recess 116 may be set depending on the position of the second magnet 185 and the position of the first coil 1120.

For example, in the case in which the first coil 1120 is located on a first region P1 of the outer circumferential surface of the bobbin 1110, the magnet location recess 116 may be located in a second region P2 of the outer circumferential surface 110a of the bobbin 1110. On the other hand, in the case in which the first coil 1120 is located on the second region P2 of the outer circumferential surface 110a of the bobbin 1110, the magnet location recess 116 may be located in the first region P1 of the outer circumferential surface 110a of the bobbin 1110.

Here, the first region P1 of the outer circumferential surface 110a of the bobbin 1110 may be a region under a reference line 115-1 of the outer circumferential surface 110a of the bobbin 1110, and the second region P2 of the outer circumferential surface 110a of the bobbin 1110 may be a region above the reference line 115-1 of the outer circumferential surface 110a of the bobbin 1110. The reference line 115-1 of the outer circumferential surface 110a of the bobbin 1110 may be a line spaced apart from the lower end of the outer circumferential surface 110a of the bobbin 1110 by a reference distance, and the reference distance may be ⅔ to ½ the distance between the upper and lower ends of the outer circumferential surface 110a of the bobbin 1110. However, the disclosure is not limited thereto.

The second magnet 185 will be described.

The second magnet 185 may sense or determine the displacement value (or the position) of the bobbin 1110 in the first direction together with the first position sensor 190. The second magnet 185 may be divided into two in order to increase the intensity of a magnetic field. However, the disclosure is not limited thereto.

The second magnet 185 may be disposed on the outer circumferential surface of the bobbin 1110 in the direction perpendicular to the optical axis so as not to overlap the first coil 1120.

The second magnet 185 may be disposed in the magnet location recess 116 formed in the outer circumferential surface 110a of the bobbin 1110. The magnet location recess 116 may be located as described above, whereby the second magnet 185 may not overlap the first coil 1120 in the direction perpendicular to the optical axis.

The second magnet 185 may be fixed in the magnet location recess 116 using an adhesive member such as epoxy. However, the disclosure is not limited thereto. The second magnet 185 may be fixed in the magnet location recess 116 by fitting.

In this embodiment, the second magnet 185 is disposed on the outer circumferential surface 110a of the bobbin 1110, and the first position sensor 190 is disposed on the outer circumferential surface of the housing 140. However, the disclosure is not limited thereto.

For example, In another embodiment, the first position sensor 190 may be disposed on the bobbin 1110, and the second magnet 185 may be disposed on the housing 140. In this case, a surface electrode (not shown) may be formed on the outer circumferential surface of the bobbin 1110, and current may be supplied to the first position sensor 190 via the surface electrode (not shown).

The first coil 1120 is disposed on the outer circumferential surface 110a of the bobbin 1110. For example, the first coil 1120 may be disposed on the first region P1 of the outer circumferential surface 110a of the bobbin 1110 so as not to overlap the second magnet 185.

The first coil 1120 may be wound so as to surround the outer circumferential surface of the bobbin 1110 in the rotational direction about the optical axis.

In another embodiment, the first coil 1120 may include a plurality of coil blocks, each of which may be formed in a ring shape. Each of the coil blocks may be disposed on a corresponding one of first surfaces 115a. Each of the coil blocks may be formed in a polygonal shape, such as an octagonal shape or a circular shape. For example, the ring shape of each of the coil blocks may be configured such that at least four surfaces are flat and corner parts connecting the four surfaces are round or flat.

As shown in FIG. 24, the first coil 1120 may be disposed under the second magnet 185 such that the first coil 1120 and the second magnet 185 do not overlap each other in the direction perpendicular to the optical axis or in the horizontal direction.

Figure 25:
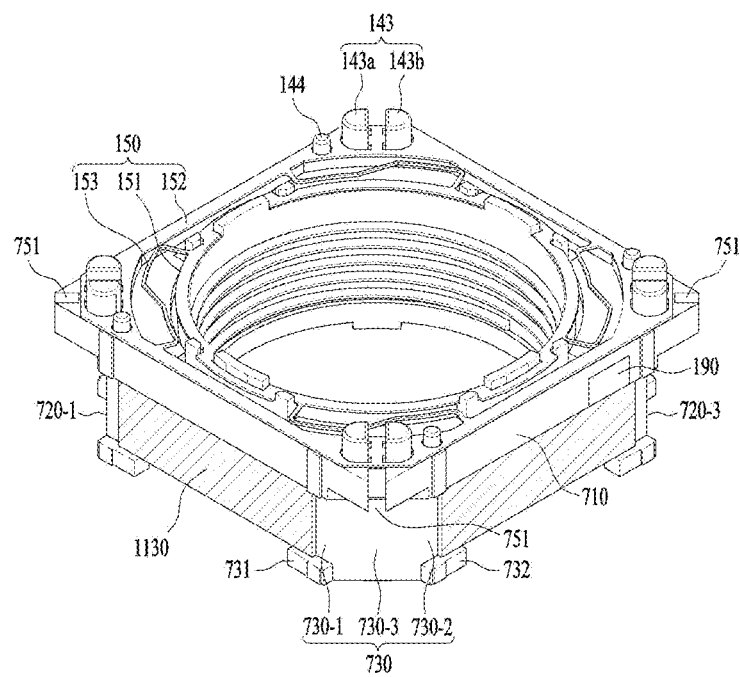
FIG. 25 is a perspective view of the upper elastic member, which is coupled to a housing, to which the bobbin and a first magnet shown in FIG. 22 are mounted.

FIG. 25 is a perspective view of the upper elastic member 150, which is coupled to the housing 140, to which the bobbin 1110 and the first magnet 1130 shown in FIG. 22 are mounted.

Referring to FIGS. 22 to 25, the first magnet 1130 is disposed on the outer circumferential surface of the housing so as to correspond to the first coil 1120. For example, the first magnet 1130 may be disposed on the supporting portions 720-1 to 720-4 of the housing 140. For example, the first magnet 1130 may be disposed on the first and second lateral surfaces 720-1 and 720-2 of the supporting portions 720-1 to 720-4.

The first magnet 1130 may be fixed to the supporting portions 720-1 to 720-4 of the housing 140 using an adhesive or an adhesive member such as a double-sided tape.

One or more first magnets 1130 may be provided. For example, four first magnets may be disposed on the first and second lateral surfaces 720-1 and 720-2 of the supporting portions 720-1 to 720-4 of the housing 140 at intervals.

Except for the difference from the lens moving apparatus shown in FIG. 2 in terms of the bobbin 1110, the first coil 1120, the first magnet 1130, and the second magnet 185, the description of the lens moving apparatus 100 shown in FIG. 2 may be equally applied to the embodiment 200 shown in FIG. 22.

Figure 26:
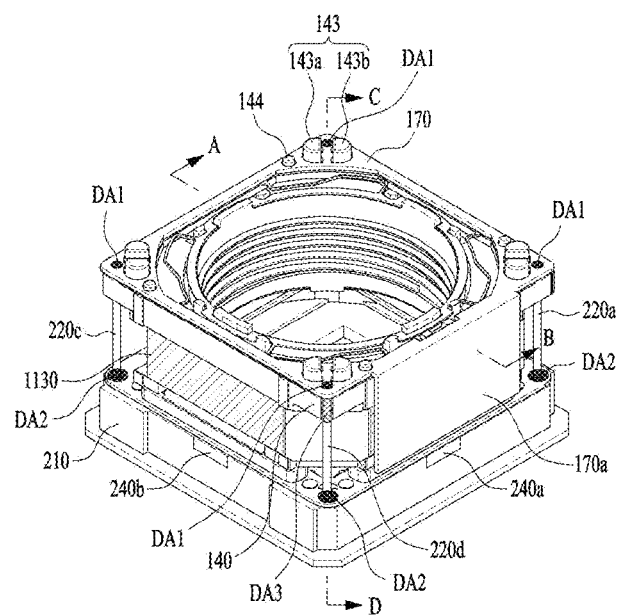
FIG. 26 is a perspective view of a lens moving apparatus according to another embodiment.

FIG. 26 is a perspective view of a lens moving apparatus according to another embodiment. A cover member 300 is omitted from the lens moving apparatus shown in FIG. 26.

When compared with the embodiment 200 shown in FIG. 23, the embodiment shown in FIG. 26 may further include a first damper DA1, a second damper DA2, and a third damper DA3. In another embodiment, one or two selected from among the first damper DA1, the second damper DA2, and the third damper DA3 may be included.

The first damper DA1 may be provided on a part where one end of each of the elastic supporting members 220a to 220d is connected to the first circuit board 170. For example, the first damper DA1 may be applied to a part where one end of each of the elastic supporting members 220a to 220d is bonded to a corresponding one of the first pads 174a to 174d of the first circuit board 170.

The second damper DA2 may be provided on a part where the other end of each of the elastic supporting members 220a to 220d is bonded to the second circuit board 250. For example, the second damper DA2 may be applied to a part where the other end of each of the elastic supporting members 220a to 220d is bonded to a corresponding one of the second pads 252a to 252d of the second circuit board 250.

The third damper DA3 may be provided between each of the through recesses 751 of the housing 140 and a corresponding one of the elastic supporting members 220a to 220d inserted into the through recess 751. The dampers DA1 to DA3 may inhibit the occurrence of an oscillation phenomenon during the movement of the bobbin 1110.

Figure 27:
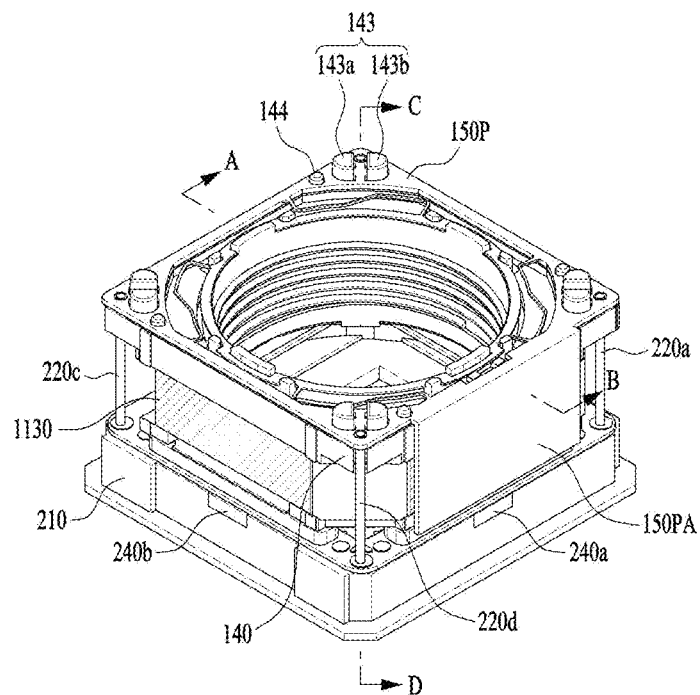
FIG. 27 is a perspective view of a lens moving apparatus according to another embodiment.

FIG. 27 is a perspective view of a lens moving apparatus according to another embodiment. A cover member 300 is omitted from the lens moving apparatus shown in FIG. 27.

An upper elastic member 150P shown in FIG. 27 may be formed by integrating the upper elastic member 150 and the first circuit board 170 shown in FIG. 2 or 22.

The upper elastic member 150P shown in FIG. 27 may include an inner frame 151 serving as an elastic supporter, an outer frame 152, and a connection portion 153. The shape of the upper elastic member 150P may be the same as the shape of the upper elastic member 150.

The upper elastic member 150P shown in FIG. 27 may include a circuit pattern connected to one end of each of the elastic supporting members 220a to 220d. For example, wires, each of which is connected to one end of a corresponding one of the elastic supporting members 220a to 220d, may be formed on the outer frame 152 of the upper elastic member 150P.

In addition, the upper elastic member 150P may have a terminal surface 150PA bent downward from one end of the outer frame 152. The terminal surface 150PA of the upper elastic member 150P may include a plurality of terminals or pins for receiving electrical signals from the outside. The terminal surface of the upper elastic member 150P may perform the same function as the first terminal surface 170a of the first circuit board 170.

Figure 28:
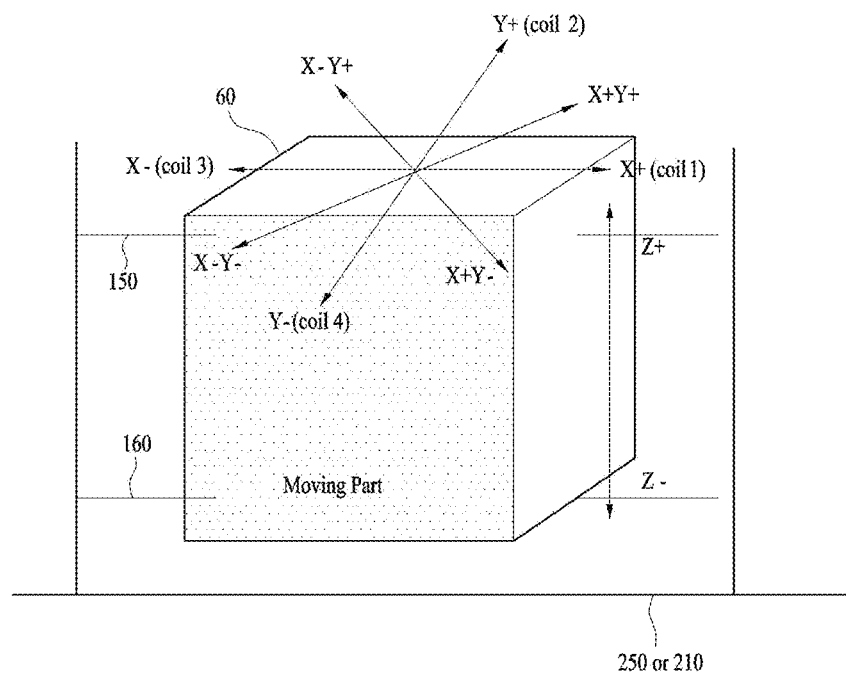
FIG. 28 is a conceptual view illustrating auto focusing and optical image stabilization of the lens moving apparatus according to the embodiment.

FIG. 28 is a conceptual view illustrating auto focusing and optical image stabilization of the lens moving apparatus 100 or 200 according to the embodiment. Coil 1 may be a second coil 230a, coil 2 may be a second coil 230b, coil 3 may be a second coil 230c, and coil 4 may be a second coil 230d.

Referring to FIG. 28, a moving part 60 may be located above the second circuit board 250 and the base 210 so as to be spaced apart from the second circuit board 250 and the base 210 at the initial position thereof.

The initial position may be a position where the moving part 60 is located when the upper and lower elastic members 150 and 160 are elastically deformed only by the weight of the moving part 60.

For example, the initial position may be set to a movement distance that compensates for about 0.5 to 1.5 degrees. When converting the initial position into the focal distance of the lens, the initial position may be a position of the moving part 60 at which the focal distance of the lens becomes about 50 nm to 150 um.

The AF moving part 60 may include the bobbin 110 or 1110 and elements mounted to the bobbin 110 or 1110. An AF stationary part may include the housing 140 and elements mounted to the housing 140.

For example, in FIG. 2, the AF moving part 60 may include the magnet 130, the bobbin 110, and the lens (not shown) mounted to the bobbin 110, and the AF stationary part may include the housing 140, the cover member 300, the base 210, the second coils 230a to 230d, and the second circuit board 250.

Alternatively, in FIG. 22, the AF moving part 60 may include the bobbin 1110, the first coil 1120, and the second magnet 185, and the AF stationary part may include the housing 140, the first magnet 1130, the cover member 300, the base 210, the second coils 230a to 230d, and the second circuit board 250.

In addition, in FIG. 2, an OIS moving part for optical image stabilization may include the AF moving part, the upper and lower elastic members 150 and 160, the first circuit board 170, and the first position sensor 190, and an OIS stationary part may include the housing 140, the cover member 300, the base 210, the second circuit board 250, and the second coils 230a to 230d.

In FIG. 22, the OIS moving part may include the AF moving part, the upper and lower elastic members 150 and 160, the first circuit board 170, and the first position sensor 190, and the OIS stationary part may include the housing 140, the cover member 300, the base 210, and the second coils 230a to 230d.

AF operation serves to move the moving part in the first direction, e.g. in the upward direction (the positive Z-axis direction) and the downward direction (the negative Z-axis direction), from the initial position using electromagnetic force between the magnet 130 or 1130 and the first coil 120 or 1120. For example, the direction of current flowing in the first coil 120 or 1120 may be controlled to perform auto focusing. As a result, it is possible to miniaturize the embodiment and to move the moving part 60 to a desired position using small electromagnetic force.

For example, the bobbin 110 and the base 210 may be spaced apart from each other in order to perform auto focusing upward and downward on the basis of the initial position.

OIS operation serves to move the moving part in the negative X-axis direction, the positive X-axis direction, the negative Y-axis direction, or the positive Y-axis direction based on a value measured by a gyro sensor using electromagnetic force generated between the magnet 130 or 1130 and the second coils 230a to 230d.

For OIS operation, the four second coils 230a to 230d may be independently driven. For example, the directions of current flowing in the four second coils 230a to 230d may be independently controlled to move the moving part 60 along the X axis and/or the Y axis. As a result, image correction may be performed regardless of the direction.

FIG. 29 is a view showing the direction in which a moving part 60 moves under the control of the second coils 230a to 230d according to a first embodiment.

Referring to FIG. 29, in the table, 0 may indicate that each of the coils is not driven, and 1 may indicate that each of the coils is driven. For example, 0 may indicate that no current is supplied to each of the coils, and 1 may indicate that current is supplied to each of the second coils such that electromagnetic force is applied from the moving part 60 toward the second coil.

Referring to FIG. 29, as the four second coils 230a to 230d are driven independently, the moving part 60 may move in one direction selected from among the positive X-axis direction, the negative X-axis direction, the positive Y-axis direction, the negative Y-axis direction, the positive X-axis and positive Y-axis direction, the negative X-axis and positive Y-axis direction, the positive X-axis and negative Y-axis direction, and the negative X-axis and negative Y-axis direction, or may not move in the X-axis direction or in the Y-axis direction.

In addition, as the first coil 120 and the second coils 230a to 230d are driven simultaneously, the auto focusing and OIS operations may be performed simultaneously. For example, the level of the signals provided to the first coil 120 and the second coils 230a to 230d may be adjusted to simultaneously perform the auto focusing and OIS operations.

FIG. 30 is a view showing the direction in which the moving part 60 moves under the control of the second coils 230a to 230d according to a second embodiment.

Referring to FIG. 30, two facing second coils 230a and 230b may be connected to each other, two facing second coils 230c and 230d may be connected to each other, and the two pairs of second coils 230a and 230b and 230c and 230d may be driven independently. 0 may indicate that the coils are not driven, and + (positive) and − (negative) may indicate that the coils are driven in opposite directions.

When compared with FIG. 29, higher force may be applied to the moving part 60, since two second coils are connected to each other in FIG. 30. In addition, as the first coil 120 and the second coils 230a to 230d are driven simultaneously, the auto focusing and OIS operations may be performed simultaneously. For example, the level of the signals provided to the first coil 120 and the second coils 230a to 230d may be adjusted to simultaneously perform the auto focusing and OIS operations.

Figure 31:
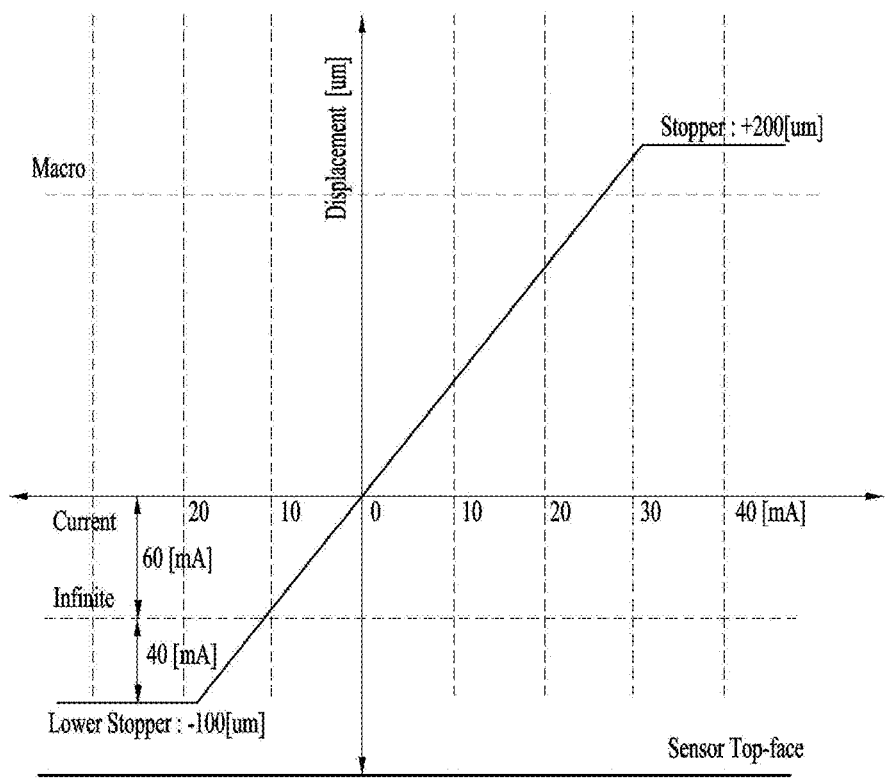
FIG. 31 is a view showing the position of the moving part based on the intensity of current supplied to the first coil.

FIG. 31 is a view showing the position of the moving part 60 based on the intensity of current supplied to the first coil 120.

Referring to FIG. 31, the intensity and direction of current supplied to the first coil 120 may be controlled to move the moving part 60 upward and downward from the initial position 0. For example, the upward movement distance (e.g. 200 µm) of the moving part 60 from the initial position 0 may be greater than the downward movement distance (e.g. 100 µm) of the moving part 60 from the initial position 0. In this case, the consumption of current and voltage in a region of 50 cm or more, which is the most frequently used region, is minimized. Here, the upward movement distance may be the distance from the initial position 0 to an upper stopper of the moving part 60, and the downward movement distance may be the distance from the initial position 0 to a lower stopper of the moving part 60.

A camera module according to an embodiment may include the lens moving apparatus 100 or 200, a lens barrel coupled to the bobbin 110 or 1110, an image sensor, and a printed circuit board. The image sensor may be mounted on the printed circuit board. The printed circuit board may define the bottom surface of the camera module.

The camera module according to the embodiment may further include an infrared cut-off filter disposed on one region of the base corresponding to the image sensor. The base 210 may be provided with an additional terminal member for energizing the printed circuit board of the camera module. The terminal may be integrally formed with the base 210 using a surface electrode. Meanwhile, the base 210 may perform a sensor holder function of protecting the image sensor. In this case, a protrusion for protecting the image sensor may be formed along the lateral surface of the base 210 so as to extend downward. However, the protrusion is not an indispensable element. In another embodiment, a separate sensor holder for protecting the image sensor may be disposed at the lower portion of the base 210.

In addition, the camera module according to the embodiment may further include a focus controller for controlling the focus of the lens. For the sake of convenience, the focus controller is described with reference to the above-described lens moving apparatus 100 or 200. However, the disclosure is not limited thereto. That is, the focus controller according to the embodiment may be applied to a lens moving apparatus having a configuration different from the above-described lens moving apparatus in order to perform an auto focusing function.

FIGS. 32A to 32D are views showing a driving algorithm for auto focusing according to an embodiment.

Figure 32A:
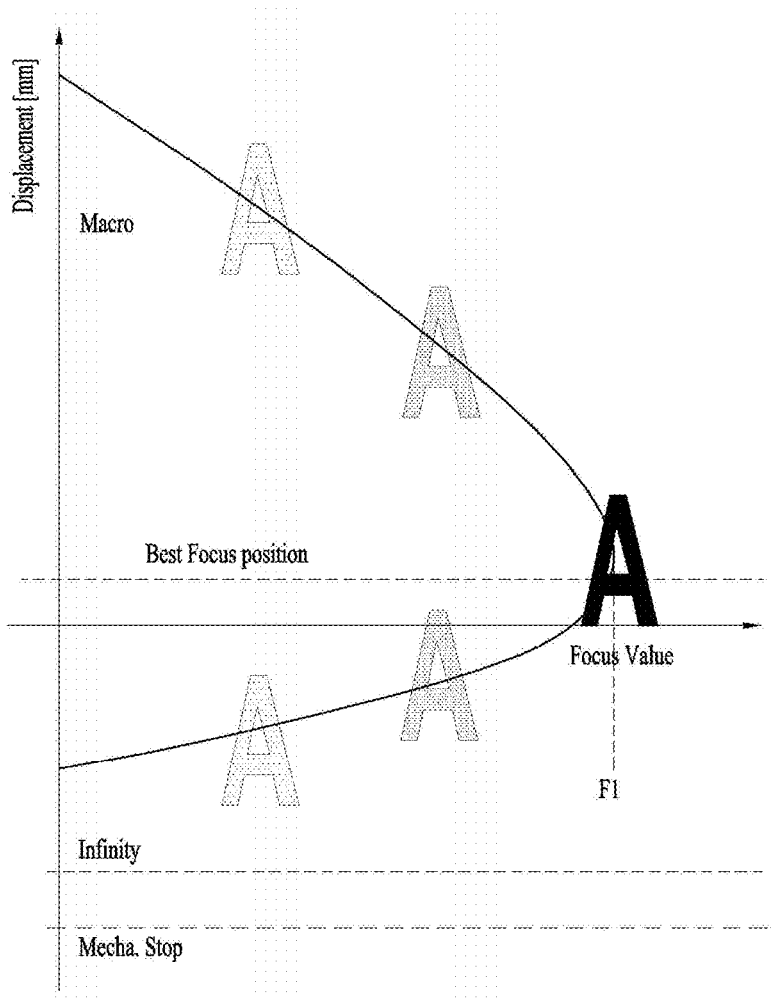
FIGS. 32A to 32D are views showing a driving algorithm for auto focusing according to an embodiment.
Figure 32B:
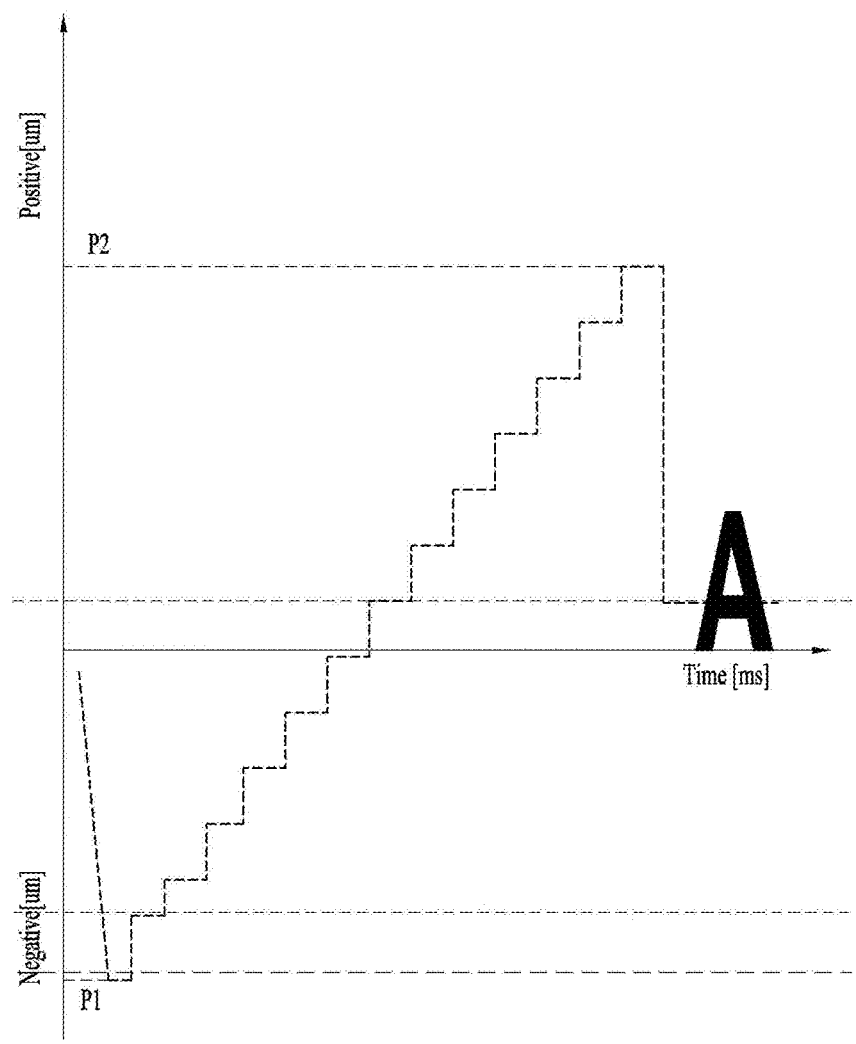
Figure 32C:
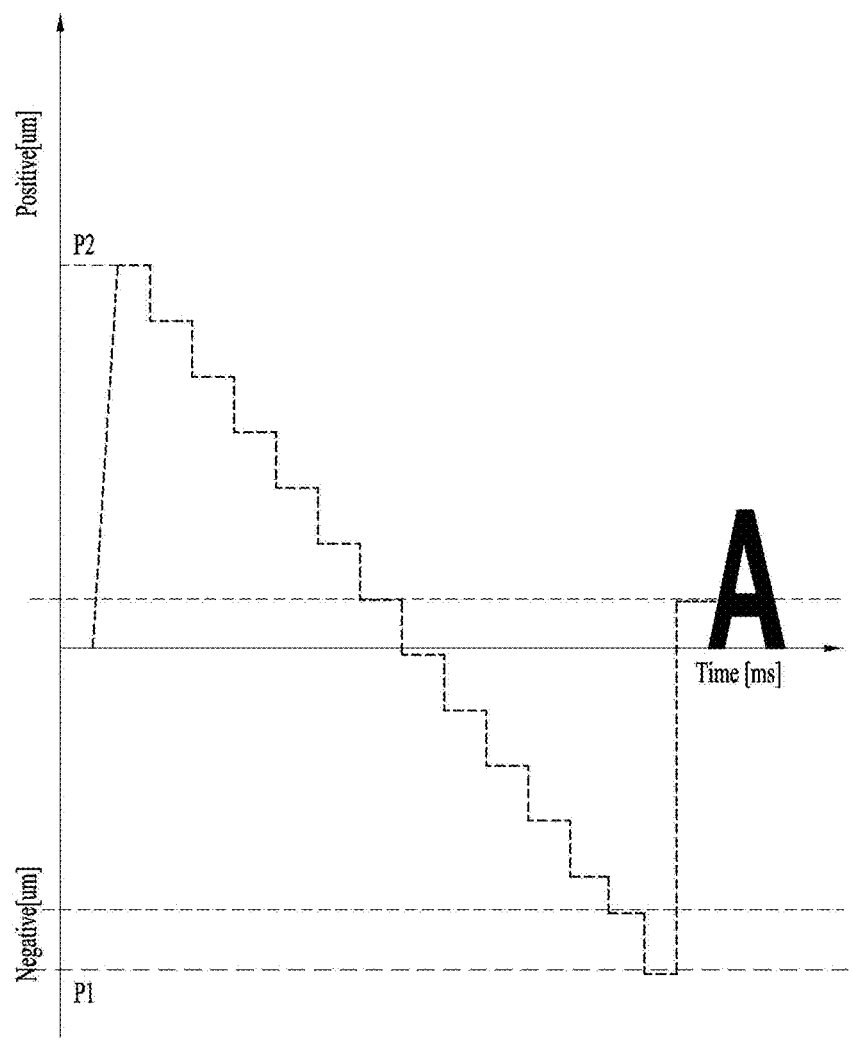
Figure 32D:
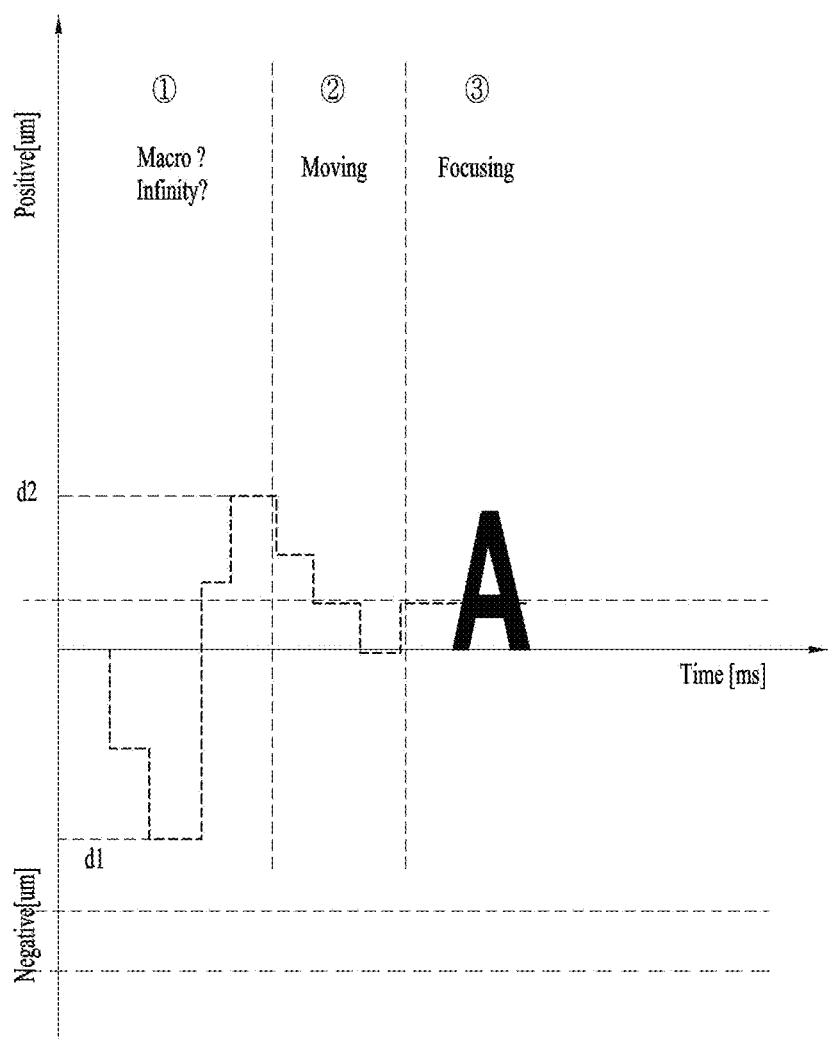

In FIG. 32A, the horizontal axis indicates the focal distance, and the vertical axis indicates the displacement in the direction parallel to the optical axis, such as the positive Z-axis direction and the negative Z-axis direction. In FIGS. 32B to 32D, the horizontal axis indicates the time, and the vertical axis indicates the displacement.

On the assumption that the optimal focus distance to an object is F1, as shown in FIG. 32A, F1 may be found using the following methods.

A first method will be described with reference to FIG. 32B.

The moving part 60 is moved to a first point P1, which is a point to which the moving part 60 is maximally movable in the negative Z-axis direction. Subsequently, a subject is captured while the moving part 60 is moved at a predetermined speed from the first point P1 to a second point P2, which is a point to which the moving part 60 is maximally movable in the positive Z-axis direction, and an optical focus distance corresponding to an optimal image selected from among captured images is found.

A second method will be described with reference to FIG. 32C.

The moving part 60 is moved to a second point P2, which is a point to which the moving part 60 is maximally movable in the positive Z-axis direction. Subsequently, a subject is captured while the moving part 60 is moved at a predetermined speed from the second point P2 to a first point P1, which is a point to which the moving part 60 is maximally movable in the negative Z-axis direction, and an optical focus distance corresponding to an optimal image selected from among captured images is found.

A third method will be described with reference to FIG. 32D.

A subject is captured while the moving part 60 is moved from an initial position 0 to a first distance d1 in the positive Z-axis direction or the negative Z-axis direction. Subsequently, the moving part 60 is moved to the initial position 0.

Subsequently, the subject is captured while the moving part 60 is moved from the initial position 0 to a second distance d2. At this time, the direction in which the moving part 60 is moved from the initial position 0 to the second distance d2 may be opposite the direction in which the moving part 60 is moved from the initial position 0 to the first distance d1.

Subsequently, the subject is captured while the moving part 60 is moved from the second distance d2 to the initial position 0. An optical focus distance corresponding to an optimal image selected from among captured images is found.

Figure 33A:
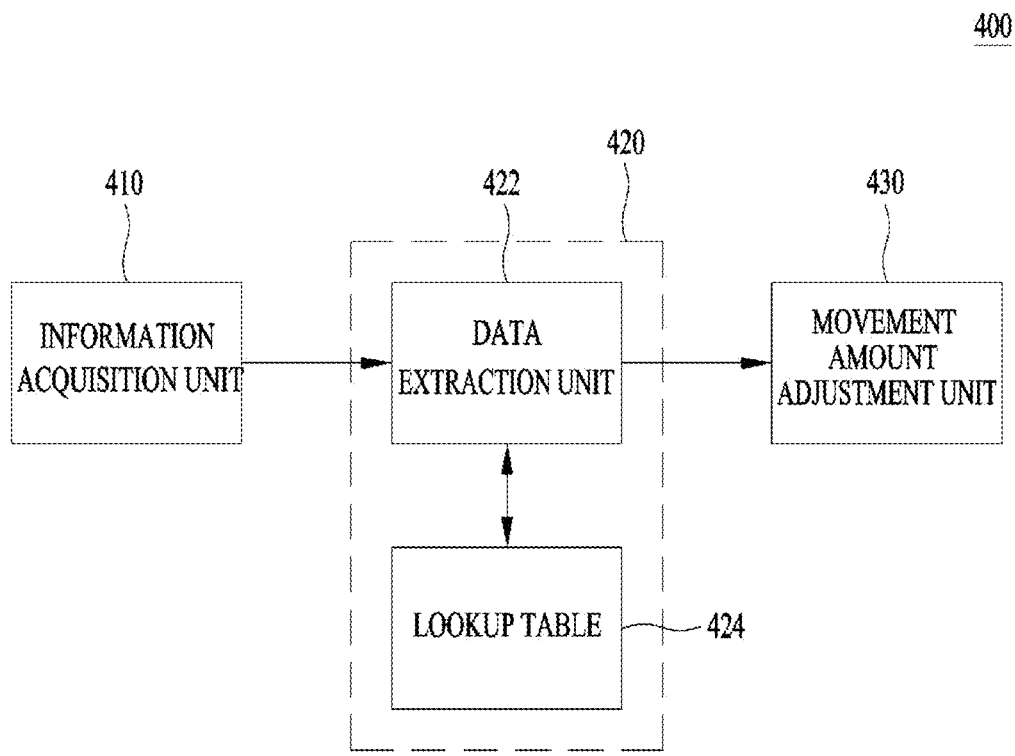
FIG. 33A is a block diagram of a focus controller according to an embodiment.
Figure 33B:
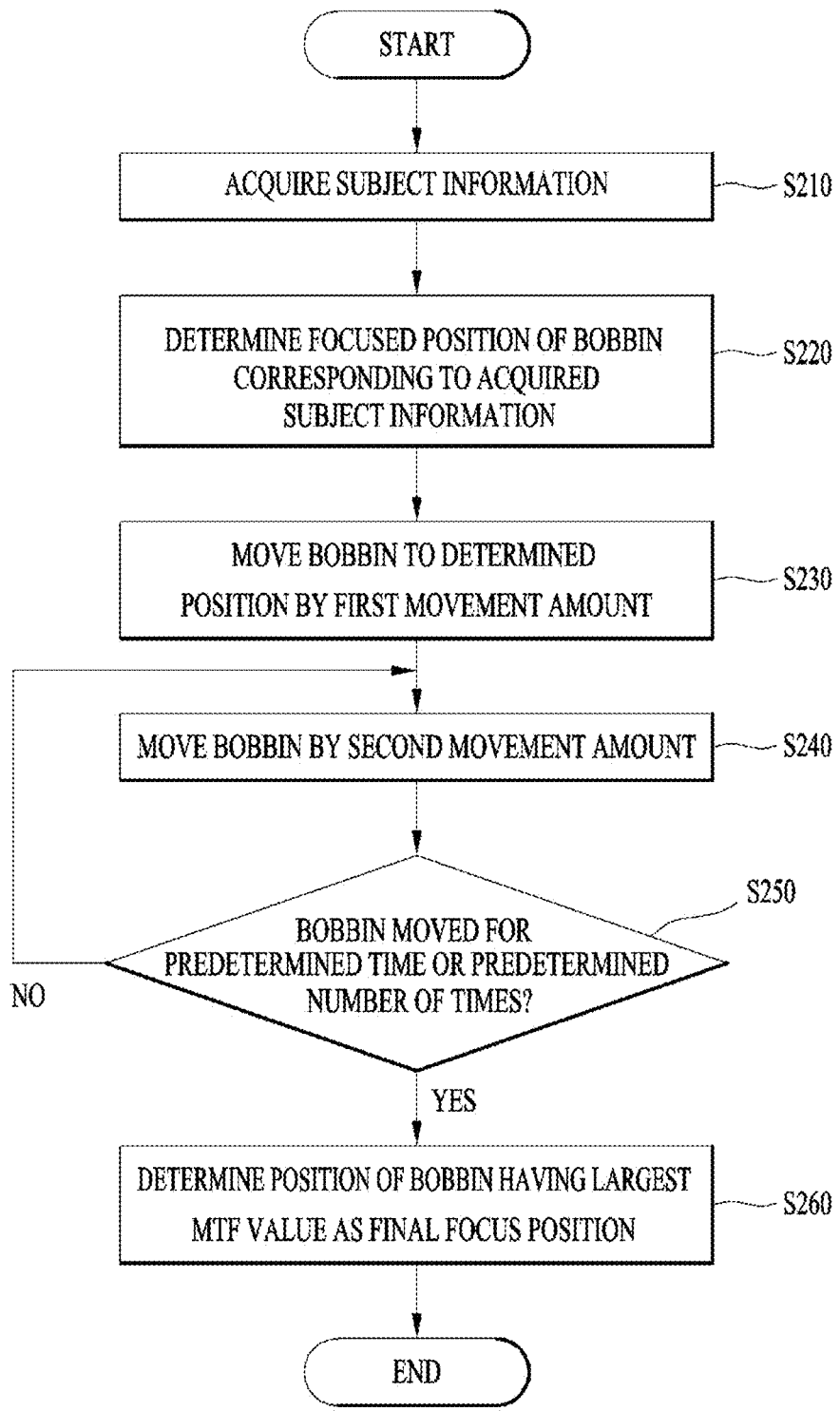
FIG. 33B is a flowchart showing an embodiment of an auto focusing control method performed by the focus controller shown in FIG. 33A.

FIG. 33A is a block diagram of a focus controller 400 according to an embodiment, and FIG. 33B is a flowchart showing an embodiment of an auto focusing control method performed by the focus controller 400 shown in FIG. 33A.

Referring to FIGS. 33A and 33B, the focus controller 400 may control the interaction between the first coil 120 or 1120 and the magnet 130 or 1130 based on subject information to move the bobbin 110 or 1110 in the first direction parallel to the optical axis by a first movement amount (or a first displacement amount), thereby performing an auto focusing function. To this end, the focus controller 400 may include an information acquisition unit 410, a bobbin position searching unit 420, and a movement amount adjustment unit 430.

The information acquisition unit 410 may acquire subject information (S210).

The subject information may include at least one selected from among the distance between a subject and at least one lens (not shown), the distance between the subject and the image sensor, the position of the subject, and the phase of the subject.

The subject information may be acquired using any of various methods.

In an embodiment, the subject information may be acquired using two cameras. In another embodiment, the subject information may be acquired using a laser. For example, Korean Patent Application Publication No. P 1989-0008573 discloses a method of measuring the distance to an object using a laser.

In another embodiment, the subject information may be acquired using a sensor.

For example, US Patent Application Publication No. US 2013/0033572 discloses a method of acquiring the distance between a camera and a subject using an image sensor.

The bobbin position searching unit 420 may find the focused position of the bobbin 110 or 1110 corresponding to the subject information acquired by the information acquisition unit 410 (S220).

For example, the bobbin position searching unit 420 may include a data extraction unit 422 and a lookup table (LUT) 424.

The lookup table 424 stores the focused position of the bobbin 110 or 1110 in the state of being mapped with the subject information.

For example, the position of the bobbin 110 or 1110 corresponding to an optimal focus based on the distance between the subject and the lens may be found in advance and stored in the form of a lookup table 424.

That is, the lookup table 424 may be created at step S230 using the first position sensor 190 before the bobbin 110 or 1110 is moved by the first movement amount.

For example, a current change value sensed by the first position sensor 190 or a displacement value calculated based on a code value correspond to the position of the bobbin 110 or 1110. Consequently, the focused position of the bobbin 110 or 1110 based on the subject information, which is the distance between the subject and the lens, may be measured to create the lookup table 424. At this time, the measured position of the bobbin 110 or 1110 may be coded and stored in the lookup table 424.

The data extraction unit 422 may receive the subject information acquired by the information acquisition unit 410, extract the focused position of the bobbin 110 or 1110 corresponding to the subject information from the lookup table 424, and output the extracted position of the bobbin 110 or 1110 to the movement amount adjustment unit 430.

In the case in which the position of the bobbin 110 or 1110 is coded and stored in the lookup table 424, as described above, the data extraction unit 422 may find a code value corresponding to the subject information from the lookup table 424.

After step S220, the movement amount adjustment unit 430 may move the bobbin 110 or 1110 to the position found by the bobbin position searching unit 420 by the first movement amount (or the first displacement amount) (S230).

For example, the movement amount adjustment unit 430 may adjust the amount of current to be supplied to the first coil 120 or 1120 or the code value to move the bobbin 110 or 1110 in the first direction by the first movement amount. To this end, the amount of current for each position of the bobbin 110 or 1110 may be set in advance.

For example, as the bobbin 1110 moves in the first direction, the first position sensor 190 may sense the change of a magnetic field emitted from the second magnet 185 coupled to the bobbin 1110, and may detect the variation of current output based on the sensed variation of the magnetic field.

The movement amount adjustment unit 430 may calculate or determine the current position of the bobbin 110 or 1110 based on the variation of the current detected by the first position sensor 190, and may set the amount of current to be supplied to move the bobbin 110 or 1110 to a focused position of the bobbin 110 or 1110 by the first movement amount with reference to the calculated or determined current position of the bobbin 110 or 1110.

Figure 34A:
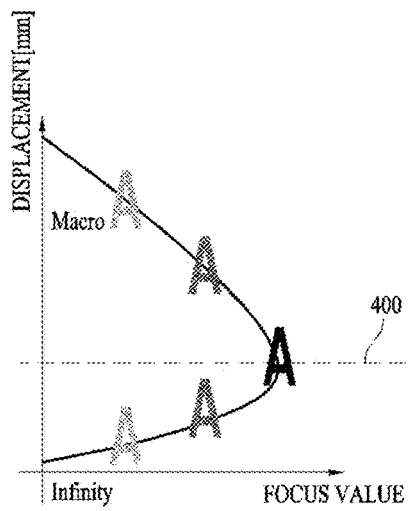
FIGS. 34A and 34B are graphs illustrating an auto focusing function according to a comparative example.
Figure 34B:
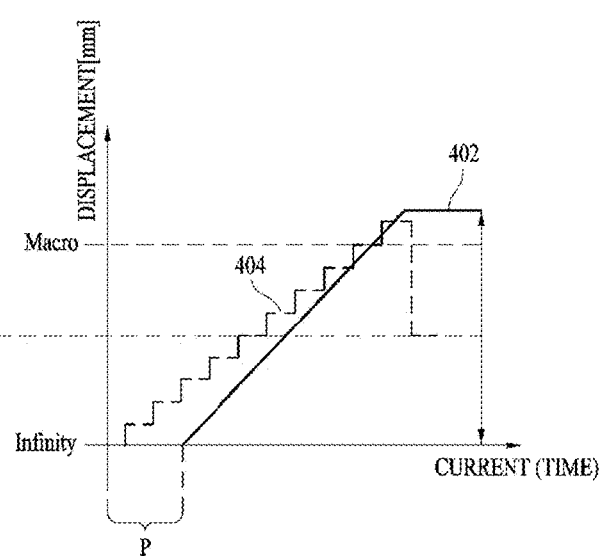

FIGS. 34A and 34B are graphs illustrating an auto focusing function according to a comparative example. In FIG. 34A, the horizontal axis indicates the focus value, and the vertical axis indicates the displacement. In FIG. 34B, the horizontal axis indicates the current (or the time), and the vertical axis indicates the displacement (or the code).

Figure 35A:
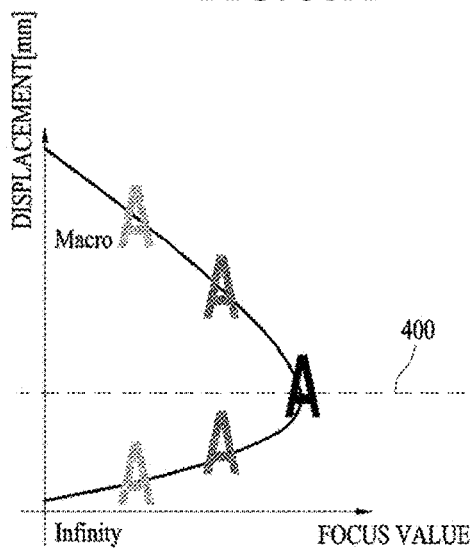
FIGS. 35A and 35B are graphs illustrating an auto focusing function according to an embodiment.
Figure 35B:
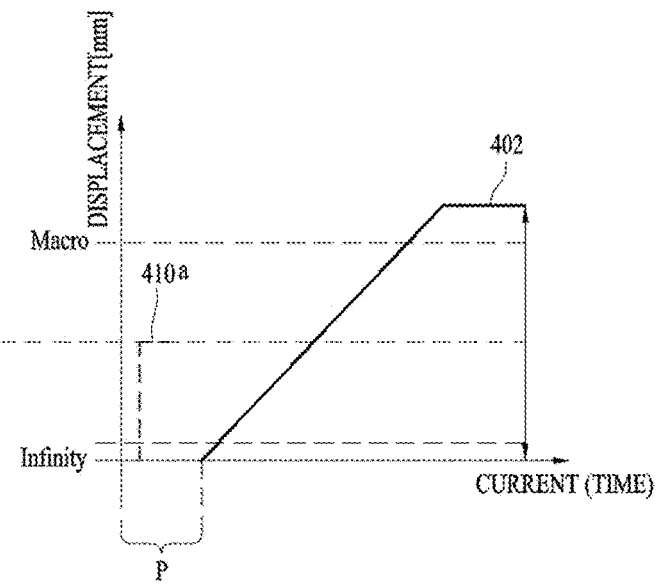

FIGS. 35A and 35B are graphs illustrating an auto focusing function according to an embodiment. In FIG. 35A, the horizontal axis indicates the focus value, and the vertical axis indicates the displacement. In FIG. 35B, the horizontal axis indicates the current (or the time), and the vertical axis indicates the displacement (or the code).

Referring to FIGS. 34A and 34B, the position (or the displacement) 400 of the bobbin 110 or 1110 in best focus is found while the amount of current supplied to the first coil 120 or 1120 is increased from a first reference focal distance (infinity) to a second reference focal distance (macro).

The first reference focal distance may be a focal distance when the distance between the lens and the image sensor is the longest, and the second reference focal distance may be a focal distance when the distance between the lens and the image sensor is the shortest. However, the disclosure is not limited thereto. In another embodiment, the first reference focal distance may be a focal distance when the distance between the lens and the image sensor is the shortest, and the second reference focal distance may be a focal distance when the distance between the lens and the image sensor is the longest.

When current is supplied to the first coil 120, the bobbin 110 or 1110 may not be driven for a predetermined initial time P. Subsequently, as current 402 (or a code value 404 corresponding to the variation of the magnetic field sensed by the first position sensor 190) is continuously increased, the displacement of the bobbin 110 or 1110 may be increased.

In the comparative example shown in FIGS. 34A and 34B, the bobbin 110 or 1110 is moved from the first reference focal distance to the second reference focal distance, and then the position 400 of the bobbin 110 or 1110 in best focus is found, which may consequently take a long time.

In the embodiment shown in FIGS. 35A and 35B, on the other hand, a code corresponding to the focused position of the bobbin 110 or 1110 is found from the lookup table 424 using the subject information, and the bobbin 110 or 1110 may be moved to the focus position (or the displacement) 410a by the first movement amount based thereon. When compared with the comparative example, the amount of time necessary to focus the lens is reduced.

Meanwhile, after the lens is focused through steps S210 to S220, the focus of the lens may be finely adjusted (S240 to S260).

Figure 36A:
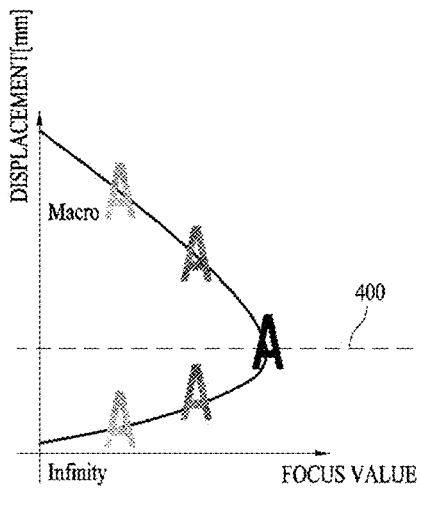
FIGS. 36A and 36B are graphs illustrating fine adjustment in the auto focusing function according to the embodiment.
Figure 36B:
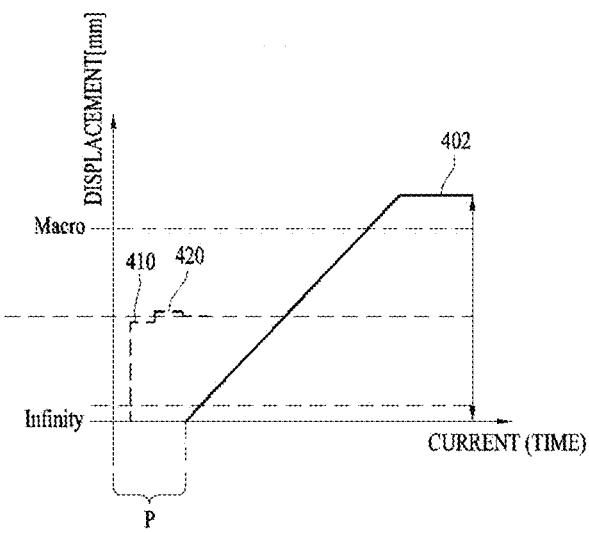

FIGS. 36A and 36B are graphs illustrating fine adjustment in the auto focusing function according to the embodiment. In FIG. 36A, the horizontal axis indicates the focus value, and the vertical axis indicates the displacement. In FIG. 36B, the horizontal axis indicates the current (or the time), and the vertical axis indicates the displacement (or the code).

Referring to FIGS. 36A and 36B, after step S230, at which the bobbin 110 or 1110 is moved by the first movement amount, the focus controller 400 may move the bobbin 110 or 1110 within the range of a second movement amount, which is smaller than the first movement amount, to find the focus position of the bobbin 110 or 1110 having the largest frequency modulation transfer function (MTF) value (S240). Here, the MTF value may be a numerically expressed resolving power value.

After step S240, the focus controller 400 determines whether the bobbin 110 or 1110 has been moved for a predetermined time in order to find the largest MTF value (S250). Alternatively, the focus controller 400 may determine whether the bobbin 110 or 1110 has been moved a predetermined number of times in order to find the largest MTF value (S250). Alternatively, the bobbin 110 or 1110 may be moved for more than the predetermined time or more than the predetermined number of times until the largest MTF value is found.

Upon determining that the bobbin 110 or 1110 has been moved for the predetermined time or the predetermined number of times, the position of the bobbin 110 or 1110 having the largest MTF value may be determined as the final focus position of the bobbin 110 or 1110 (S260).

Through steps S240 to S260, the camera module according to the embodiment may accurately adjust the focus of the lens, thereby improving resolving power.

Figure 37:
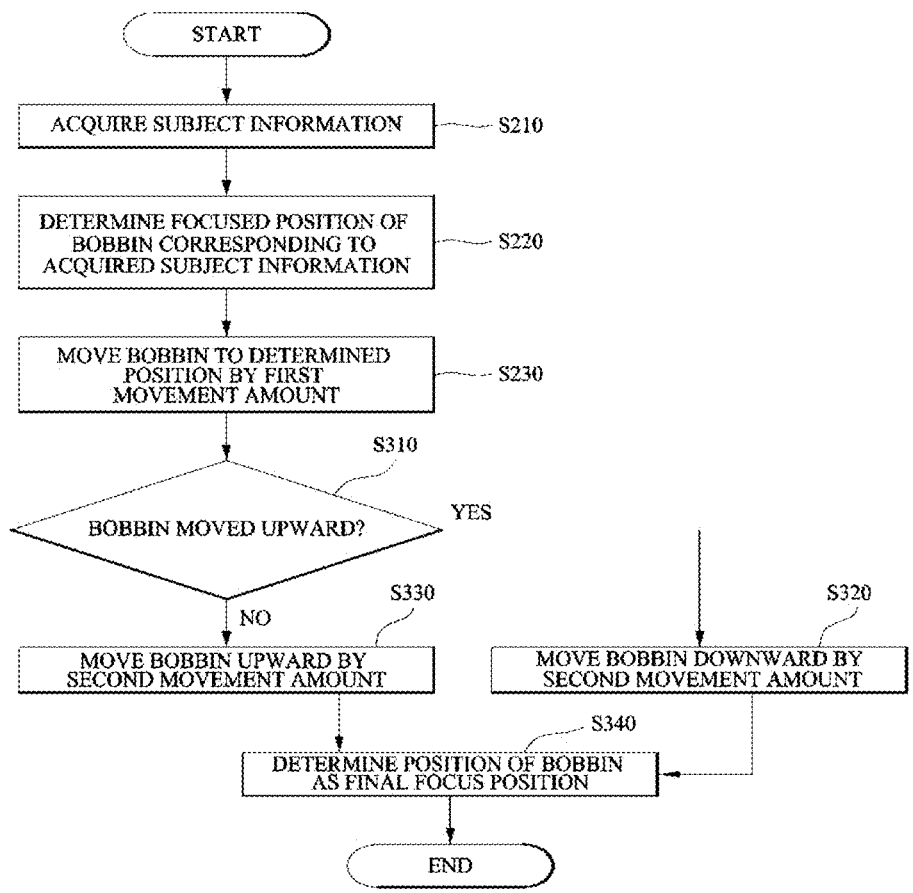
FIG. 37 is a flowchart showing another embodiment of the auto focusing control method performed by the focus controller shown in FIG. 33A.

FIG. 37 is a flowchart showing another embodiment of the auto focusing control method performed by the focus controller 400 shown in FIG. 33A.

Referring to FIG. 37, steps S210 to S230 shown in FIG. 33B are performed.

Subsequently, the focus controller 400 determines whether the direction in which the bobbin 110 or 1110 has been moved by the first movement amount is the upward direction or the downward direction from an initial position of the bobbin 110 or 1110 (S310). Here, the initial position of the bobbin 110 or 1110 may be a position of the bobbin 110 or 1110 immediately before the bobbin 110 or 1110 is moved by the first movement amount.

For example, in the case in which the bobbin 110 or 1110 has been moved upward from the initial position of the bobbin 110 or 1110, the bobbin 110 or 1110 is moved downward by a second movement amount (S320). Since the second movement amount is smaller than the first movement amount, the focus controller 400 may finely adjust the position of the bobbin 110 or 1110, whereby the focus of the lens may be finely adjusted. In addition, for additional fine adjustment in the downward direction, steps S240 to S260, shown in FIG. 33B, may be performed.

On the other hand, in the case in which the bobbin 110 or 1110 has been moved downward from the initial position of the bobbin 110 or 1110, the bobbin 110 or 1110 is moved upward by the second movement amount (S330). In addition, for additional fine adjustment in the upward direction, steps S240 to S260 shown in FIG. 33B may be performed.

Figure 38:
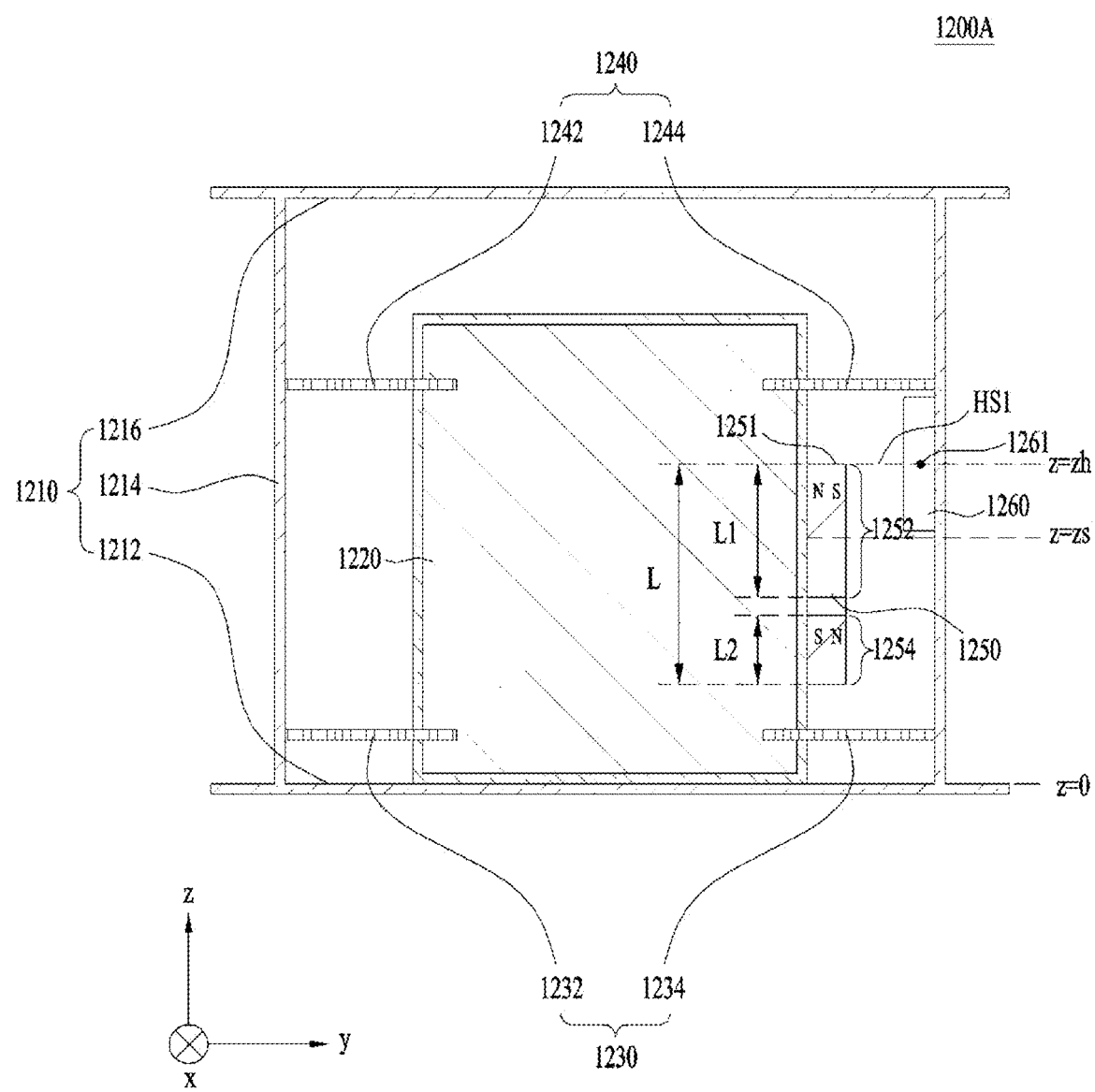
FIG. 38 is a schematic sectional view of a lens moving apparatus according to another embodiment.

FIG. 38 is a schematic sectional view of a lens moving apparatus 1200A according to another embodiment.

The lens moving apparatus 1200A shown in FIG. 38 may include a stationary part 1210, a moving part 1220, lower and upper springs 1230 and 1240, a bipolar magnetized magnet 1250, and a position sensor 1260. For example, the position sensor 1260 may be a position detection sensor or a driver including a position detection sensor.

The stationary part 1210 includes a lower portion 1212, a lateral portion 1214, and an upper portion 1216.

When the moving part 1220 of the lens moving apparatus 1200A moves in one direction of an optical axis, the lower portion 1212 of the stationary part 1210 may support the moving part 1220 in an initial stationary state. Alternatively, the moving part 1220 may be supported in the initial stationary state by the lower and/or the upper springs 1230 and/or 1240 in the state in which the moving part is spaced apart from the lower portion 1212 of the stationary part 1210 by a predetermined distance.

In addition, the lateral portion 214 of the stationary part 1210 may support the lower spring 1230 and the upper spring 1240. However, the lower portion 1212 and/or the upper portion 1216 of the stationary part 1210 may support the lower spring 1230 and/or the upper spring 1240.

For example, the stationary part 1210 may correspond to the housing 140 of the above-described lens moving apparatus 100. The stationary part 1210 may include the cover member 300, and may further include the base 210.

At least one lens (not shown) may be mounted in the moving part 1220. For example, the moving part 1220 may correspond to the bobbin 1110 of the above-described lens moving apparatus 200. However, the disclosure is not limited thereto.

Although not shown, the lens moving apparatus 1200A may further include a first coil and a magnet. The first coil and the magnet included in the lens moving apparatus 1200A may face each other in order to move the moving part 1220 in the optical-axis direction of the lens, i.e. the z-axis direction.

For example, the first coil and the magnet may correspond respectively to the first coil 1120 and the first magnet 1130 of the above-described lens moving apparatus 200. However, the disclosure is not limited thereto.

The moving part 1220 is shown as moving in one direction of the optical axis (i.e. in the positive z-axis direction). In another embodiment, a description of which will follow, the moving part 1220 may move in both opposite directions of the optical axis (i.e. in the positive z-axis direction and the negative z-axis direction).

Meanwhile, the first position sensor 1260 may sense a first displacement value of the moving part 1220 in the optical-axis direction, i.e. the z-axis direction. The first position sensor 1260 may sense a magnetic field emitted by the bipolar magnetized magnet 1250, and may output voltage having a level that is proportional to the intensity of the sensed magnetic field.

In order for the first position sensor 1260 to sense a magnetic field the intensity of which is changed linearly, the bipolar magnetized magnet 1250 may be opposite the first position sensor 1260 in the y-axis direction, which is a magnetized direction at which opposite polarities are disposed on the basis of a plane perpendicular to the optical-axis direction.

For example, the first position sensor 1260 may correspond to the first position sensor 190 of the above-described lens moving apparatus 200, and the bipolar magnetized magnet 1250 may correspond to the first magnet 1130 of the above-described lens moving apparatus 200. However, the disclosure is not limited thereto.

The bipolar magnetized magnet 1250 may be classified as a ferrite magnet, an alnico magnet, or a rare-earth magnet based on the kind of magnet. The bipolar magnetized magnet 1250 may be classified as a P-type magnet or an F-type magnet based on the type of magnetic circuit. However, the disclosure is not limited thereto.

The bipolar magnetized magnet 1250 may include a lateral surface that faces the first position sensor 1260. The lateral surface may include a first lateral surface 1252 and a second lateral surface 1254. The first lateral surface 1252 may be a surface having a first polarity, and the second lateral surface 1254 may be a surface having a second polarity, which is opposite the first polarity. The second lateral surface 1254 may be disposed so as to be spaced apart from the first lateral surface 1252 or to abut on the first lateral surface 1252 in the direction parallel to the optical-axis direction, i.e. the z-axis direction. A first length L1 of the first lateral surface 1252 in the optical-axis direction may be equal to or greater than a second length L2 of the second lateral surface 1254 in the optical-axis direction.

In addition, the bipolar magnetized magnet 1250 may be configured such that a first magnetic flux density of the first lateral surface 1252 having the first polarity is greater than a second magnetic flux density of the second lateral surface 1254 having the second polarity.

The first polarity may be an S pole, and the second polarity may be an N pole. Alternatively, the first polarity may be an N pole, and the second polarity may be an S pole.

Figure 39A:
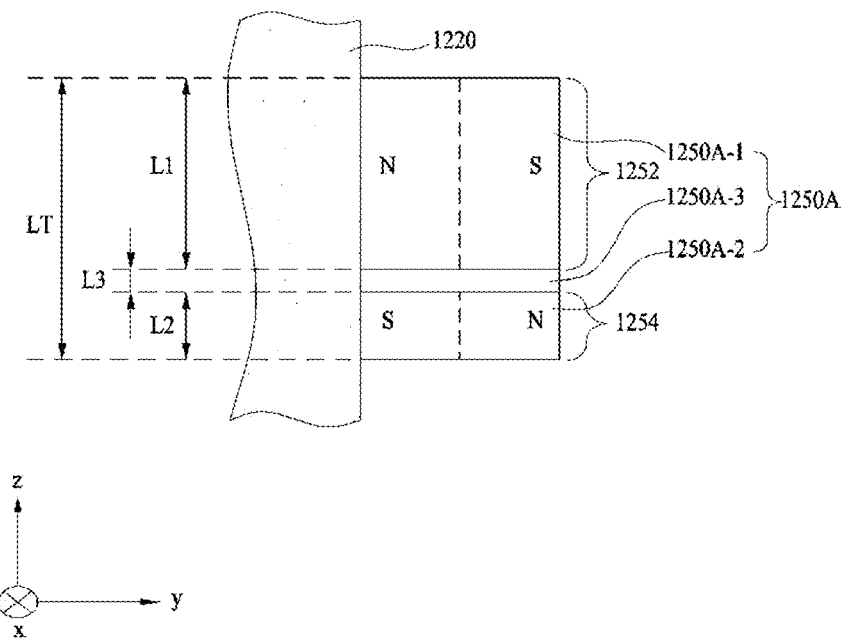
FIGS. 39A and 39B are sectional views showing embodiments of a bipolar magnetized magnet shown in FIG. 38.
Figure 39B:
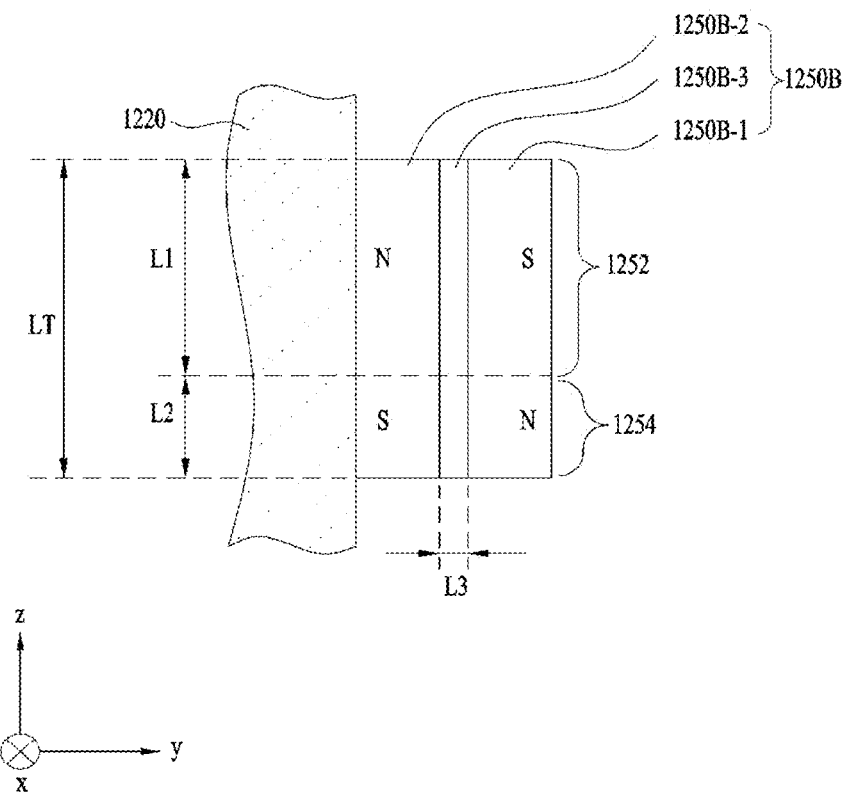

FIGS. 39A and 39B are sectional views respectively showing embodiments 1250A and 1250B of the bipolar magnetized magnet 1250 shown in FIG. 38.

Referring to FIG. 39A, the bipolar magnetized magnet 1250A may include first and second sensing magnets 1250A-1 and 1250A-2. In addition, the bipolar magnetized magnet 1250A may further include a non-magnetic partition wall 1250A-3.

Referring to FIG. 39B, the bipolar magnetized magnet 1250B may include first and second sensing magnets 1250B-1 and 1250B-2. In addition, the bipolar magnetized magnet 1250A may further include a non-magnetic partition wall 1250B-3.

The first and second sensing magnets 1250A-1 and 1250A-2 shown in FIG. 39A may be disposed so as to be spaced apart from each other or to abut on each other in the direction parallel to the optical-axis direction (i.e. the z-axis direction).

On the other hand, the first and second sensing magnets 1250B-1 and 1250B-2 shown in FIG. 39B may be disposed so as to be spaced apart from each other or to abut on each other in the direction perpendicular to the optical-axis direction or the magnetized direction (i.e. the y-axis direction).

The bipolar magnetized magnet 1250 shown in FIG. 38 is shown as a magnet having the structure shown in FIG. 39A, but may be replaced with a magnet having the structure shown in FIG. 39B.

In addition, the non-magnetic partition wall 1250A-3 shown in FIG. 39A may be disposed between the first and second sensing magnets 1250A-1 and 1250A-2, and the non-magnetic partition wall 1250B-3 shown in FIG. 39B may be disposed between the first and second sensing magnets 1250B-1 and 1250B-2.

The non-magnetic partition wall 1250A-3 or 1250B-3, which is a portion that has substantially no magnetism, may include a section having weak polarity. In addition, the non-magnetic partition wall 1250A-3 or 1250B-3 may be filled with air or a non-magnetic material.

In addition, a third length L3 of the non-magnetic partition wall 1250A-3 or 1250B-3 may be 5% or more or 50% or less the total length LT of the bipolar magnetized magnet 1250A or 1250B in the direction parallel to the optical-axis direction.

Figure 40:
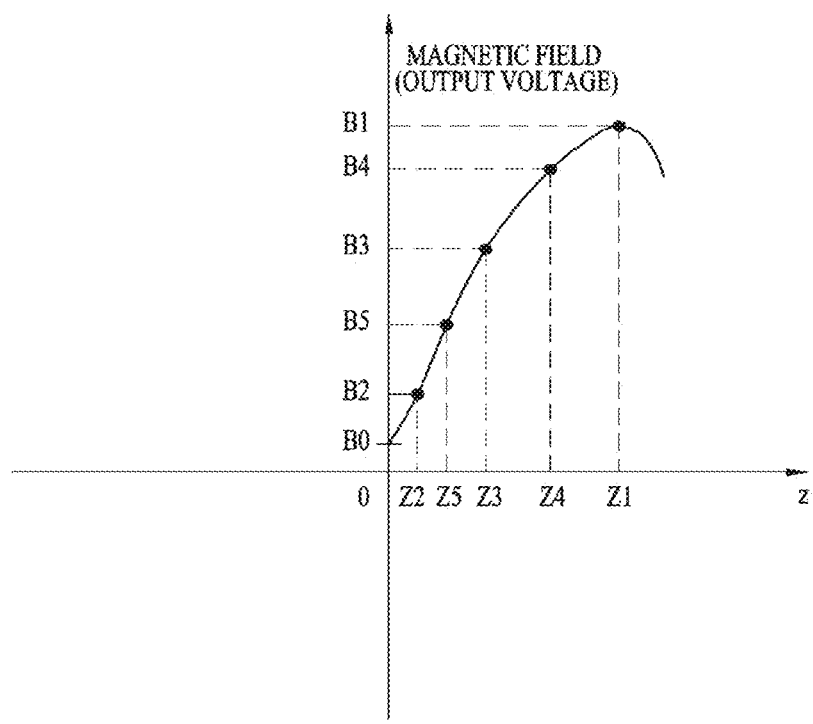
FIG. 40 is a graph illustrating the operation of the lens moving apparatus shown in FIG. 38.

FIG. 40 is a graph illustrating the operation of the lens moving apparatus 1200A shown in FIG. 38. The horizontal axis may indicate the movement distance of the moving part in the optical-axis direction or the direction parallel to the optical-axis direction, i.e. the z-axis direction, and the vertical axis may indicate the magnetic field sensed by the first position sensor 1260 or the output voltage output from the first position sensor 1260. The first position sensor 1260 may output voltage having a level that is proportional to the intensity of a magnetic field.

As shown in FIG. 38, the height z (=zh) of the center 1261 of the first position sensor 1260 may be equal to or higher than the height of an imaginary horizontal surface HS1 extending from the upper end 1251 of the first lateral surface 1252 in the magnetized direction, i.e. the y-axis direction, in an initial state before the lens is moved in the optical-axis direction, i.e. in an initial state in which the moving part 1220, in which the lens is mounted, is not moved but is stationary. At this time, a sensing element of the first position sensor 1260 may be located on the center 1261 of the first position sensor 1260.

In this case, referring to FIG. 40, the intensity of a magnetic field that can be sensed by the first position sensor 1260 may be a value BO that is approximate to '0' but is not '0'. In this initial state, the moving part 1220, which has a lens mounted therein and is movable only in one direction, i.e. in the positive z-axis direction, is located at the lowest position.

Figure 41:
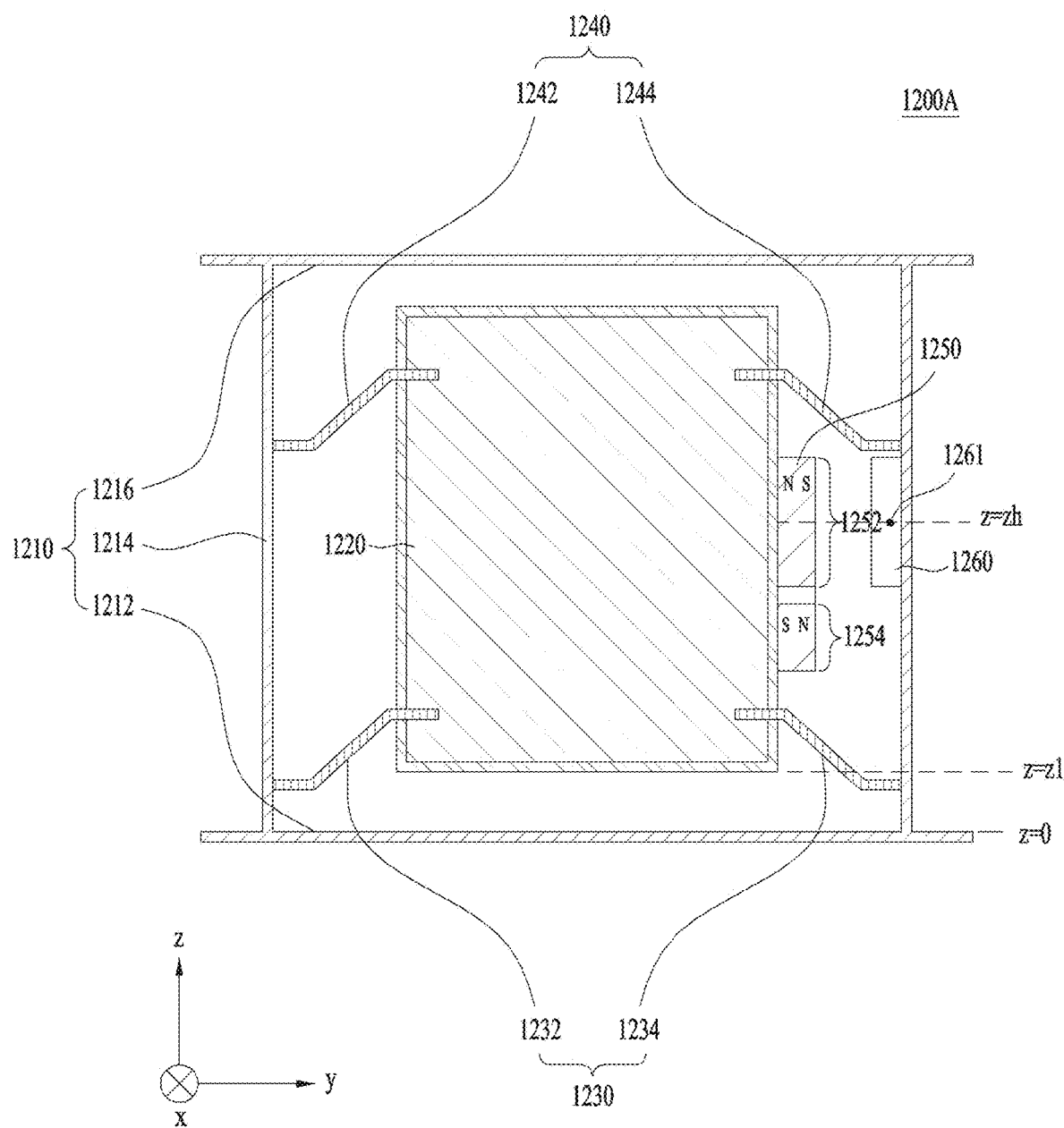
FIG. 41 is a view showing the state in which the lens moving apparatus shown in FIG. 38 has been moved in an optical-axis direction.
Figure 42:
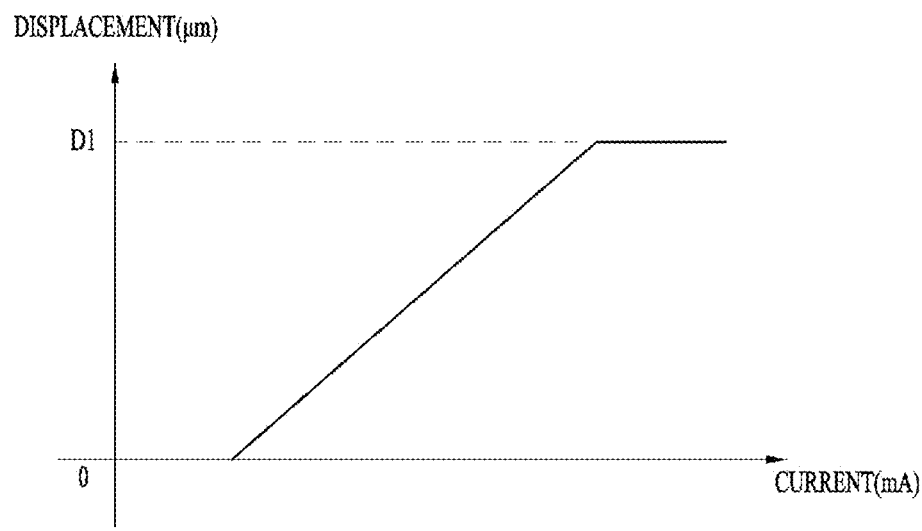
FIG. 42 is a graph showing the displacement of the moving part based on current supplied to the first coil in the lens moving apparatus according to the embodiment.

FIG. 41 is a view showing the state in which the lens moving apparatus 1200A shown in FIG. 38 has been moved in the optical-axis direction, and FIG. 42 is a graph showing the displacement of the moving part 1220 based on current supplied to the first coil in the lens moving apparatus 1200A according to the embodiment. The horizontal axis indicates the current supplied to the first coil, and the vertical axis indicates the displacement of the moving part 1220.

Referring to the above figures, the moving part 1220 may move in the positive z-axis direction as the intensity of current supplied to the first coil is increased. As shown in FIG. 41, the moving part 1220 may move upward by a first distance z (=z1) in the positive z-axis direction. In this case, referring to FIG. 40, the intensity of a magnetic field that can be sensed by the first position sensor 1260 may be B1.

Subsequently, when the intensity of current supplied to the first coil is reduced or when the supply of current to the first coil is interrupted, the moving part 1220 may move downward to the initial position thereof, as shown in FIG. 38.

In order for the moving part 1220 to move upward from the position shown in FIG. 38 to the position shown in FIG. 41, the electric force of the moving part 1220 must be higher than the mechanical force of the lower and upper springs 1230 and 1240.

In addition, in order for the moving part 1220 to return to the initial position shown in FIG. 38 from the highest position shown in FIG. 41, the electric force of the moving part 1220 must be equal to or lower than the mechanical force of the lower and upper springs 1230 and 1240. That is, after moving upward in the positive z-axis direction, the moving part 1220 may return to the original position thereof due to the restoring force of the lower and upper springs 1230 and 1240.

The lower spring 1230 may include first and second lower springs 1232 and 1234, and the upper spring 1240 may include first and second upper springs 1242 and 1244. The lower spring 1230 is shown as being divided into the first and second lower springs 1232 and 1234. However, the disclosure is not limited thereto. That is, the first and second lower springs 1232 and 1234 may be formed integrally.

Similarly, the upper spring 1240 is shown as being divided into the first and second upper springs 1242 and 1244. However, the disclosure is not limited thereto. As shown in FIG. 2, the upper spring 1240 may not be divided, but may be a single member.

For example, the lower spring 1230 and the upper spring 1240 may correspond to the lower and upper elastic members 160 and 150 of the above-described lens moving apparatus 200, respectively. However, the disclosure is not limited thereto.

In the case in which the height z (=zh) of the center 1261 of the first position sensor 1260 is aligned with one of the first and second lateral surfaces 1252 and 1254, as shown in FIGS. 38 and 41, the magnetic field sensed by the first position sensor 1260 may have only one of the first and second polarities. When the intensity of the first or second-polarity magnetic field is changed linearly, therefore, the first position sensor 1260 may sense the first or second-polarity magnetic field that is changed linearly.

Referring to FIG. 40, while the first moving part 1220 moves from the lowest position (e.g. 0), as shown in FIG. 38, to the highest position (e.g. Z1), as shown in FIG. 41, it can be seen that the intensity of the magnetic field sensed by the first position sensor 1260 is almost linearly changed.

Referring to FIGS. 40 and 41, it can be seen that the maximum displacement D1 of the moving part 1220 of the lens moving apparatus 1200A shown in FIG. 38 is z1.

Figure 43:
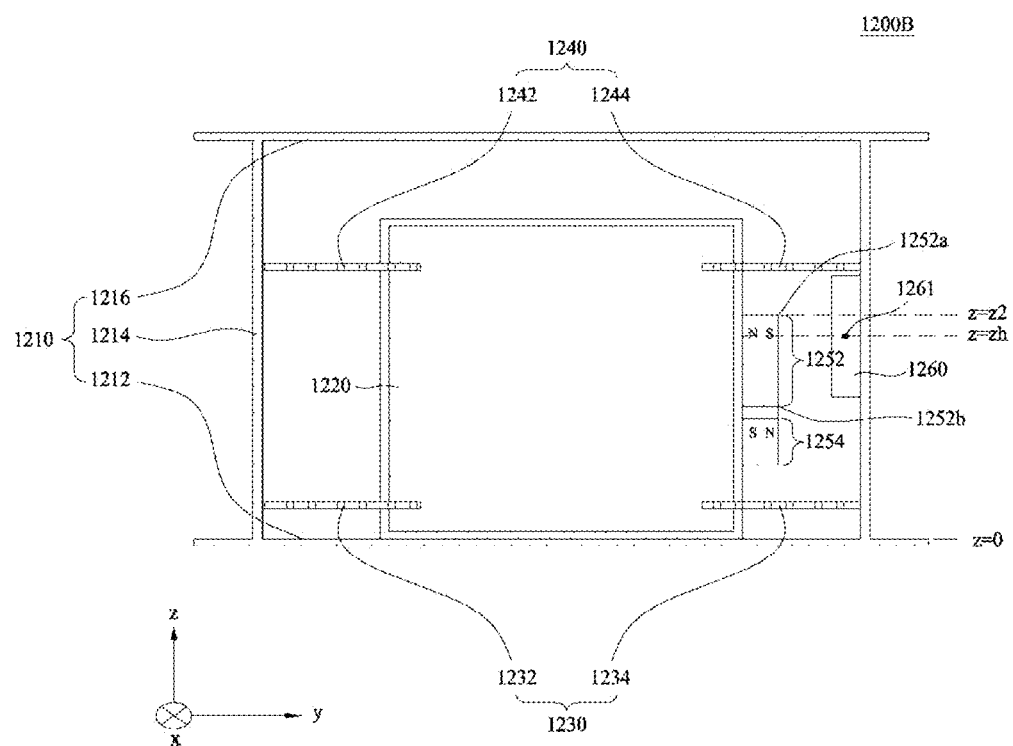
FIG. 43 is a sectional view of a lens moving apparatus according to another embodiment.

FIG. 43 is a sectional view of a lens moving apparatus 1200B according to another embodiment.

In the lens moving apparatus 1200B shown in FIG. 43, the height z (=zh) of the center 1261 of the first position sensor 1260 may face or may be aligned with a first point of the first lateral surface 1252 in the magnetized direction, i.e. the y-axis direction, in an initial state before the lens is moved in the optical-axis direction, unlike the lens moving apparatus 1200A shown in FIG. 38. Here, the first point may be a certain point between the upper end 1252a and the lower end 1252b of the first lateral surface 1252, e.g. a middle point of the first lateral surface 1252.

In a state before the moving part 1220 is moved, the bipolar magnetized magnet 1250 of the lens moving apparatus 1200B shown in FIG. 43 may be higher than the bipolar magnetized magnet 1250 of the lens moving apparatus 1200A shown in FIG. 38 by a predetermined distance z2−zh. In this case, referring to FIG. 40, the lowest value of the first-polarity magnetic field sensed by the first position sensor 1260 may be B2, which is greater than B0.

In the lens moving apparatus 1200B shown in FIG. 43, the moving part 1220 may move upward to the maximum height z1 as current is supplied to the first coil, like the lens moving apparatus 1200A shown in FIG. 41. At this time, the maximum upward height of the moving part 1220 may be changed by adjusting the modulus of each of the lower and upper springs 1230 and 1240.

Even in the lens moving apparatus 1200B shown in FIG. 43, it can be seen that the intensity of the magnetic field sensed by the first position sensor 1260 is almost linearly changed from B2 to B1, like the lens moving apparatus 1200A shown in FIGS. 38 and 41.

Referring to FIG. 42, it can be seen that the maximum displacement D1 of the moving part 1220 of the lens moving apparatus 1200B shown in FIG. 43 is z1−z2.

Figure 44:
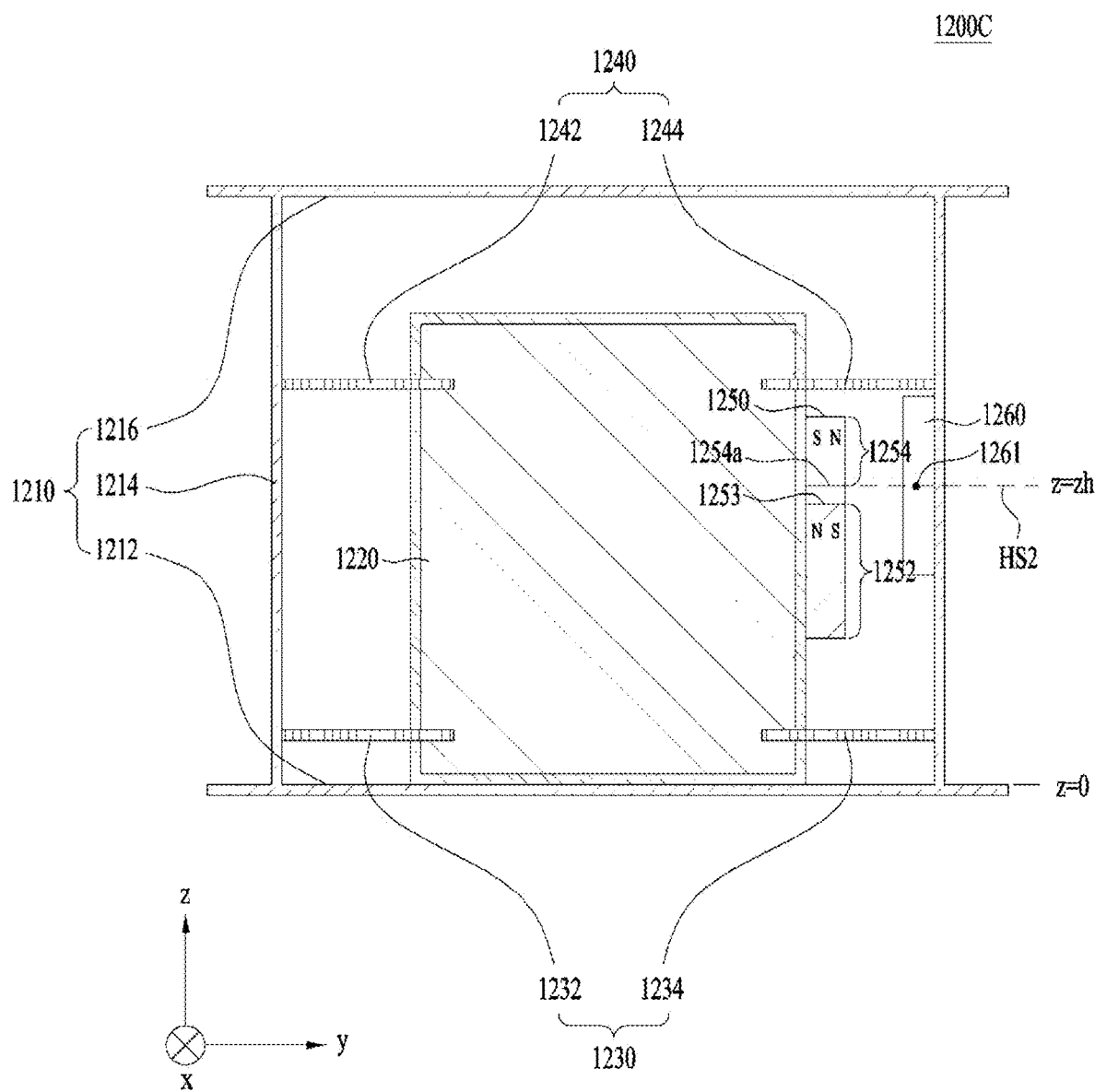
FIG. 44 is a sectional view of a lens moving apparatus according to another embodiment.

FIG. 44 is a sectional view of a lens moving apparatus 1200C according to another embodiment.

In the lens moving apparatus 1200A or 1200B shown in FIG. 38, 41, or 43, the first lateral surface 1252 is located above the second lateral surface 1254.

In the lens moving apparatus 1200C shown in FIG. 44, on the other hand, the second lateral surface 1254 may be located above the first lateral surface 1252. With the exception that the second lateral surface 1254, which is long, of the bipolar magnetized magnet 1250 is disposed below the first lateral surface 1252, which is short, of the bipolar magnetized magnet 1250, the lens moving apparatus 1200C shown in FIG. 44 is identical to the lens moving apparatus 1200A or 1200B shown in FIG. 38 or 43. Consequently, the same reference numerals are used, and a description of the same elements will be omitted.

Figure 45A:
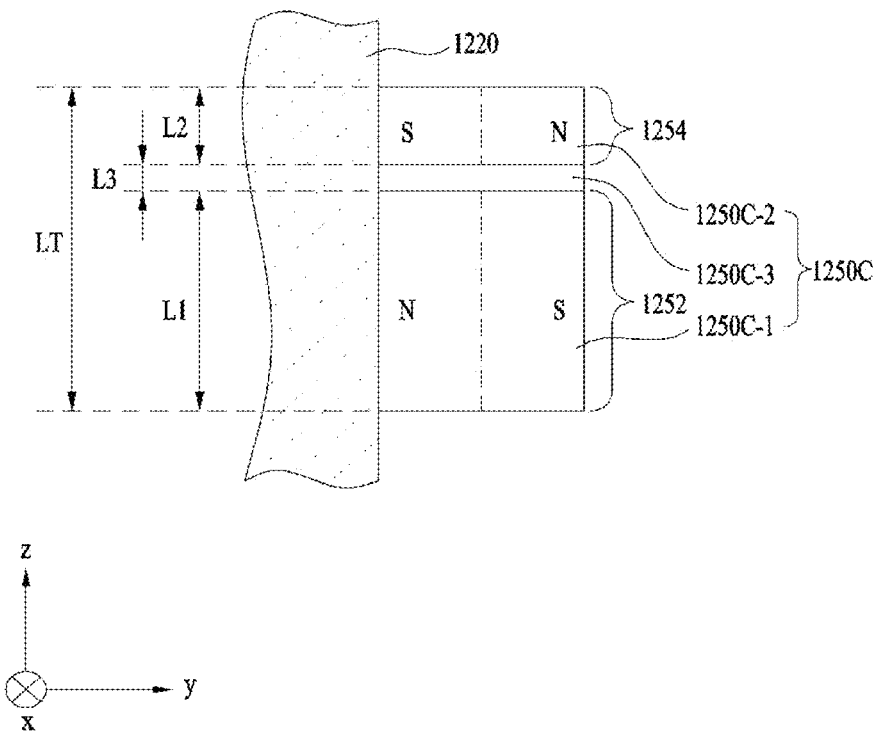
FIGS. 45A and 45B are sectional views showing embodiments of a bipolar magnetized magnet shown in FIG. 44.
Figure 45B:
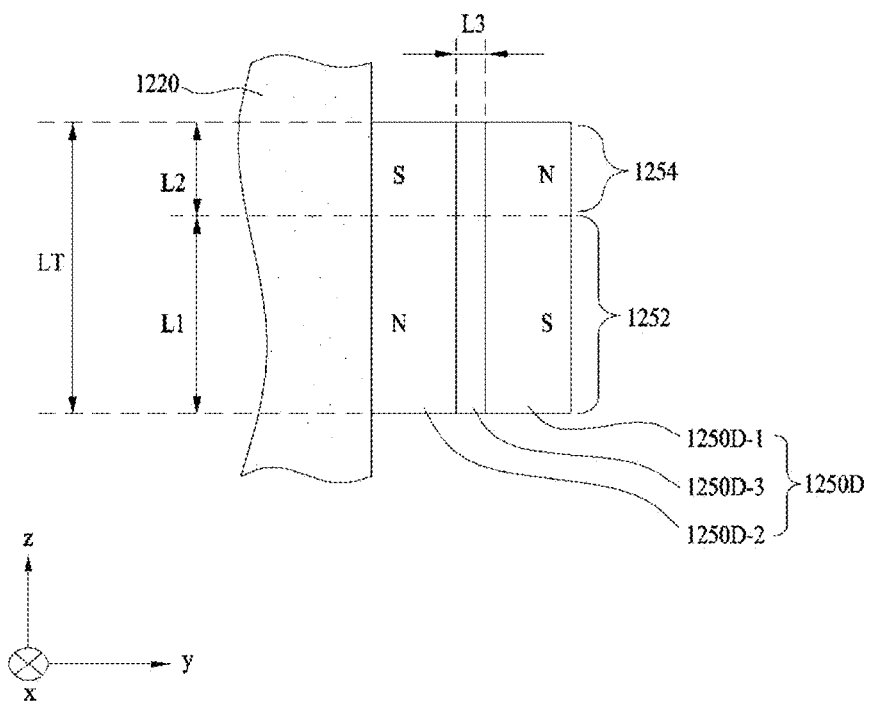

FIGS. 45A and 45B are sectional views respectively showing embodiments 1250C and 1250D of the bipolar magnetized magnet 1250 shown in FIG. 44.

Referring to FIG. 45A, the bipolar magnetized magnet 1250C may include first and second sensing magnets 1250C-1 and 1250C-2. In addition, the bipolar magnetized magnet 1250C may further include a non-magnetic partition wall 1250C-3.

Referring to FIG. 45B, the bipolar magnetized magnet 1250D may include first and second sensing magnets 1250D-1 and 1250D-2. In addition, the bipolar magnetized magnet 1250D may further include a non-magnetic partition wall 1250D-3.

In the embodiment shown in FIG. 45A, the first and second sensing magnets 1250C-1 and 1250C-2 may be disposed so as to be spaced apart from each other or to abut on each other in the direction parallel to the optical-axis direction (i.e. the z-axis direction).

As shown in FIG. 45B, the first and second sensing magnets 1250D-1 and 1250D-2 may be disposed so as to be spaced apart from each other or to abut on each other in the direction perpendicular to the optical-axis direction or the magnetized direction (i.e. the y-axis direction).

The bipolar magnetized magnet 1250 shown in FIG. 44 is shown as a magnet having the structure shown in FIG. 45A, but may be replaced with a magnet having the structure shown in FIG. 45B.

In addition, as shown in FIG. 45A, the non-magnetic partition wall 1250C-3 may be disposed between the first and second sensing magnets 1250C-1 and 1250C-2. As shown in FIG. 45B, the non-magnetic partition wall 1250D-3 may be disposed between the first and second sensing magnets 1250D-1 and 1250D-2. The non-magnetic partition wall 1250C-3 or 1250D-3, which is a portion that has substantially no magnetism, may include a section having weak polarity. In addition, the non-magnetic partition wall 1250C-3 or 1250D-3 may be filled with air or may include a non-magnetic material.

In addition, a third length L3 of the non-magnetic partition wall 1250C-3 may be 5% or more or 50% or less the total length LT of the bipolar magnetized magnet 1250C in the direction parallel to the optical-axis direction.

Referring to FIGS. 44 and 45A, the height z (=zh) of the center 1261 of the first position sensor 1260 may be opposite or may coincide with the non-magnetic partition wall 1250C-3 (or the space between the first lateral surface 1252 and the second lateral surface 1254) in the magnetized direction, i.e. the y-axis direction, in an initial state before the lens is moved in the optical-axis direction.

The upper end 1253 of the first lateral surface 1252 of the bipolar magnetized magnet 1250 may be aligned with an imaginary horizontal surface HS2 extending from the height z (=zh) of the center 1261 of the first position sensor 1260 in the magnetized direction, i.e. the y-axis direction. In addition, the center 1261 of the first position sensor 1260 may be located in, or aligned with, a space between the upper end 1253 of the first lateral surface 1252 and the lower end 1254a of the second lateral surface 1254 in the magnetized direction, i.e. the y-axis direction. In addition, the center 1261 of the first position sensor 1260 may be aligned with the lower end 1254a of the second lateral surface 1254 of the bipolar magnetized magnet 1250 in the magnetized direction, i.e. the y-axis direction.

In the case in which the bipolar magnetized magnet 1250 and the first position sensor 1260 are disposed, as shown in FIG. 44, in the state in which the moving part is not moved but is stationary, the intensity of the first-polarity magnetic field sensed by the first position sensor 1260 may be '0'.

As shown in FIGS. 39A and 45A, the first lateral surface 1252 of the bipolar magnetized magnet 1250 may correspond to the lateral surface of the first sensing magnet 1250A-1 or 1250C-1 facing the first position sensor 1260.

In addition, as shown in FIGS. 39A and 45A, the second lateral surface 1254 of the bipolar magnetized magnet 1250 may correspond to the lateral surface of the second sensing magnet 1250A-2 or 1250C-2 facing the first position sensor 1260.

Alternatively, as shown in FIG. 39B or 45B, the first and second lateral surfaces 1252 and 1254 may correspond to the lateral surface of the first sensing magnet 1250B-1 or 1250D-1 facing the first position sensor 1260.

Figure 46:
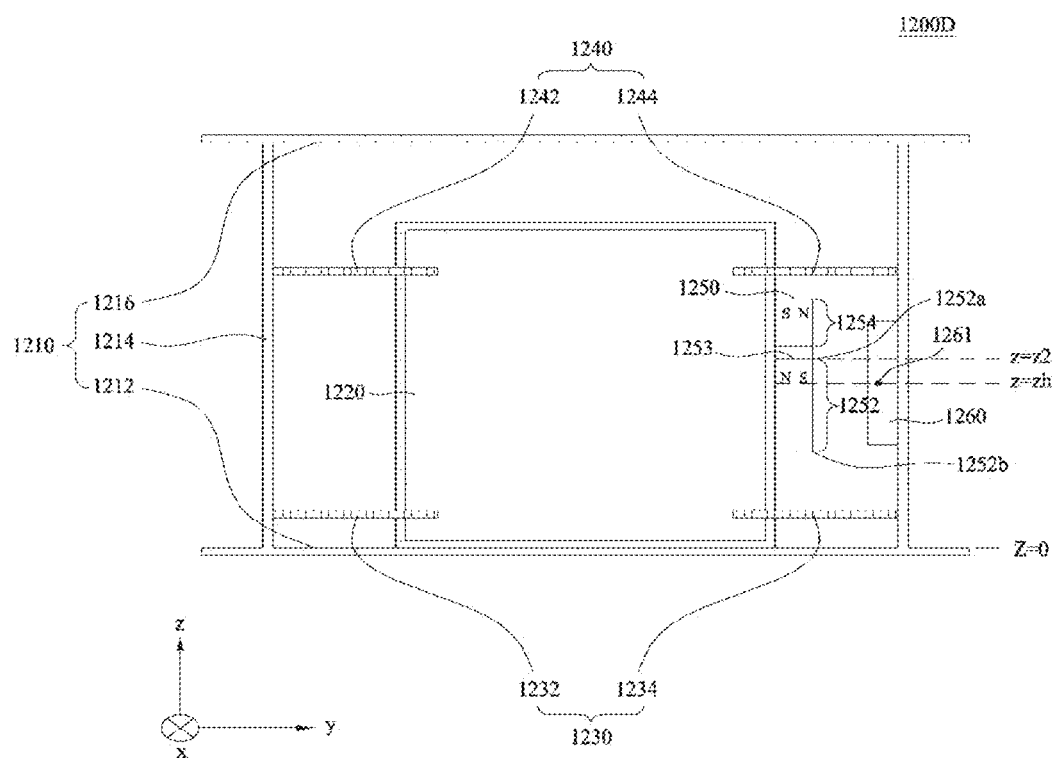
FIG. 46 is a sectional view of a lens moving apparatus according to another embodiment.

FIG. 46 is a sectional view of a lens moving apparatus 1200D according to another embodiment.

Referring to FIG. 46, the center 1261 of the first position sensor 1260 may face or may be aligned with a first point of the first lateral surface 1252 in the magnetized direction, i.e. the y-axis direction, in an initial state before the lens is moved in the optical-axis direction. Here, the first point may be a certain point between the upper end 1252a and the lower end 1252b of the first lateral surface 1252, e.g. a middle point of the first lateral surface 1252.

In a state before the moving part 1220 is moved, the bipolar magnetized magnet 1250 of the lens moving apparatus 1200F shown in FIG. 46 may be higher than the bipolar magnetized magnet 1250 of the lens moving apparatus 1200C shown in FIG. 44 by a predetermined distance z2−zh. In this case, referring to FIG. 40, the lowest value of the first-polarity magnetic field sensed by the first position sensor 1260 may be B2.

In the lens moving apparatus 1200D shown in FIG. 46, the moving part 1220 may move upward to the maximum height z1 as current is supplied to the first coil, like the lens moving apparatus 1200A. At this time, the maximum upward height of the moving part 1220 may be changed using a mechanical stopper. Alternatively, the maximum upward height of the moving part 1220 may be changed by adjusting the modulus of each of the lower and upper springs 1230 and 1240.

Even in the lens moving apparatus 1200D shown in FIG. 46, it can be seen that the intensity of the first-polarity magnetic field sensed by the first position sensor 1260 is almost linearly changed from B2 to B1, like the lens moving apparatus 1200A shown in FIGS. 38 and 41.

Referring to FIG. 42, it can be seen that the maximum displacement D1 of the moving part 1220 of the lens moving apparatus 1200D shown in FIG. 46 is z1−z2.

In the lens moving apparatuses 1200A, 1200B, 1200C, and 1200D shown in FIGS. 38, 41, 43, 44, and 46, the moving part 1220 may be movable from the initial position in only one direction of the optical axis, i.e. in the positive z-axis direction. However, the disclosure is not limited thereto.

In another embodiment, the lens moving apparatus may be movable from the initial position in opposite directions of the optical axis, i.e. in the positive z-axis direction or in the negative z-axis direction, as current is supplied to the first coil. The construction and operation of the lens moving apparatus according to this embodiment are as follows.

Figure 47:
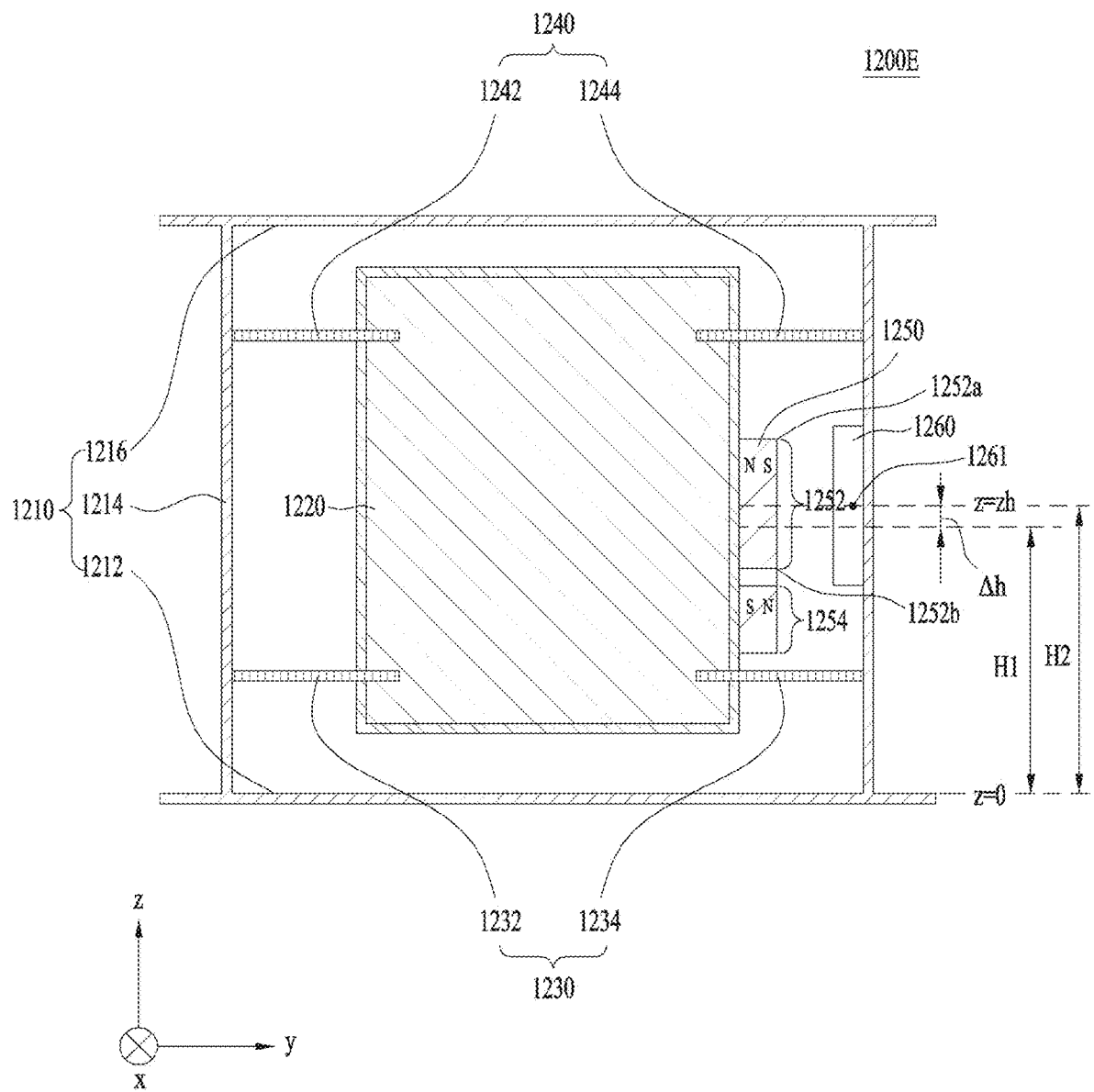
FIG. 47 is a sectional view of a lens moving apparatus according to another embodiment.

FIG. 47 is a sectional view of a lens moving apparatus 1200E according to another embodiment.

The lens moving apparatus 1200E shown in FIG. 47 moves from the initial position in the positive z-axis direction or in the negative z-axis direction, unlike the above-described lens moving apparatuses 1200A and 1200B. Consequently, the moving part 1220 may be suspended by the upper and lower springs 1230 and 1240 at the initial position. With this exception, elements of the lens moving apparatus 1200E shown in FIG. 47 are identical to those of the above-described lens moving apparatus 1200A or 1200B, and therefore a description thereof will be omitted.

Referring to FIG. 47, the center 1261 of the first position sensor 1260 may face or may be aligned with a first point of the first lateral surface 1252 in the magnetized direction in an initial state before the lens is moved in the optical-axis direction, i.e. in an initial state in which the moving part 1220 is not moved but is stationary. Here, the first point of the first lateral surface 1252 may be a certain point between the upper end 1252*a* and the lower end 1252*b* of the first lateral surface 1252, e.g. a middle point of the first lateral surface 1252.

Figure 48:
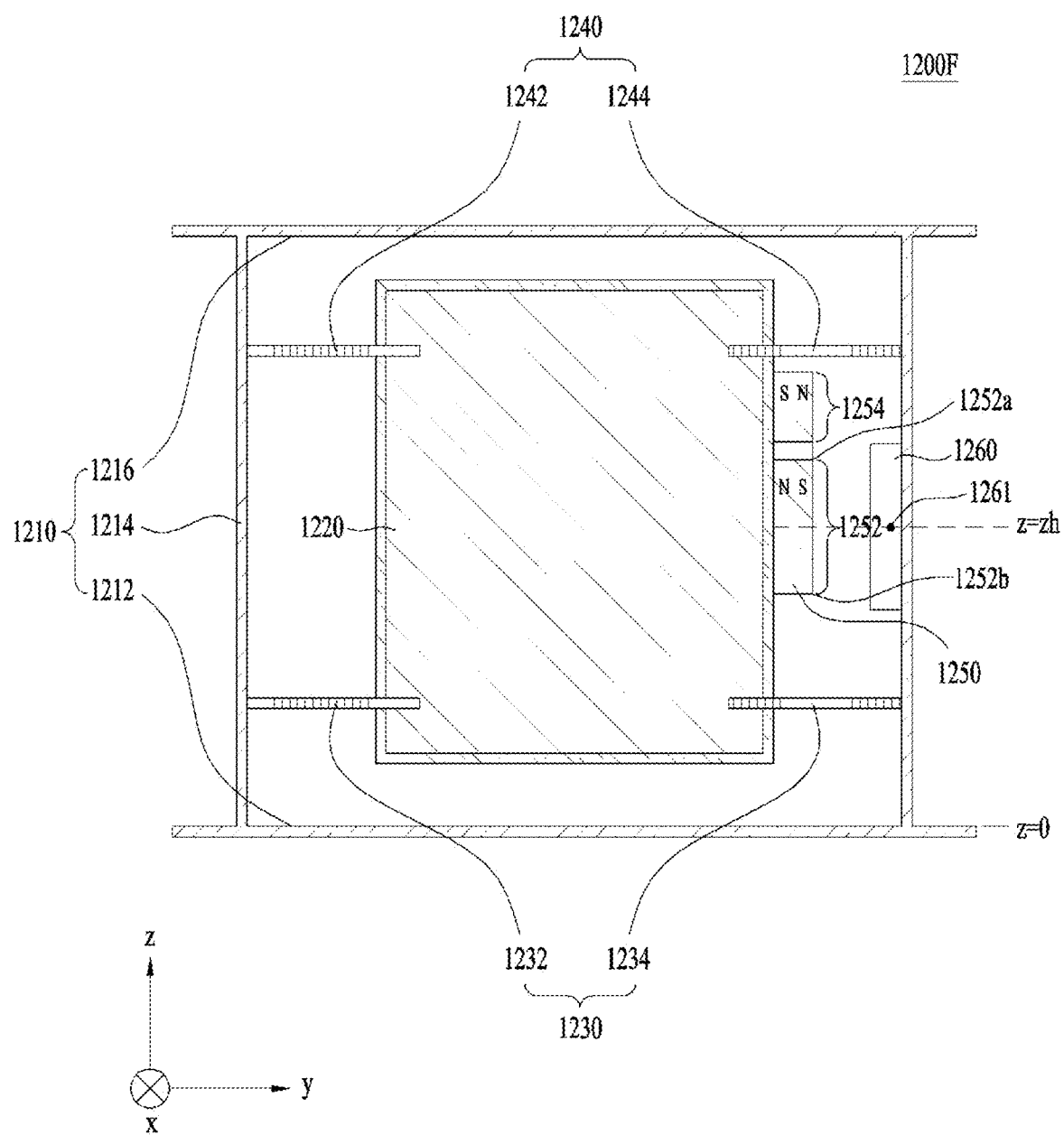
FIG. 48 is a sectional view of a lens moving apparatus according to another embodiment.

FIG. 48 is a sectional view of a lens moving apparatus 1200F according to another embodiment.

The lens moving apparatus 1200F shown in FIG. 48 move from the initial position in the positive z-axis direction or in the negative z-axis direction, unlike the above-described lens moving apparatuses 1200C and 1200D shown in FIGS. 44 and 46. Consequently, the moving part 1220 may be suspended by the upper and lower springs 1230 and 1240 at the initial position. With this exception, elements of the lens moving apparatus 1200F shown in FIG. 48 are identical to those of the above-described lens moving apparatus 1200C or 1200D, and therefore a description thereof will be omitted.

Referring to FIG. 48, the center 1261 of the first position sensor 1260 may face or may be aligned with a first point of the first lateral surface 1252 in the magnetized direction in an initial state before the lens is moved in the optical-axis direction. Here, the first point may be a certain point between the upper end 1252*a* and the lower end 1252*b* of the first lateral surface 1252, e.g. a middle point of the first lateral surface 1252.

In the lens moving apparatus 1200E or 1200F shown in FIG. 47 or 48, the upward and downward movement of the moving part 1220 may be the same as that in FIG. 40. Consequently, the operation of the lens moving apparatus 1200E or 1200F shown in FIG. 47 or 48 will be described with reference to FIG. 40.

In the lens moving apparatus 1200E or 1200F, in the state in which the first position sensor 1260 and the bipolar magnetized magnet 1250 are disposed, as shown in FIG. 47 or 48, in an initial state before the lens is moved in the optical-axis direction, i.e. in the state in which the moving part 1220 is not moved upward or downward but is stationary, or at an initial position, the first-polarity magnetic field sensed by the first position sensor 1260 may become B2. The initial value of a magnetic field sensed by the first position sensor 1260 in the state in which the moving part 1220 is not moved upward or downward but is stationary or at the initial position may be changed or adjusted by the distance between the first position sensor 1260 and the bipolar magnetized magnet 1250.

Figure 49:
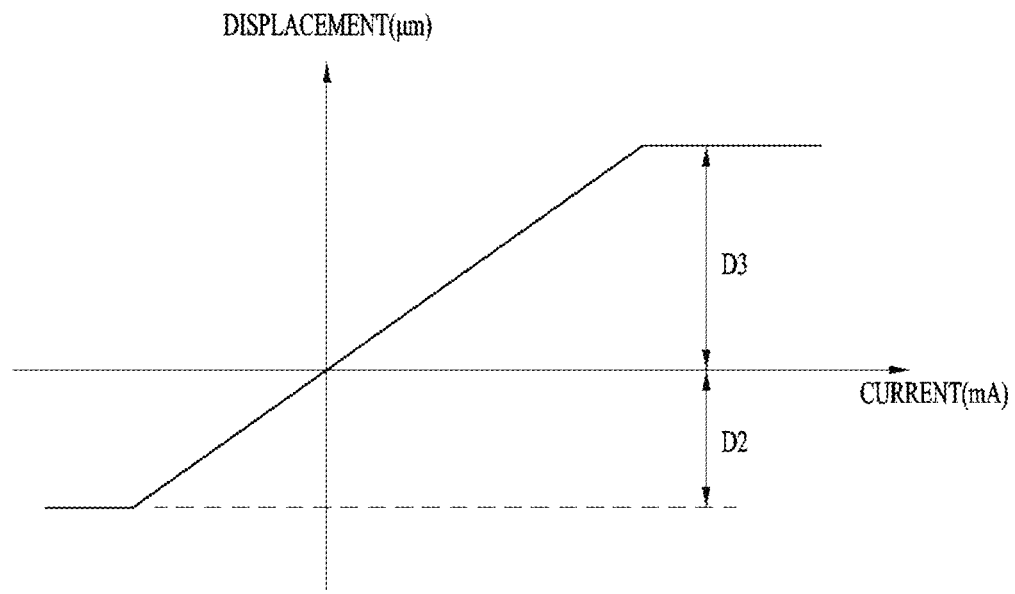
FIG. 49 is a graph showing the displacement of a moving part based on current supplied to a first coil in the lens moving apparatus shown in FIGS. 47 and 48.

FIG. 49 is a graph showing the displacement of the moving part 1220 based on current supplied to the first coil in the lens moving apparatus 1200E or 1200F shown in FIGS. 47 and 48. The horizontal axis indicates the current supplied to the first coil, and the vertical axis indicates the displacement. In addition, the right side of the horizontal axis on the basis of the vertical axis may mean forward current or positive (+) current, and the left side of the horizontal axis on the basis of the vertical axis may mean reverse current or negative (−) current.

As the intensity of forward current supplied to the first coil is increased in the state in which the moving part 1220 is not moved upward or downward but is stationary, as shown in FIG. 47 or 48, or at the initial position, the moving part 1220 may move upward a predetermined distance z (=z4) in the positive z-axis direction. In this case, referring to FIG. 40, the intensity of the magnetic field sensed by the first position sensor 1260 may be increased from B3 to B4.

Alternatively, in the case in which the intensity of reverse current supplied to the first coil is increased in the state in which the moving part 1220 is not moved upward or downward but is stationary, as shown in FIG. 47 or 48, or at the initial position or in the case in which forward current supplied to the first coil is decreased after the moving part 1220 is moved in the positive z-axis direction, the moving part 1220 may be moved downward.

Referring to FIG. 40, in the case in which the intensity of reverse current supplied to the first coil at the initial position is increased, the intensity of the magnetic field sensed by the first position sensor 1260 may be decreased from B3 to B5. In addition, in the case in which forward current supplied to the first coil is decreased after the moving part 1220 is moved the predetermined distance z (=z4) in the positive z-axis direction, the intensity of the magnetic field sensed by the first position sensor 1260 may be decreased from B4 to B3.

In the lens moving apparatus 1200E or 1200F shown in FIG. 47 or 48, therefore, it can be seen that the intensity of first-polarity magnetic field sensed by the first position sensor 1260 is almost linearly changed from B5 to B4.

Referring to FIG. 49, in the state in which the moving part 1220 is movable in opposite directions, as described above, the upper displacement width D3 and the lower displacement width D2 of the moving part 1220 may be the same, or the upper displacement width D3 may be greater than the lower displacement width D2.

In the case in which the upper displacement width D3 and the lower displacement width D2 are the same, the height z (=zh) of the center 1261 of the first position sensor 1260 may aligned with the first point in the magnetized direction, i.e. the y-axis direction, in the initial state before the lens is moved in the optical-axis direction.

On the other hand, in the case in which the upper displacement width D3 is greater than the lower displacement width D2, the center 1261 of the first position sensor 1260 may face or may be aligned with a second point, which is higher than the first point, in the magnetized direction, i.e. the y-axis direction, in the initial state before the lens is moved in the optical-axis direction or at the initial position. That is, in the case in which the upper displacement width D3 and the lower displacement width D2 are not the same but the upper displacement width D3 is greater than the lower displacement width D2, the first position sensor 1260 may be higher than the bipolar magnetized magnet 1250.

In this case, the difference between the second point and the first point may be calculated as represented in Equation 1.

Equation 1

$$\Delta h = H2 - H1 = \frac{\Delta D}{2} \pm \frac{D}{2}$$

Where H2 may indicate the height of the second point, H1 may indicate the height of the first point, ΔD may indicate the value obtained by subtracting the lower displacement width D2 from the upper displacement width D3 of the moving part 1220, and D may indicate the total displacement width D2+D3 of the moving part 1220.

Figure 50:
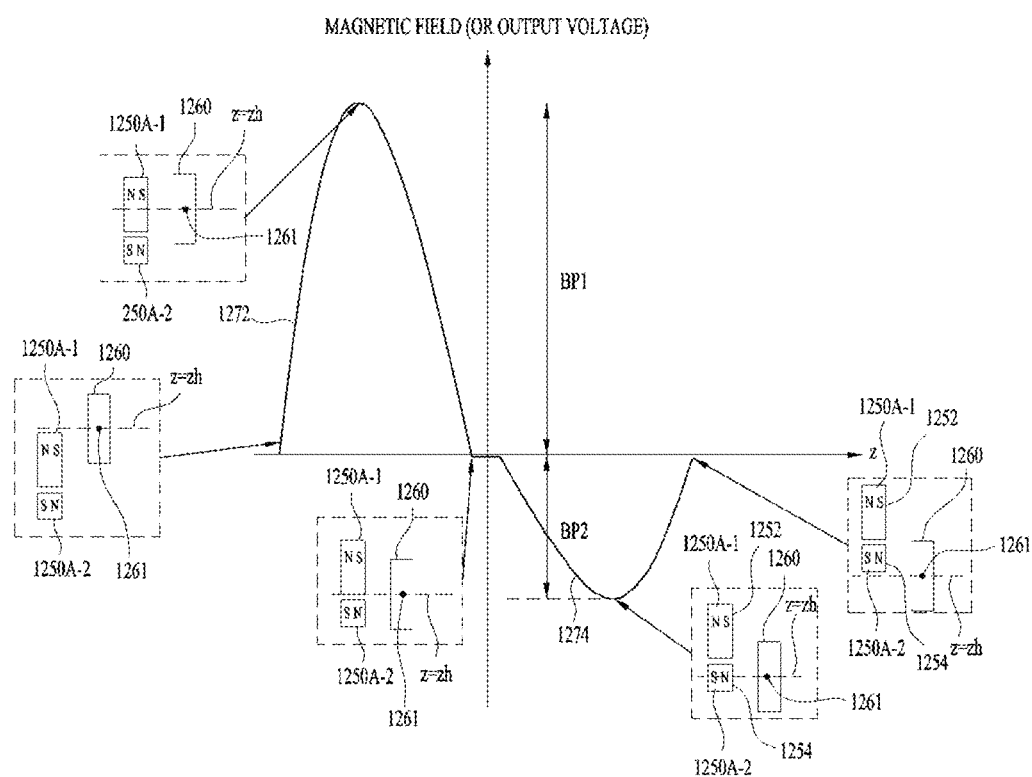
FIG. 50 is a graph showing the intensity of a magnetic field sensed by a first position sensor based on the movement distance of the moving part in an optical-axis direction in various states in which the first position sensor is opposite a bipolar magnetized magnet.

FIG. 50 is a graph showing the intensity of a magnetic field (or output voltage) sensed by the first position sensor 1260 based on the movement distance of the moving part 1220 in the optical-axis direction in various states in which the first position sensor 1260 is opposite the bipolar magnetized magnet 1250-1 or 1250-2. The vertical axis indicates the intensity of the magnetic field (or the output voltage), and the horizontal axis indicates the movement distance of the moving part 1220.

In the graph shown in FIG. 50, the structure in which the bipolar magnetized magnet 1250 is opposite the first position sensor 1260 corresponds to the structure of the first and second bipolar magnetized magnets 1250A-1 and 1250A-2 shown in FIG. 39A. However, even in the case in which the first and second bipolar magnetized magnets 1250B-1 and 1250B-2 shown in FIG. 39B, the first and second bipolar magnetized magnets 1250C-1 and 1250C-2 shown in FIG. 45A, or the first and second bipolar magnetized magnets 1250D-1 and 1250D-2 shown in FIG. 45B may be disposed so as to be opposite the first position sensor 1260, in place of the first and second bipolar magnetized magnets 1250A-1 and 1250A-2 shown in FIG. 39A, the following description of FIG. 50 will equally apply.

Referring to FIG. 50, the magnetic field which is sensed by the first position sensor 1260 and the intensity of which is changed linearly, as described above, may be a first-polarity magnetic field, e.g. an S-pole magnetic field 1272. However, the disclosure is not limited thereto. That is, in another embodiment, the magnetic field which is sensed by the first position sensor 1260 and the intensity of which is changed linearly, as described above, may be a second-polarity magnetic field, e.g. an N-pole magnetic field 1274.

In the case in which the magnetic field which is sensed by the first position sensor 1260 and the intensity of which is changed linearly is not a first-polarity magnetic field but is a second-polarity magnetic field, i.e. an N-pole magnetic field 1274, the center 1261 of the first position sensor 1260 may face or may be aligned with a first point of the second lateral surface 1254 in the initial state before the lens is moved in the optical-axis direction, i.e. in the z-axis direction, or at the initial position, as shown in FIG. 50.

Here, the first point may be a certain point between the upper end and the lower end of the second lateral surface 1254, e.g. a middle height of the second lateral surface 1254. Subsequently, when the lens is moved to the highest position in the optical-axis direction, i.e. in the positive z-axis direction, the center 1261 of the first position sensor 1260 may coincide with a point lower than the lower end of the second lateral surface 1254. At this time, the height of the center 1261 of the first position sensor 1260 may be lower than the height of the lower end of the second lateral surface 1254.

In addition, a first period BP1, in which the S-pole magnetic field 1272 is linear, is larger than a second period BP2, in which the N-pole magnetic field 1274 is linear. The reason for this is that the first length L1 of the first lateral surface 1252 having the S pole is greater than the second length L2 of the second lateral surface 1254 having the N pole.

However, in the case in which the first lateral surface 1252 having the first length L1, which is greater than the second length L2, has an N pole and the second lateral surface 1254 having the second length L2 has an N pole, reference numeral 1272 shown in FIG. 50 may indicate an N-pole magnetic field, and reference numeral 1274 shown in FIG. 50 may indicate an S-pole magnetic field. Although not shown, when the poles are changed as described above, the polarity of the Y axis may be reversed.

Figure 51A:
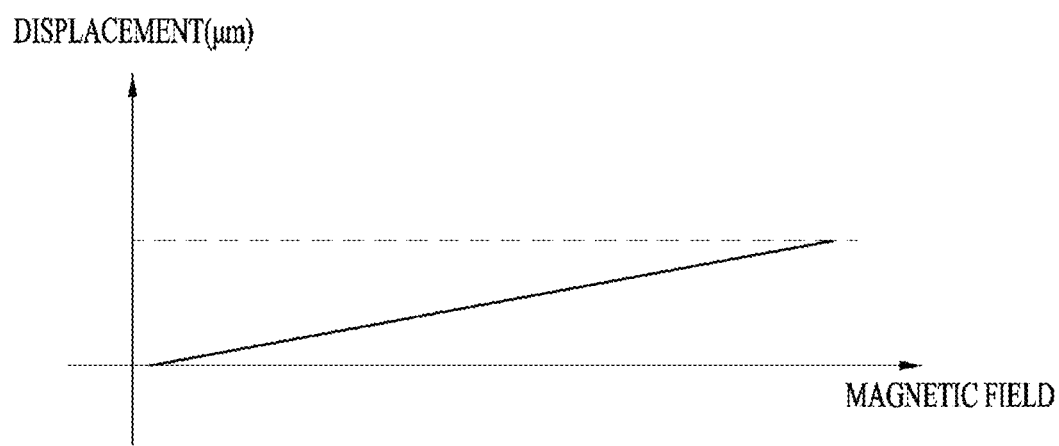
FIGS. 51A and 51B are graphs showing the intensity-based displacement of the magnetic field sensed by the first position sensor.
Figure 51B:
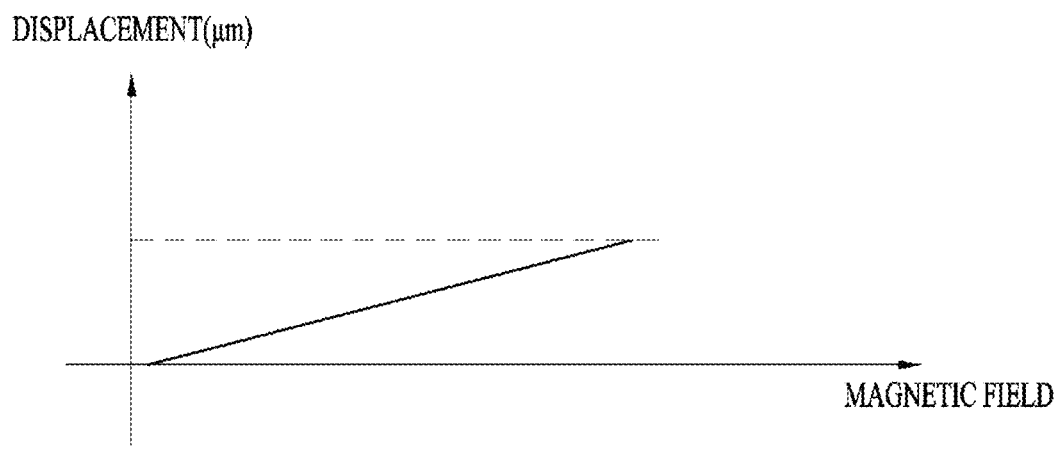

FIGS. 51A and 51B are graphs showing the intensity-based displacement of the magnetic field sensed by the first position sensor 1260. In each graph, the horizontal axis indicates the magnetic field, and the vertical axis indicates the displacement.

In the case in which the first position sensor 1260 and the bipolar magnetized magnet 1250 are disposed in order to sense the magnetic field in the first period BP1, which has a larger linear period than the second period BP2 shown in FIG. 50, the displacement may be recognized even in the case in which the change of the sensed magnetic field is slight, as shown in FIG. 51A.

On the other hand, in the case in which the first position sensor 1260 and the bipolar magnetized magnet 1250 are disposed in order to sense the magnetic field in the second period BP2, which has a smaller linear period than the first period BP1 shown in FIG. 50, the extent to which fine displacement is recognized in the case in which the change of the sensed magnetic field is slight, as shown in FIG. 51B, is smaller than that in FIG. 51A. That is, the inclination in FIG. 51A and the inclination in FIG. 51B may be different from each other.

Consequently, in the case in which the first position sensor 1260 and the bipolar magnetized magnet 1250 are disposed in order to sense the magnetic field in the first period BP1, which is larger than the second period BP2, as shown in FIG. 51A, it is possible to sense the displacement at higher resolution. That is, the wider the linear period in which the intensity of the magnetic field is changed, the more accurately it is possible to check the change in displacement of a coded magnetic field.

In addition, in this embodiment, the intensity of a magnetic field that is sensed by the position sensor 1260 and has a linearly changed size may be coded in 7 bits to 12 bits. In this case, a controller (not shown) may include a lookup table (not shown), and may accurately control the displacement of the moving part 1220 through the position sensor 1260.

The lookup table may store code values based on the intensity of a magnetic field in the state of being matched with the displacement. For example, referring to FIG. 40, the intensity of the magnetic field from the minimum magnetic field B0 to the maximum magnetic field B1 may be coded in 7 bits to 12 bits in the state of being matched with the displacement z. In order to control the displacement of the moving part 1220, therefore, a corresponding code value may be found, and the controller may move the moving part 1220 to the position matching the found code value in the optical-axis direction. The controller may be disposed or included in an image sensor. Alternatively, the controller may be disposed or included in a circuit board having an image sensor mounted thereon.

In addition, in the above-described lens moving apparatuses 1200A to 1200F, the length LT of the bipolar magnetized magnet 1250 in the z-axis direction, which is parallel to the optical-axis direction, may be 1.5 times or more the movable width, i.e. the maximum displacement, of the moving part 1220. For example, referring to FIGS. 38 and 41, the movable width, i.e. the maximum displacement, of the moving part 1220 is z1; therefore, the length LT of the bipolar magnetized magnet 1250 may be 1.5×z1 or more.

In addition, in the above-described lens moving apparatuses 1200A to 1200F, the position sensor 1260 is coupled to, in contact with, supported by, temporarily fixed to, inserted into, or located in the stationary part 1210, and the bipolar magnetized magnet 1250 is coupled to, in contact with, supported by, fixed to, temporarily fixed to, inserted into, or located in the moving part 1220. However, the disclosure is not limited thereto.

That is, in another embodiment, the position sensor 1260 may be coupled to, in contact with, supported by, temporarily fixed to, inserted into, or located in the moving part 1220, and the bipolar magnetized magnet 1250 may be coupled to, in contact with, supported by, fixed to, temporarily fixed to, inserted into, or located in the stationary part 1210. In this case, the above description may be applied.

Figure 52:
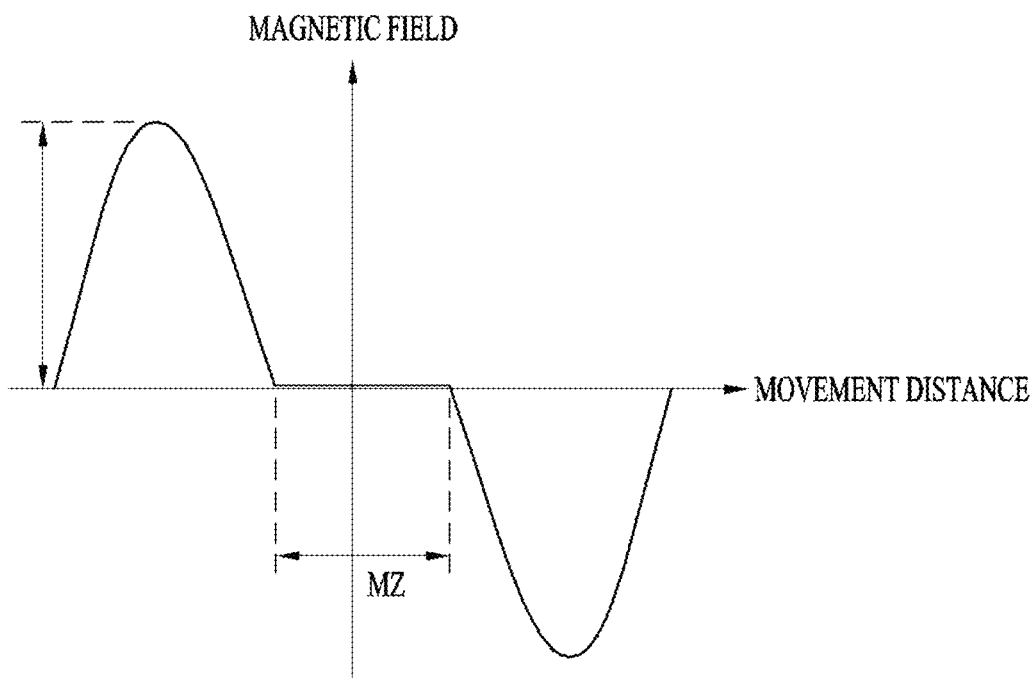
FIG. 52 is a graph illustrating the change in intensity of a magnetic field based on the movement distance of a moving part of a lens moving apparatus according to a comparative example.

FIG. 52 is a graph illustrating the change in intensity of a magnetic field based on the movement distance of a moving part 1220 of a lens moving apparatus according to a comparative example. The horizontal axis indicates the movement distance, and the vertical axis indicates the intensity of the magnetic field.

In the case in which the first and second lengths L1 and L2 of the first and second lateral surfaces 1252 and 1254 of the bipolar magnetized magnet 1250 in the optical-axis direction are the same, the magnetic field sensed by the position sensor 1260 may be changed, as shown in FIG. 52, when the moving part 1220 moves. At this time, referring to FIG. 52, the magnetic field sensed by the position sensor 1260 has opposite polarities about a mutual zone MZ.

The mutual zone MZ is a zone in which the intensity of the magnetic field sensed by the position sensor 1260 is fixed to '0' even when the moving part 1220 moves. The mutual zone MZ may not be processed using a software method. As a result, the position sensor 1260 senses that the intensity of the magnetic field in the mutual zone MZ is only '0'. Consequently, it is not possible to accurately measure or control the movement distance of the moving part 1220 in the mutual zone MZ.

In this embodiment, however, the first length L1 of the bipolar magnetized magnet 1250 is greater than the second length L2, and the position sensor 1260 senses the intensity of the first-polarity magnetic field that is changed linearly. Consequently, it is possible to inhibit the occurrence of the problems caused in the above comparative example. As a result, it is possible to improve design margin and reliability of the lens moving apparatuses 1200A to 1200F.

Figure 53:
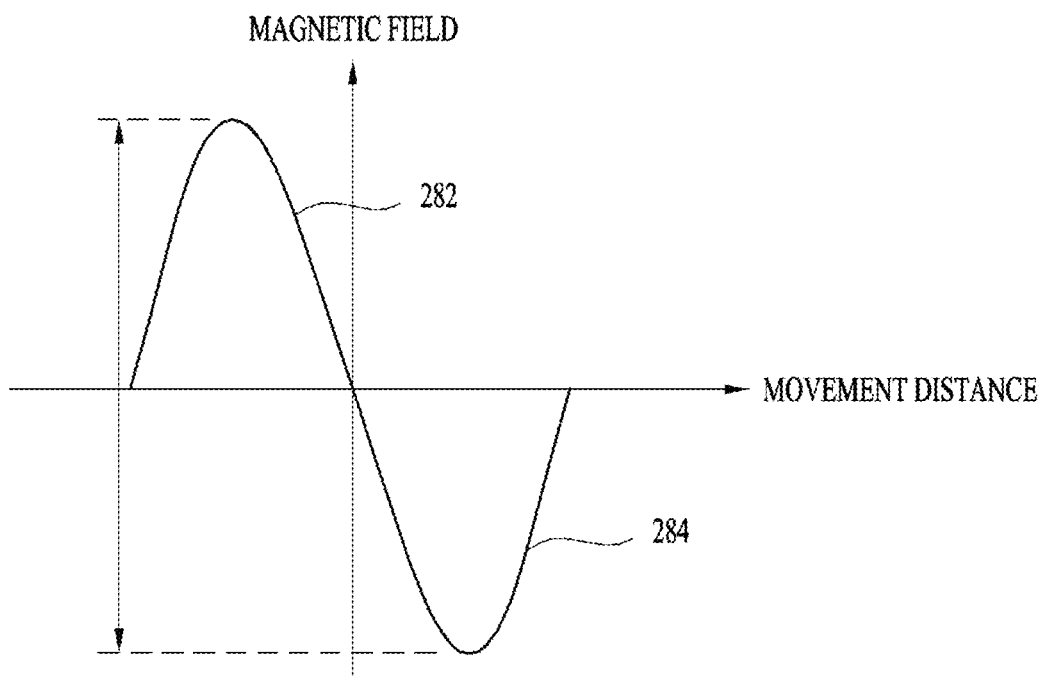
FIG. 53 is a graph illustrating the change of the magnetic field sensed by the position sensor based on the movement of the moving part of the lens moving apparatus according to the embodiment.

FIG. 53 is a graph illustrating the change of the magnetic field sensed by the position sensor 1260 based on the movement of the moving part 1220 of the lens moving apparatus according to the embodiment. The horizontal axis indicates the movement distance, and the vertical axis indicates the magnetic field.

In the case in which the third length L3 of the above-described non-magnetic partition wall 1250A-3 or 1250C-3 is reduced so as to become 50% or less the total length LT of the bipolar magnetized magnet 1250, the mutual zone MZ may be almost completely eliminated, as shown in FIG. 53. At this time, the height z (=zh) of the center 1261 of the position sensor 1260 may coincide with or may be equal to the height of the center of the bipolar magnetized magnet 1250.

In this case, the intensity of the first-polarity magnetic field 1282 and the intensity of the second-polarity magnetic field 1284 may be almost linearly changed. Consequently, the position sensor 1260 may sense both the first-polarity magnetic field 1282 and the second-polarity magnetic field 1284, which are linearly changed as the moving part 1220 moves, with the result that it is possible to provide higher resolution than when the position sensor 1260 senses a magnetic field which has one of the first and second polarities and the intensity of which is changed linearly.

In addition, in the case in which the third length L3 of the non-magnetic partition wall 1250A-3 or 1250C-3 is reduced so as to become 10% or more the total length LT of the bipolar magnetized magnet 1250, the mutual zone MZ of the magnetic field is clearly separated from the linear zone of the magnetic field. Consequently, the position sensor 1260 may sense only a magnetic field which has one of the first and second polarities and the intensity of which is changed linearly.

Although embodiments have been described with reference to a number of illustrative embodiments thereof, it should be understood that numerous other modifications and applications may be devised by those skilled in the art that will fall within the intrinsic aspects of the embodiments. More particularly, various variations and modifications are possible in concrete constituent elements of the embodiments. In addition, it is to be understood that differences relevant to the variations and modifications fall within the spirit and scope of the present disclosure defined in the appended claims.

INDUSTRIAL APPLICABILITY

A lens moving apparatus that is capable of being miniaturized, performing image correction regardless of direction, and accurately recognizing and controlling the position of a lens is provided.

The invention claimed is:
1. A lens moving apparatus comprising:
  a housing;
  a bobbin disposed in the housing;
  a first magnet disposed on the housing;
  a first coil disposed on the bobbin and configured to move the bobbin in an optical axis direction by an interaction with the first magnet;
  a first circuit board disposed on the housing;
  a lower elastic member coupled to a lower portion of the bobbin and a lower portion of the housing and electrically connected to the first circuit board; and
  a first position sensor disposed on the first circuit board and configured to detect a displacement of the bobbin,
  wherein the first position sensor is configured to supply power to the first coil through the first circuit board.
2. The lens moving apparatus according to claim 1, wherein the lower elastic member comprises a first elastic member and a second elastic member spaced apart from the first elastic member, and
  wherein one end of the first coil is coupled to the first elastic member by a first solder, and an other end of the first coil is coupled to the second elastic member by a second solder.
3. The lens moving apparatus according to claim 2, wherein each of the first and second lower elastic members comprises an inner frame coupled to the lower portion of the bobbin, an outer frame coupled to the lower portion of the housing, a connection portion connecting the inner frame and the outer frame, and
  wherein one end of the first coil is coupled to the inner frame of the first elastic member by the first solder, and the other end of the first coil is coupled to the inner frame of the second elastic member by the second solder.
4. The lens moving apparatus according to claim 1, comprising a second coil configured to move the housing by an interaction with the first magnet.
5. The lens moving apparatus according to claim 4, comprising:
  an upper elastic member coupled to an upper portion of the housing and an upper portion of the bobbin;
  a second circuit board disposed under the housing and electrically connected to the second coil; and
  a supporting member electrically connecting the first circuit board and the second circuit board and configured to support the housing.

6. The lens moving apparatus according to claim 5, wherein the housing comprises first to fourth sides and first to fourth corners, and
wherein the supporting member comprises a first supporting member disposed at the first corner of the housing, a second supporting member disposed at the second corner of the housing, a third supporting member disposed at the third corner of the housing, and a fourth supporting member disposed at the fourth corner of the housing.

7. The lens moving apparatus according to claim 6, wherein the first to fourth supporting members are electrically connected to the first circuit board.

8. The lens moving apparatus according to claim 6, wherein the first circuit board is disposed on one of the first to fourth sides of the housing.

9. The lens moving apparatus according to claim 5, comprising:
a base disposed under the second circuit board; and
second and third position sensors electrically connected to the second circuit board and configured to detect a movement of the housing.

10. The lens moving apparatus according to claim 9, wherein the base comprises a first recess and a second recess,
wherein the second position sensor is disposed in the first recess and the third position sensor is disposed in the second recess.

11. The lens moving apparatus according to claim 5, wherein the first magnet comprises first to fourth magnet units, and
wherein the second coil comprises a first coil unit facing the first magnet unit in the optical axis direction, a second coil unit facing the second magnet unit in the optical axis direction, a third coil unit facing the third magnet unit in the optical axis direction, and a fourth coil unit facing the fourth magnet unit in the optical axis direction.

12. The lens moving apparatus according to claim 1, wherein the first position sensor comprises first to fourth terminals for first and second powers, clock, and data.

13. The lens moving apparatus according to claim 1, wherein the first position sensor comprises a Hall sensor and a driver configured to perform data communication.

14. The lens moving apparatus according to claim 1, comprising a second magnet disposed on the bobbin corresponding to the first position sensor.

15. The lens moving apparatus according to claim 14, wherein the bobbin comprises a recess formed in an outer circumferential surface of the bobbin, and the second magnet is disposed in the recess of the bobbin.

16. The lens moving apparatus according to claim 14, wherein the first coil is wound so as to surround a circumferential surface of the bobbin in a rotational direction about the optical axis, and
the first coil is disposed under the second magnet.

17. The lens moving apparatus according to claim 1, wherein the first position sensor is configured to sense or determine a displacement of the bobbin in in a first direction, parallel to an optical axis together with the second magnet.

18. The lens moving apparatus according to claim 1, wherein the lower elastic member is coupled to the first circuit board by a solder.

19. A camera module comprising:
the lens moving apparatus according to claim 1;
a lens barrel coupled to the bobbin; and
an image sensor.

20. A lens moving apparatus comprising:
a housing;
a bobbin disposed in the housing;
a first magnet disposed on the housing;
a first coil disposed on the bobbin and configured to move the bobbin in an optical axis direction by an interaction with the first magnet;
a first circuit board disposed on the housing;
an upper elastic member coupled to an upper portion of the bobbin and an upper portion of the housing;
a lower elastic member coupled to a lower portion of the bobbin and a lower portion of the housing and electrically connected to the first circuit board;
a first position sensor disposed on the first circuit board and configured to detect a displacement of the bobbin;
a second coil configured to move the housing by an interaction with the first magnet; and
a supporting member electrically connecting the first circuit board and the second circuit board and configured to support the housing,
wherein the first position sensor is configured to supply power to the first coil through the first circuit board and the lower elastic member.

* * * * *